United States Patent [19]
Castro et al.

[11] 4,453,041
[45] Jun. 5, 1984

[54] METHOD AND APPARATUS FOR PROCESSING CODED INFORMATION RECEIVED THROUGH A TELEPHONE LINE DURING THE NON-ACTIVE INTERVALS OF A RINGING PERIOD

[76] Inventors: Marcelo Castro; Horacio Castro, both of El Salvador 5962, Buenos Aires, Argentina

[21] Appl. No.: 178,862

[22] Filed: Aug. 18, 1980

Related U.S. Application Data

[63] Continuation-in-part of Ser. No. 150,178, May 15, 1980.

[30] Foreign Application Priority Data

Mar. 31, 1980 [AR] Argentina ............................. 280506

[51] Int. Cl.³ ........................................... H04M 15/06
[52] U.S. Cl. .................................. 179/84 C; 179/5.5; 179/2 A
[58] Field of Search ............. 179/5.5, 2 R, 2 A, 84 C, 179/89, 18 DA

[56] References Cited

U.S. PATENT DOCUMENTS

| | | | |
|---|---|---|---|
| 3,654,396 | 4/1972 | Biezeveld | 179/18 D |
| 3,686,440 | 8/1972 | Kroeger | 179/5.5 |
| 3,787,626 | 1/1974 | Subieta | 179/5.5 |
| 3,859,462 | 1/1975 | Saxon | 179/2 A |
| 4,074,078 | 2/1978 | Jansen | 179/2 A X |
| 4,121,053 | 10/1978 | Dick | 179/2 A |

*Primary Examiner*—Joseph A. Popek

*Attorney, Agent, or Firm*—Fleit, Jacobson & Cohn

[57] ABSTRACT

A method and apparatus for screening unwanted calls by processing coded information received through a telephone line during the non-active intervals of a ringing period. Once the ringing loop has been established, a calling party "dials" a pre-established code, which may comprise one or more characters, during one or more of the non-active intervals of the ringing period. If the code is correct, the called party is alerted. The indication furnished to the called party may be an acoustic signal, a flashing light, an alphanumeric display, or any other suitable indication means. The apparatus, during the ringing period and after such coded information has been received thereby, decodes and compares the codes with pre-established codes stored in a memory device and, if it finds coincidence between the received code and one of the memorized pre-established codes, it will validate the code. If the code is validated, it will actuate the indicating means thus warning the called party that the calling party knows at least one of the codes. If the called party answers the call, the conversation loop will be closed and the parties may communicate. In one embodiment, the conventional loop a wrong code is sent, and after a very short interval it opens again. Other embodiments allow the reception of a second code sent by the calling party after the conversation loop closes, but still a first code will have been sent during at least one non-active interval of a ringing period. Yet another embodiment allows the second code to perform, at the receiving end, any useful electrically controllable operation.

45 Claims, 32 Drawing Figures

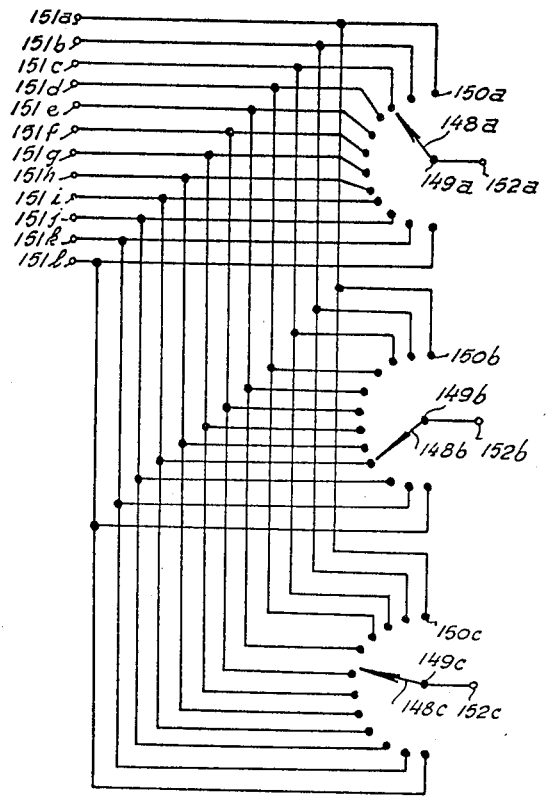
FIG_11
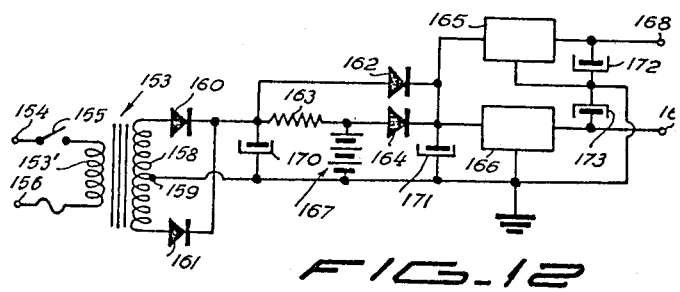
FIG_12

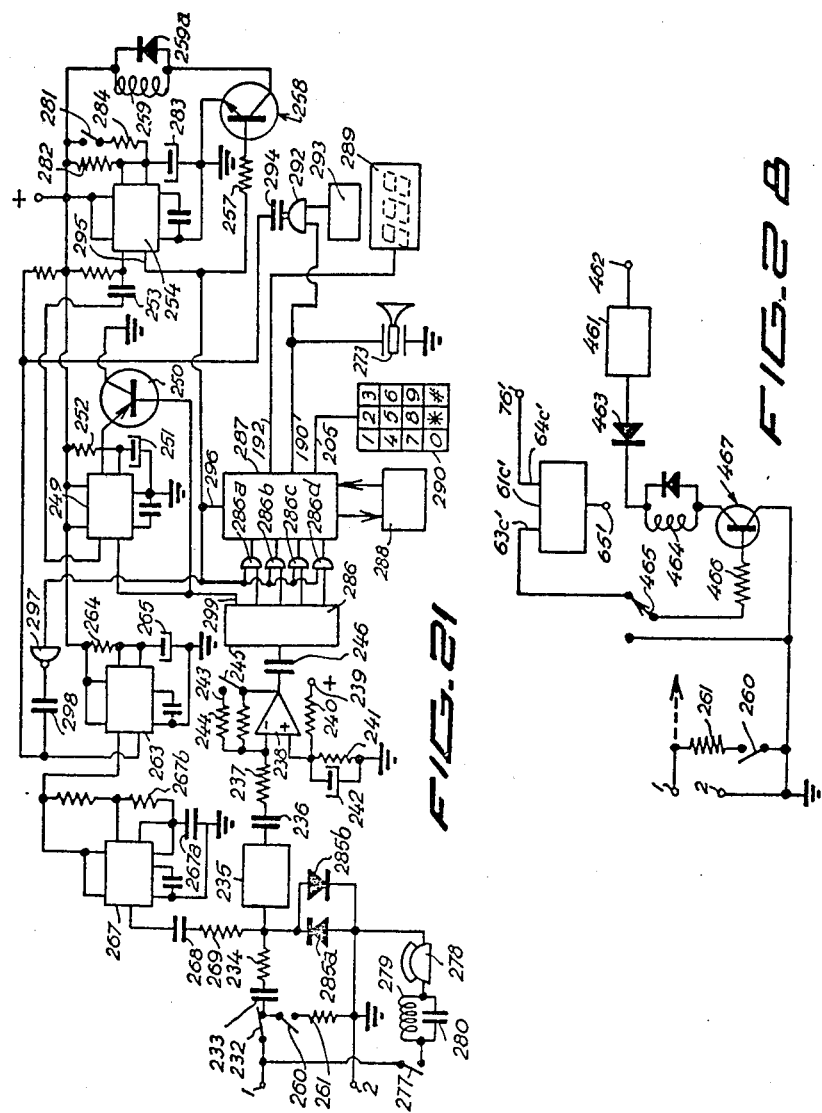

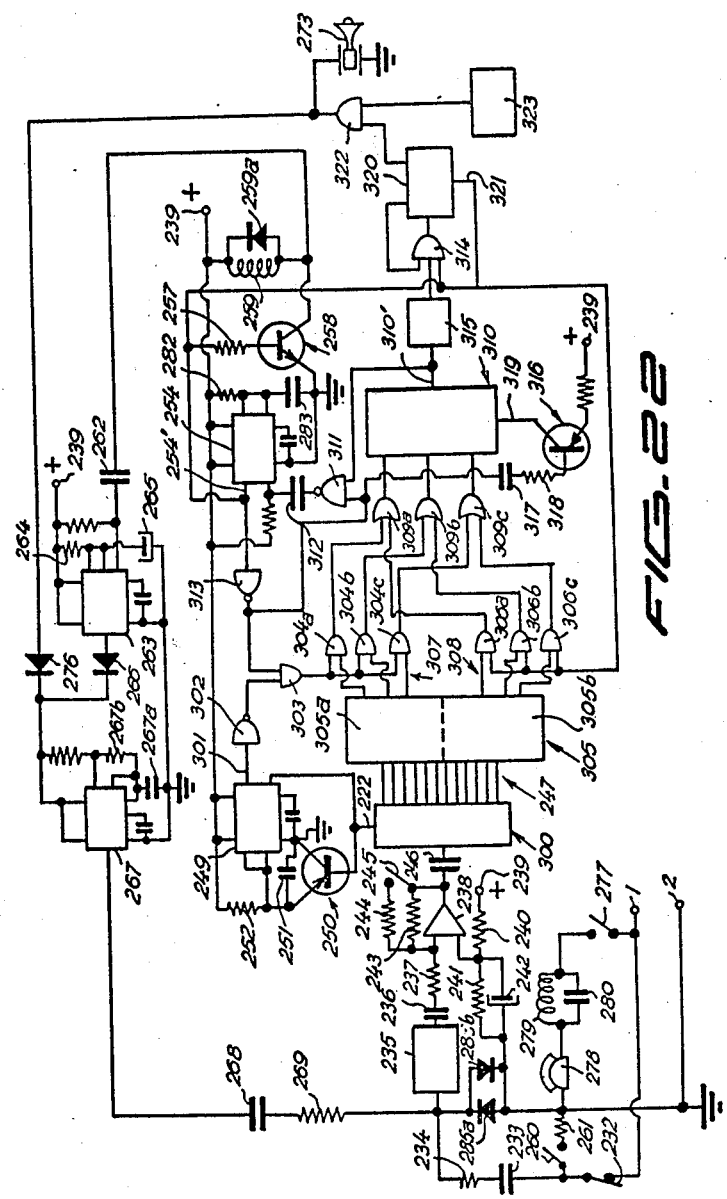

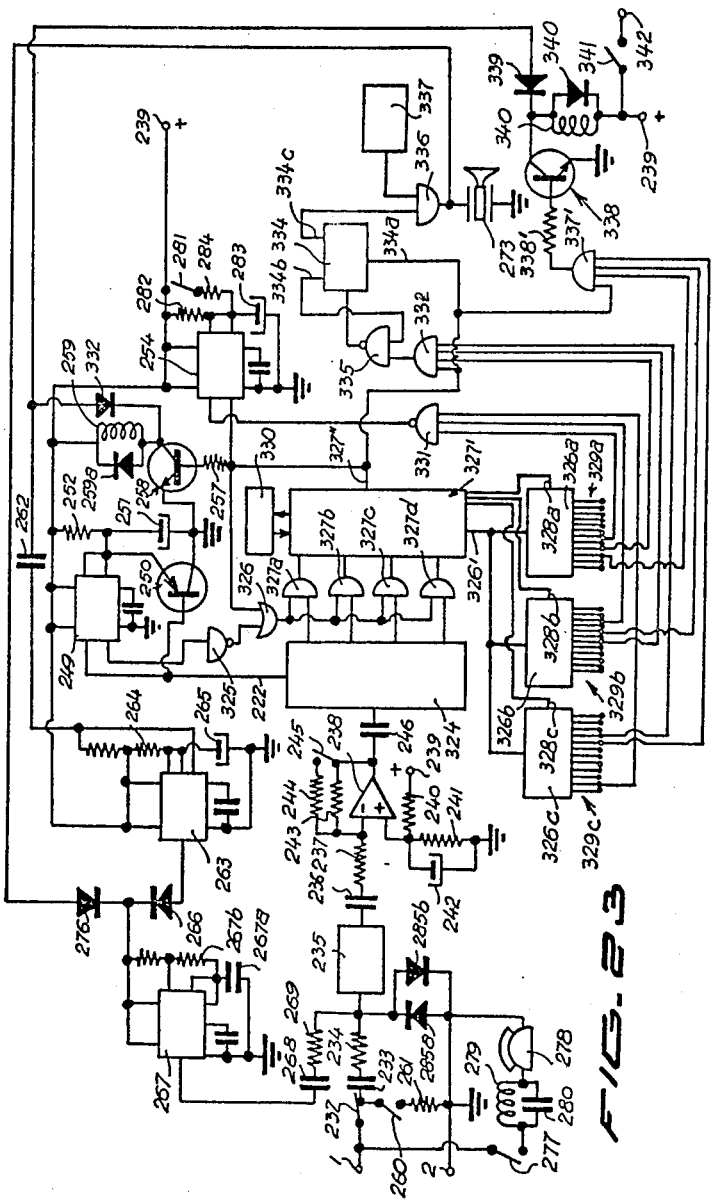

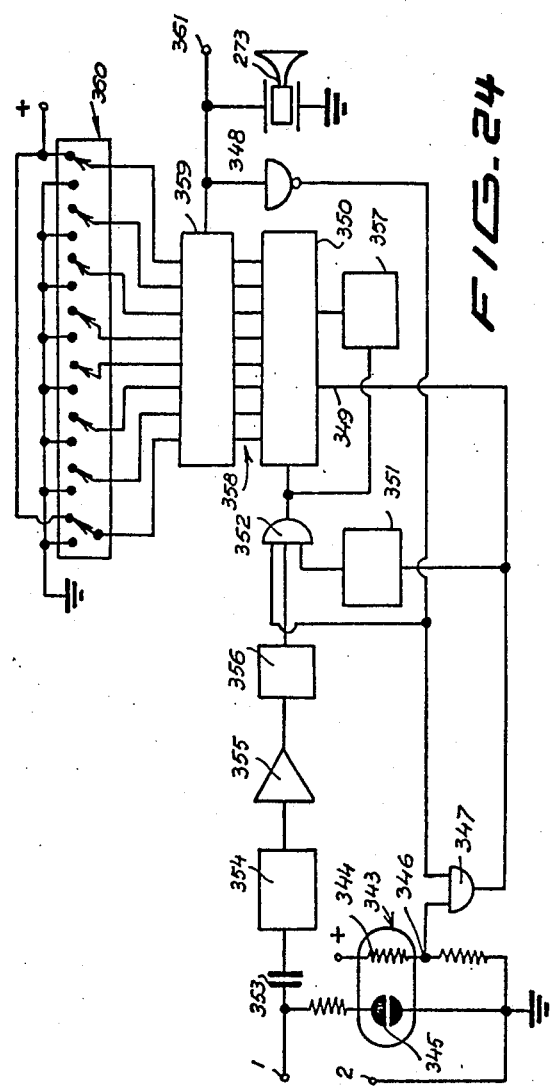

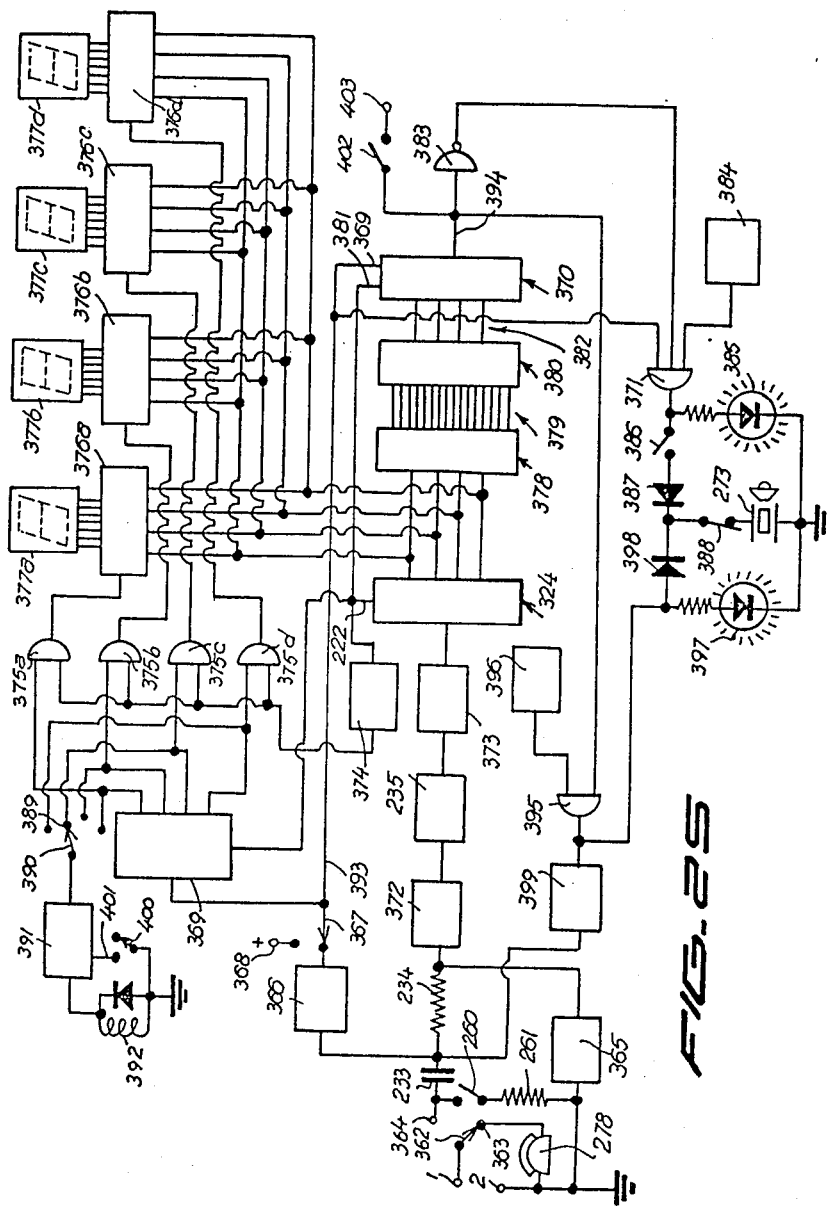

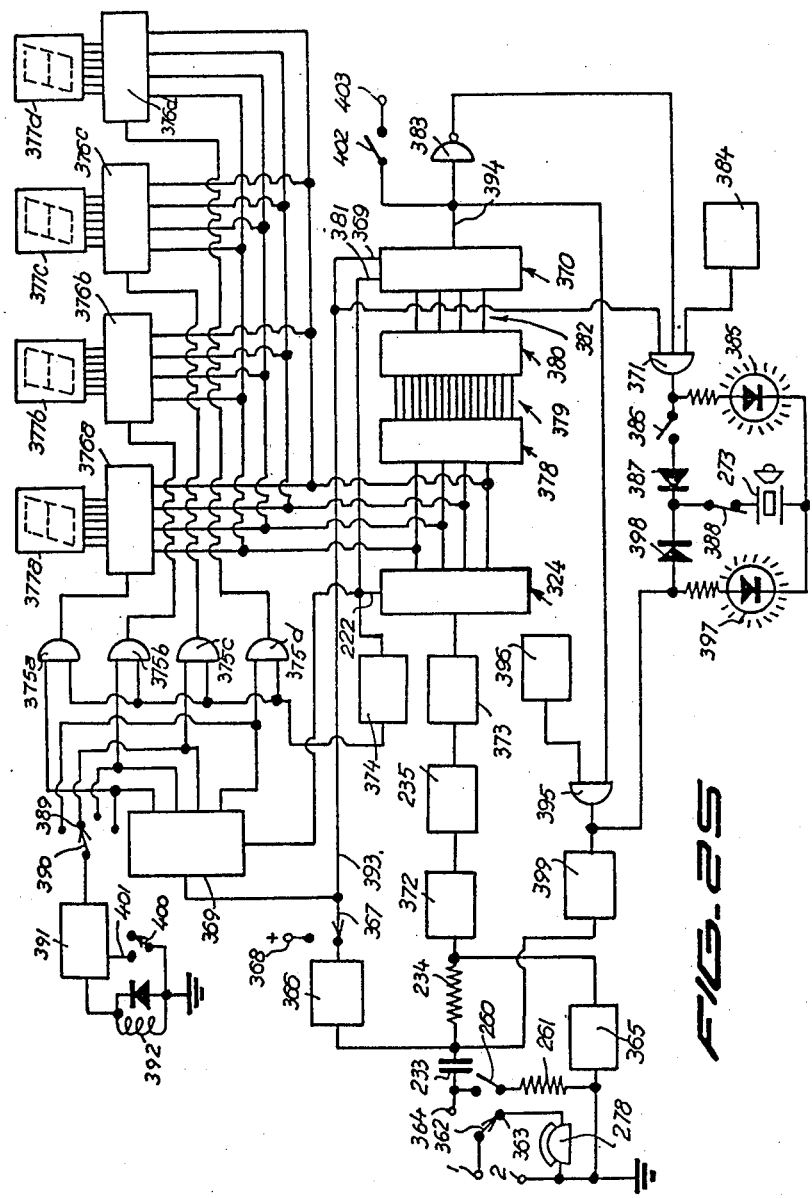

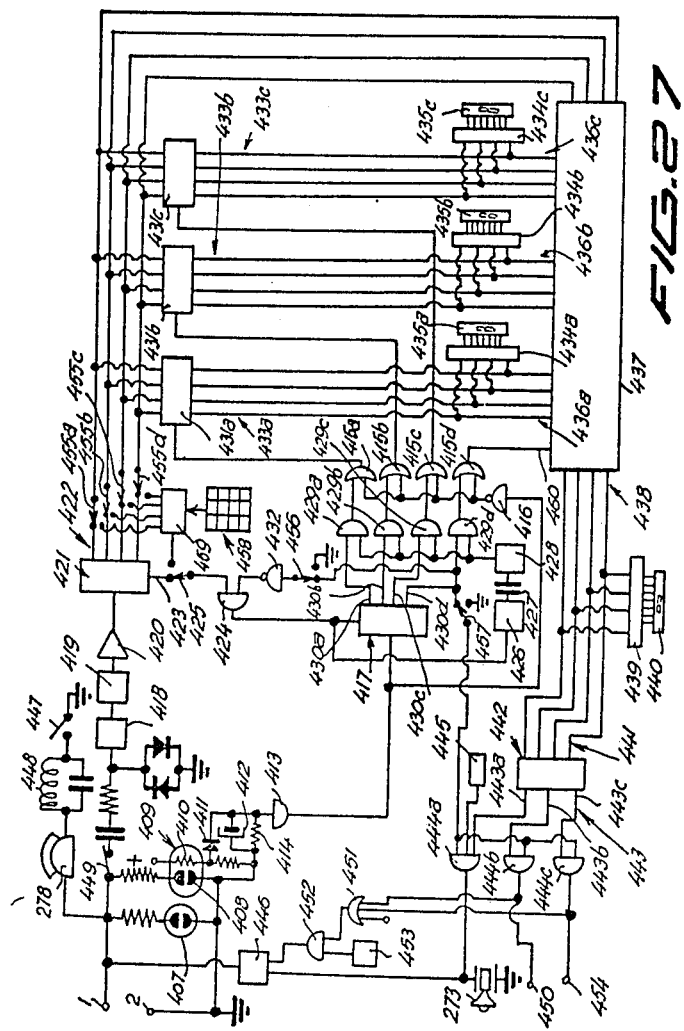

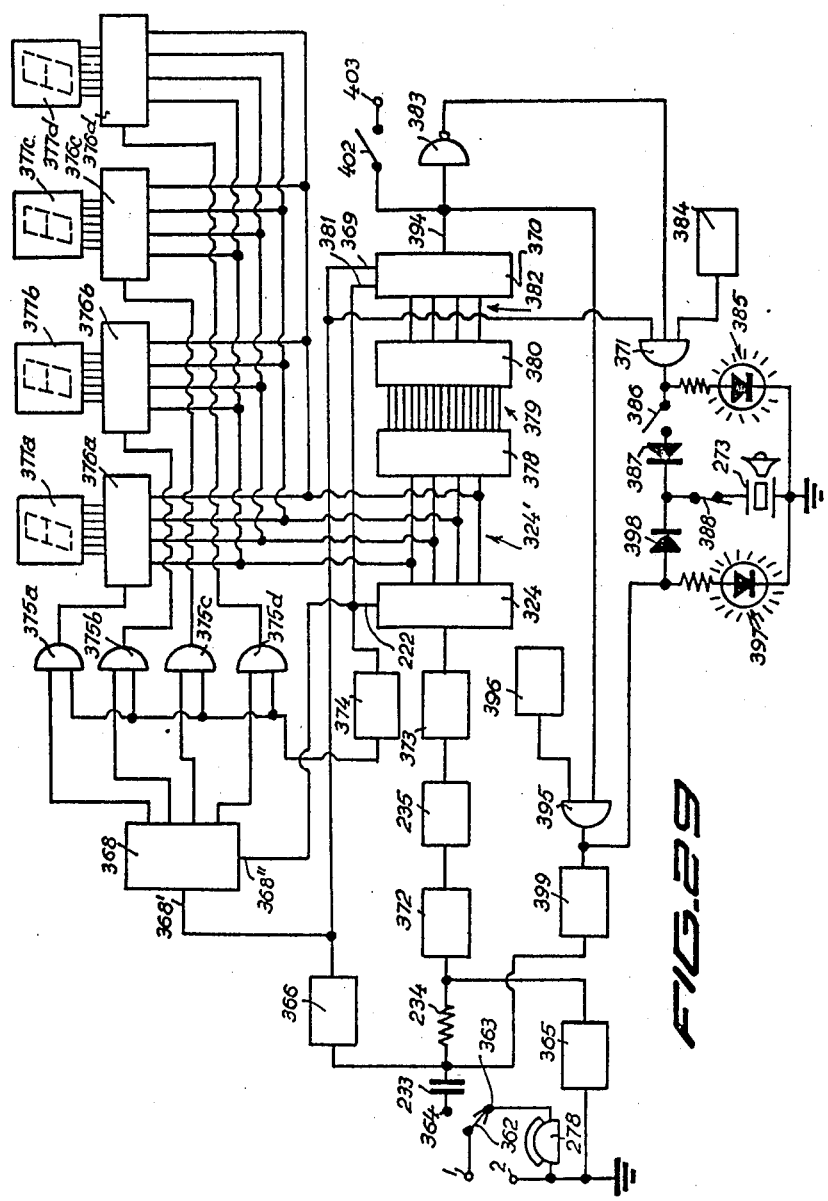

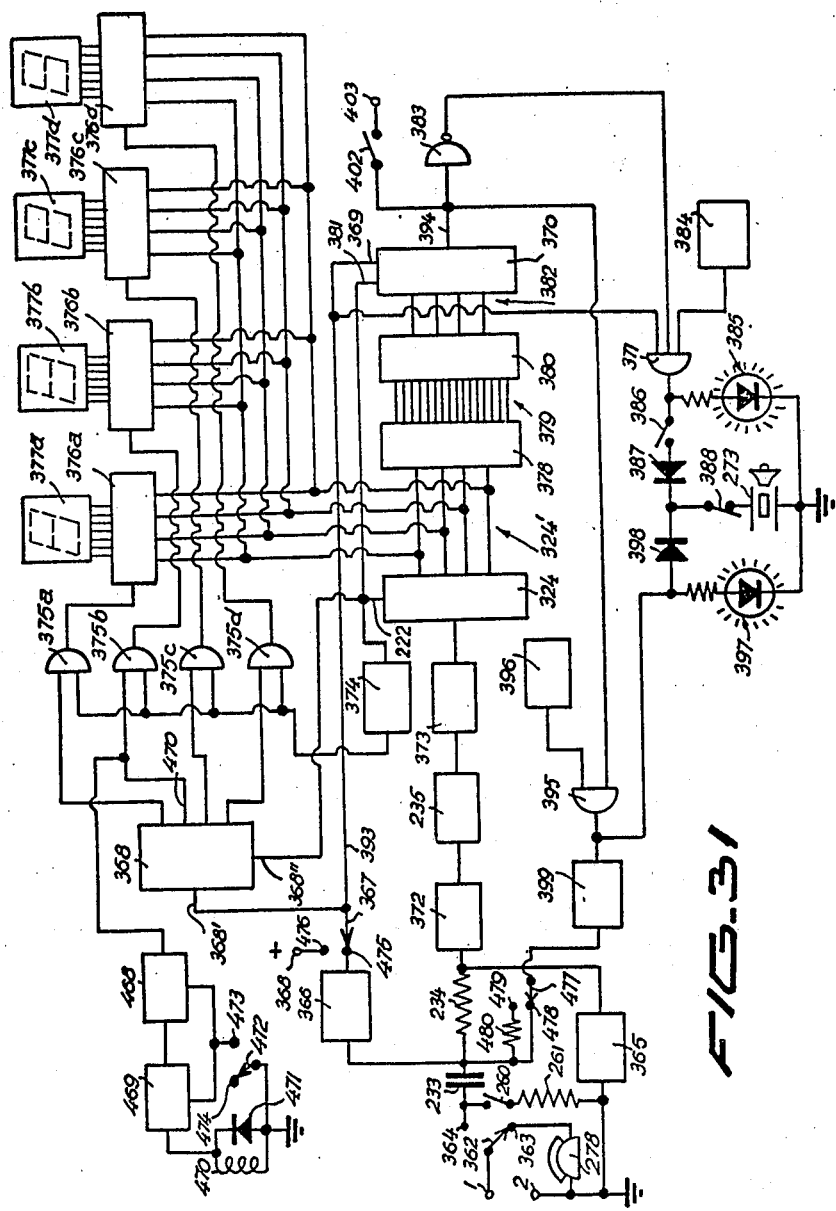

METHOD AND APPARATUS FOR PROCESSING CODED INFORMATION RECEIVED THROUGH A TELEPHONE LINE DURING THE NON-ACTIVE INTERVALS OF A RINGING PERIOD

CROSS REFERENCE TO RELATED APPLICATIONS

This is a Continuation in Part application of our U.S. application Ser. No. 150,178 filed on May 15, 1980.

BACKGROUND OF THE INVENTION

1. Field of the Invention

The present invention relates to a method and apparatus for processing coded information received through a phone line during the non-active intervals of a ringing period. More particularly the present invention relates to a method and apparatus allowing a called phone subscriber, when present at the location where the apparatus of the present invention is provided, to know that the calling party is one who has knowledge of one of the pre-established codes when his phone set receives a call followed by the reception of the pre-established code and before the called party answers the call. The present invention relates also to a method and apparatus for performing at the receiving end any electrically controllable operation by the use of a pre-established code.

2. Description of the Prior Art

A phone subscriber is commonly pestered by innumerable unwanted phone calls, even during the small hours or when he is busy and he does not desire to be perturbed. Until now, no effective method is known to obviate such inconveniences. The most simple method used is to have a private exchange attended by an operator who acts like a screen between the calling party and the called party. However it may happen that the oeprator is not sure of the importance of the call; in such case the operator must assume the responsibility of transferring the communication, in which case said operator must interrupt the called party or, in the opposite case, look for an excuse for obviating said interruption. In this latter case it may happen that the operator was wrong in evaluating the importance and/or the urgency of the message motivating the call. A device, supposedly intended for obviating inconveniences of this sort, is the automatic answering recorder. However, this kind of apparatus does not allow to know if the calling party is a desired one. Such an apparatus is more useful for knowing which persons have called during a period of absence of the phone subscriber. Later on he may replay all the recorded messages which have been left by the calling parties during his absence. It is not practical to put in operation such an apparatus when the phone subscriber is present, because he can lose the opportunity of answering important or simply desired calls at the moment when they are being received. It is also possible to resort to a company rendering answering services. While such services obviously offer several advantages, they have also various inherent drawbacks. One of them is that the answering service retains the phone line of the phone subscriber during all the time the service is rendered. Another drawback is that the operators of such services become acquainted with the nature of the received messages; thus no privacy or secrecy may be maintained. Still another drawback is that there is a considerable delay between the reception of the message by the answering service and the moment at which the called subscriber becomes acquainted therewith. Another device used by some phone subscribers to get privacy, and which is available on the market, is a simple switch connected in series with the circuit of the ringing bell of the phone set. When the switch is open, the bell will not sound and thus the phone subscriber will never become aware of the fact that a phone call is being made to him. This is obviously a very inconvenient method, since the phone subscriber may miss one or more important and/or urgent calls. The phone subscriber has no means to know that a call is being made and if the calling party may or not be a desired one. Another very important drawback is that, if the phone subscriber forgets to close the switch once he desires to be again in conditions of receiving calls, he may remain uncommunicated during several hours, or even days, without being aware of the fact.

Before starting the description of the present invention and for a better understanding thereof, it is considered convenient to give a statement of the scope within which several of the terms and expressions, used both in this specification and in the accompanying claims, must be framed.

"Phone line".

The entire circuit established from the output of the calling phone apparatus, through the exchange or exchanges intervening in the call up to the input of the apparatus of the present invention, or also any of the partial portions of such circuit, such as from the calling apparatus up to the exchange corresponding thereto, from this exchange to another exchange when the calling and the called apparatus pertain to different exchanges, or from the exchange to which the called apparatus pertains up to the input of the called apparatus proper.

"Character".

Each of the discrete components of a coded information which has been sent through the phone line and circulating through the circuits of the apparatus of the present invention, but different from the conventional information which represents the distinctive characteristic of a conventional subscriber apparatus. Said conventional information may include numerical characteristics of the called apparatus, its exchange, area, country (in the case of international calls), etc. The characters of the information which is not the conventional one, may be one tone or a pair of tones (or frequencies) as those of a "Touch-Tone" system.

"Code".

Group of characters constituting an information different from the conventional information mentioned above and serving only for specific uses in the present invention. A code may comprise a single character or a plurality thereof.

"Calling end".

The end of a phone line from which a call is originated.

"Called end".

The end of a phone line to which the communication requirement is directed.

"Calling party".

A person, or an electric or electronic device, which originates the communication requirement by means of an apparatus at the calling end.

"Called party".

A person, or an electric or electronic device, which receives from the exchange the communication requirement originated by the calling party.

"Conversation loop".

The loop which is closed between the calling end and the called end (through one or more intervening exchanges) once the call has been attended, indistinctly by a person unhooking the phone receiver, or by an electric or electronic device automatically connecting on the called end of the phone line an electric impedance equivalent to that offered by an unhooked conventional phone set.

"Ringing loop".

An alternating current loop established between the called phone set and its exchange so as to be able to send from the exchange to the called phone set alternating current wave trains serving for energizing the bell of the called phone set, but before this latter is attended personally or automatically. At the same time a ringing loop is also closed between the calling phone set and its exchange, so as to allow the calling party to know that the called phone set is being ringed. Once the call has been attended, the ringing loop is opened and the conversation loop is established.

"Utilization circuit".

Any circuit which is connectable to two or more of the outputs of the present invention apparatus for automatically actuating one or more devices which are electrically controllable, for example an air conditioning apparatus, one or more electric lights, an alarm, the automatic coupling of the called phone line to another different phone line, etc., always in response to the reception and validation, by the present invention aapparatus, of a code corresponding exclusively to said utilization circuit.

"To activate an utilization circuit".

In addition to its obvious meaning, related to the expression defined immediately above, it is also used herein as an equivalent of "to inactivate an utilization circuit". This may be easily understood by bearing in mind that for inactivating an electronically controllable device it is necessary to activate, through one of the outputs of the present invention apparatus, an intermediary device which in its turn will inactivate the device which is desired to control.

"Ring-back signal".

In the case of the apparatus of the present invention, it refers to a signal that is automatically sent, from the called end and by means of the present invention apparatus, to the calling phone set to advise the calling party that at the called end one of the operations that may have been ordered by the present invention apparatus has been carried out, such as the validation of a code, the fact that the called phone set has been attended, that an utilization circuit has been activated or inactivated, etc. Commonly the term "ring-back" refers to the ringing of the bell of a phone set; however in the case of the present invention it may be also an audible tone or any other acoustic, visual or other information allowing the calling party to know that such operation has been performed at the called end.

"Connected".

Indicates a direct electrical connection between two points.

"Coupled".

Indicates indistinctly a direct electrical connection or an indirect electrical connection between two points; the indirect connection may be established through one or more passive or active components such as resistors, capacitors, inductors, transistors, triacs, switches, etc., single or in combination.

"Active intervals of the ringing period".

The intervals of the ringing period during which the exchange is sending the ringing signal proper.

"Non-active intervals of the ringing period".

The intervals of the ringing period during which the exchange is not sending ringing signal; that is to say, the time comprised between two consecutive active ringing intervals. These non-active intervals are commonly called interringing intervals.

"Ringing period".

The entire period of time during which the ringing loop remains closed. In other words it is the sum of all the active plus the non-active intervals.

"To dial".

It must be interpreted in the sense of performing the operation of actuating the keys of a keyboard of the "Touch-Tone" telephonic system.

"Access code".

A code sent through the phone line by the calling party during non-active intervals of a ringing period and in response to which the apparatus of the present invention will close the conversation loop, thereafter allowing the sending of a second code intended to perform other subsequent operations.

SUMMARY OF THE INVENTION

The present invention provides a method and apparatus capable of processing coded information received through a phone line during the non-active intervals of a ringing period and which have none of the drawbacks of other methods and apparatus.

The method and apparatus of the present invention allows the called party to become aware, at the very instant at which the call is being received, if the latter has been originated or not by a person who is in possession of the or one of the pre-established codes. Once he becomes aware of the fact that the calling party is a desired one, he can still elect between answering or not the call.

This is made possible by the use of one or more pre-established codes previously given by him to certain persons whom he may want to be called by. when one of these persons needs to make such a call, he begins by "dialing" the phone number of the subscriber and, once the ringing loop has been established, he "dials" one or more code characters during one or more of the non-active intervals of the ringing period. At the called end, once the ringing loop has been established, the apparatus of the present invention, associated with the phone line of the subscriber, will receive and decode the code characters, will compare them with pre-established codes by means of preadjusted character selecting means or stored in character memory means, and thereafter will give out an indication that a call is being made and that it is originated by a calling party who is in possesion of the or one of the pre-established codes. The called subscriber, advised by said indication, may then elect to answer the call or not, but in any case he has now the knowledge that the calling party is a desired one. If more than one pre-established code is used, for example a different one for each of the desired potential calling parties, and according to certain embodiments of the invention, the apparatus may furthermore furnish a visible display of the code number that has been received from the calling party. In this case, the called party may know exactly who the calling party is by simply observing the displayed code number. According to other embodiments of the invention, the indication provided by the apparatus in response to the reception of the pre-established code, may be a differentiated acoustic signal, a light going on, or any other suitable indicating means, which may be simultaneous or not with the numerical visual display, according to the particular embodiment involved.

According to other embodiments of the present invention, the calling party, after having conventionally "dialled" the phone number of the called party and once the ringing loop has been established, will send, during one or more non-active intervals of the ringing period, a first code or access code which may comprise one or more characters. This access code is compared by the apparatus against one or more stored codes and, if the coincidence between both is met, a ring-back signal is sent to the calling party and the conversation loop is closed, after which the calling party sends a second code which, after also having been compared and validated, will furnish an indication that an authorized call is being received and, according to the particular embodiment involved, the second code number may or may not be visually displayed.

According to other embodiments, after the calling party has "dialled" the phone number and the ringing loop has been established, he "dials" thereafter the code number, which may comprise any number of characters, beginning during a non-active interval of the ringing period. However, the conversation loop is closed after the reception, at the receiving end, of the first character, the second, the third or even the fourth character of the code independently from the fact that the code is the correct one or that it has been "dialled" in the correct sequence or that it has been received within the maximum allowed time. Notwithstanding the called party will receive an indication of the fact that an authorized party is calling only when the code has been validated.

According to another embodiment, after the calling party has "dialled" the phone number and the ringing loop has been established, he "dials" thereafter the code number, which may comprise any number of characters, beginning during a non-active interval of the ringing period. However, the conversation loop is closed after a time of n seconds from the reception, at the receiving end, of the first character of the code, independently from the fact that the code is the correct one or that it has been "dialled" in the correct sequence or that it has been received within the maximum alloted time. Notwithstanding the called party will receive an indication of the fact that an authorized party is calling only when the code has been validated.

The double code system, using a first access code, is particularly useful in the case of defective phone lines, such as phone lines in which there is always present a high noise level, continuous or erratic. If the access code consists of only one character, the calling party may then send this caharacter during all the length of one non-active interval of the ringing period by pressing continuously the corresponding key of the keyboard of his phone, so as to ensure its reception even in the presence of a high noise level. If the access code comprises more than one character, he may send the various characters at the rate of one during the entire length of successive non-active intervals of the ringing period.

According to still other embodiments, once the conversation loop has been closed and in the case that the called party does not answer within a predetermined period of time, because he is not present or simply because he does not want to answer the call, the loop will be opened again after said predetermined period of time has elapsed.

Other embodiments offer the possibility of changing the codes pre-established and memorized in the apparatus. To this end the apparatus is provided with a keyboard of a type like that used in a conventional calculating machine. Changing the position of a multiple switch, it is possible to introduce into the code memories codes which are different from the previous ones.

Another embodiment is described that has the particular feature of closing the conversation loop every time a wrong code is received and is thus not validated. The purpose of this arrangement is avoid the possibility that somebody may try to find out a certain code by the try and miss method. When the phone service is a metered one or when the calling party is calling from a public phone set, every attempt will cost him money and since the case of a code of three characters there are 999 possible combinations, it is most unlikely that somebody will make the attempt. The apparatus will close the conversation loop during a short time, for example 5 seconds, after which it will automatically open the loop again thus freeing the line and the apparatus will be in condition to receive new calls.

According to its method aspect the present invention provides a method for processing coded information sent through a phone line and comprising at least one character, the method comprising the steps of: (A) normally sending from the calling end the call signals corresponding to the phone number of the called subscriber; (B) when at the calling end the calling party perceives corresponding signals advising him that ringing signals are being sent to the called apparatus in response to the closing of the ringing loop, sending through the calling apparatus at least one pre-established code signal, comprising at least one character, during at least one non-active interval of the ringing period; (C) suppressing at the receiving end the ringing signals received during the active intervals of the ringing period and letting through the code characters; (D) amplifying the code characters let through; (E) decoding said amplified code characters, comparing them with characters of memorized codes and, if the received code characters are coincidental with at least one of the memorized codes and have been received in the proper sequence and time spacing, generating a validation signal in response thereto; and (F) in response to said validation signal and before the receiver of the phone set of the called subscriber has been unhooked, activating at the called end at least one utilization circuit.

According to its apparatus aspect the present invention provides an apparatus for processing coded information comprising at least one character and received through a phone line, the apparatus comprising: (a) phone line input terminals; (b) ringing signal supressing means coupled to said phone line input terminals; (c) signal amplifying means coupled to said ringing signal suppressing means; (d) tone decoding means capable of decoding said coded characters and coupled to said amplifying means; (e) character selecting means capable of letting through the tone decoded characters coinciding with the characters of memorized codes and coupled to said tone decoding means; (f) sequence decoding means capable of validating the selected code characters in response to the reception thereof in the proper sequence and time spacing, and coupled to said character selecting means; and (g) triggering means capable, in response to the presence of a validation signal at the output of said validating means, of applying an activation signal to a corresponding output terminal to which an utilization circuit may be coupled.

BRIEF DESCRIPTION OF THE DRAWINGS

The present invention may be better understood through the following description of some of its presently preferred embodiments which are illustrated in the accompanying drawings in which:

FIG. 11 shows one possible embodiment of character selecting means usable in some embodiments of this invention;

FIG. 12 shows a possible embodiment of a power supply usable with the embodiments of the present invention;

FIG. 18 is a block diagram showing tone decoding means, similar to those of FIG. 4, but suitable for furnishing four digits binary output.

FIG. 21 is a schematic circuit diagram, partially in block form, of an embodiment of the invention in which the tone decoding means produce a binary output and the character selecting means and sequence decoding means are like those illustrated in FIG. 13, while the other functions are performed in a way similar to that of the embodiment of FIG. 20 with the exception that the second code comprises four characters instead of three;

FIG. 22 is a schematic circuit diagram, partially in block form, of a further embodiment which is suitable for the use of an access code and a second code each comprising three characters;

FIG. 23 is a schematic circuit diagram, partially in block form, of another embodiment of the invention which includes manually actuatable character selecting means, the arrangement allowing the activation of one or more external utilization circuits;

FIG. 24 is a schematic circuit diagram, partially in block form, of another embodiment of the invention suitable for the use of codes comprising several characters (eight characters in the particular example illustrated) and having an output for the activation of one or more external utilization circuits;

FIG. 25 is a schematic circuit diagram, partially in block form, of an embodiment of the invention in which the closing of the conversation loop takes place automatically in response to the first, the second, the third or the fourth character of the code, according to the adjustment of manually actuatable switching means, the closing of the conversation loop being independent from the validation of the code characters;

FIG. 27 is a schematic circuit diagram, partially in block form, which shows the possibility of changing at will one or more of the pre-established codes by means of a keyboard; furthermore it offers the possibility of controlling two or more external utilization circuits; by means of the codes received through the phone line.

FIG. 28 is a partial schematic circuit diagram, partially in block form, illustrating a device which may be incorporated with some of the other embodiments of the invention; this device is capable of furnishing protection against the possibility that someone may detect one or more of the pre-established codes, assigned for use with the apparatus, by the simple method of "try and miss", since the apparatus will automatically close the conversation loop when it detects the reception of a wrong character not forming part of any of the true codes, including the wrong position of a character with respect to the true sequence of the characters within the code;

FIG. 29 is a schematic circuit diagram illustrating another embodiment of this invention; in the present embodiment, as soon as the call has entered, acoustic and visual warnings will be emitted by the apparatus and if the calling party sends code characters during one or more of the non-active intervals of the ringing period, the code number will be displayed, and if it is validated another acoustic warning of different cadence will be emitted together with a visual warning indicating that a code has been received and validated;

FIG. 31 is a schematic circuit diagram showing another embodiment of the invention which is very similar to that illustrated in FIG. 29; however in the present embodiment, the conversation loop will be automatically closed after a pre-established time from the reception of the first character of the code and will be maintained in its closed condition during a certain pre-established time, thereafter automatically opening again.

DETAILED DESCRIPTION OF PREFERRED EMBODIMENTS

First of all it must be noted that this invention, and all its embodiments herein described, illustrated and claimed, are related to a method and apparatus requiring in all instances the sending, by the calling party, of at least one character of at least one code, during at least one non-active interval of the ringing period and thus with the ringing loop closed and the conversation loop still open.

Figure 1:
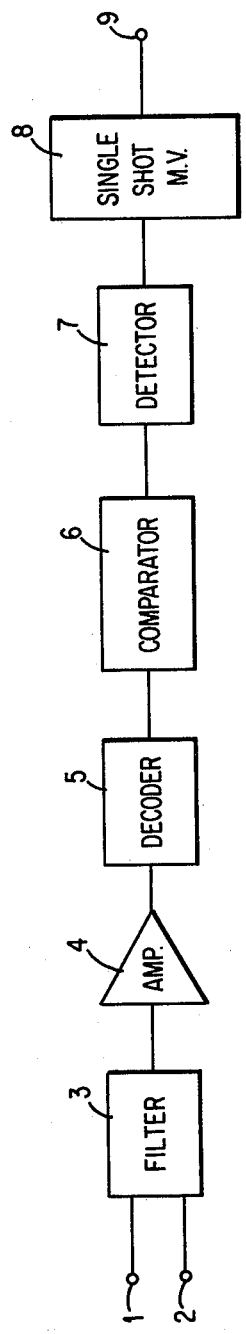
FIG. 1 is a block diagram illustrating the principle on which the present invention is based and incidentally the most simple embodiment of the invention.

FIG. 1 illustrates, by means of a block diagram, the most simple way to put the present invention into practice, and makes easier to explain its essential principles.

Terminals 1 and 2 represent the input terminals of the apparatus, that will be coupled to the phone line corresponding to the phone set with which the apparatus will be associated. The apparatus comprises filtering means 3 which may be a bandpass filter having a lower cutoff frequency substantially higher than the frequency of the ringing signal of the telephone system, or it may be a highpass filter the lower cutoff frequency of which must be also substantially higher than the frequency of said ringing signal. The output of filtering means 3 is coupled to the input of amplifying means 4 at the output of which only the frequencies corresponding to the pre-established code characters will appear substantially amplified. The output of amplifying means 4 is coupled to the input of tone decoding means 5 the output of which is coupled to the input of character selecting means 6. The output of character selecting means 6 is coupled to the input of sequence decoding means 7 and the output of the latter is coupled to the input of triggering means 8 which is capable of activating at least one output 9.

The operation of the embodiment of FIG. 1 is as follows. A calling party who wants to establish a phone communication with a phone subscriber will "dial" the normal phone number of the called subscriber and the exchange will close the ringing loop if the phone line of the called party is free. When the calling party hears the signals indicating that the subscriber is being called, he will send at least one code character during at least one of the non-active intervals of the ringing period. The ringing signals received by the apparatus of FIG. 1 through the phone line connected to the input terminals 1 and 2 will be filtered-out by the filtering means 3, while the code character or characters will reach the input of amplifying means 4 and will be amplified thereby, after which they will be applied to the input of tone decoding means 5. Since the present invention is intended to be used with code characters of the "Touch-Tone" type, the tone frequencies of each pair of tones, representing a specific code character, must be identified, this being the function of the tone decoding means. In other words, since each code character will comprise two characteristic frequencies, the combination of both must be converted to a single signal which will represent a corresponding number. The apparatus must be capable of determining if the character or characters appearing at the output of the tone decoding means 5 correspond to the characters of a pre-established code. To this end, character selecting means 6 are provided. In these character selecting means the characters appearing at the output of the tone decoding means are compared with the characters of one or more codes memorized therein and, if the received code is coincidental with the or one of the memorized codes, at the output of character selecting means 6 will appear said code characters which are then transferred to the input of sequence decoding means 7 which will determine if the sequence in which the characters are received and the time spacing between two consecutive characters are the right ones. If these conditions are met, the sequence decoding means will supply a validation signal at their output according to the specific code that has been validated. The corresponding validation signal is applied to triggering means 8, their output 9 being usable for performing any desired function, such as sending ring-back signals, furnishing warning signals, closing the conversation loop, activating utilization circuits, etc.

Figure 2:
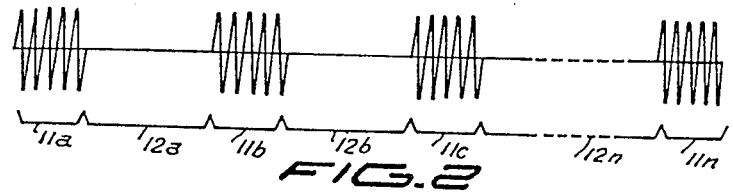
FIG. 2 is a graphical representation of the signals present on the phone line during a ringing period.

FIG. 2 is a diagram of the waveform of the ringing signal emitted by the exchange once the ringing loop has been closed. 11a, 11b, 11c . . . 11n are the active intervals of the ringing period during which the ringing signal is emitted by the exchange, while 12a, 12b . . . 12n are the non-active intervals comprised between the active intervals and during which no ringing signal is emitted by the exchange. The entire time from the beginning of the first ringing interval 11a until the ending of the last active interval 11n (that is to say the moment at which the conversation loop is closed) plus the non-active intervals 12a to 12n constitute the ringing period. This has been explained so that the operation of the different embodiments of the invention, which will be described later on, may be better understood.

Figure 3:
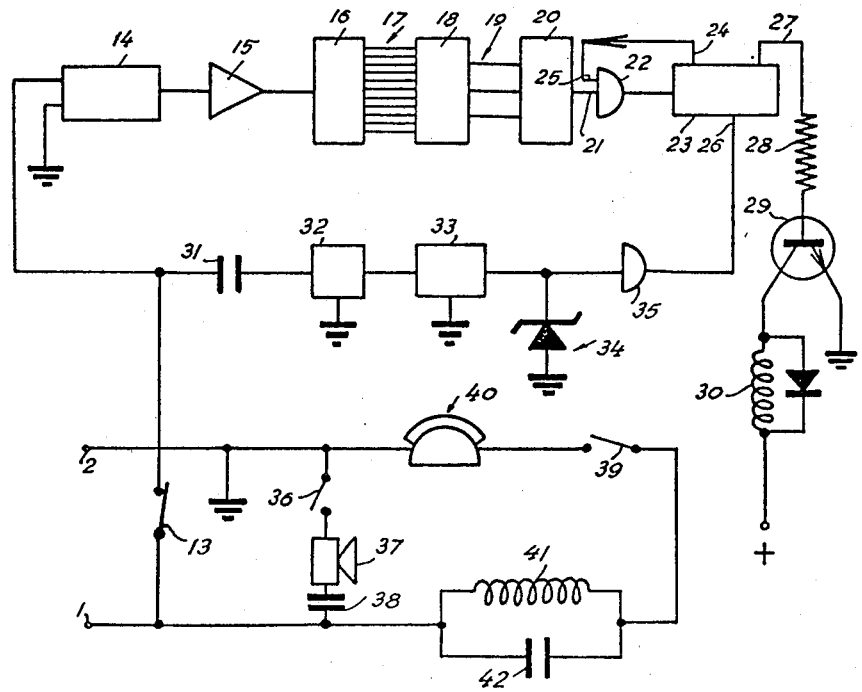
FIG. 3 is a schematic circuit, partially in block form, illustrating a first practical embodiment of the present invention.

In FIG. 3 one of the simplest practical embodiments of the invention is shown. It must be noted that not only in FIGS. 1 and 3, but also in all the other figures which will be described later on, the reference numerals 1 and 2 always indicate the input terminals of the apparatus which will be coupled to the phone line pertaining to the owner of the phone set with which the apparatus of the present invention is intended to operate. The apparatus of FIG. 3 works as follows. The calling party "dials" the normal phone number of the subscriber he wants to call. When he perceives the ringing signal indicating that the subscriber is being called, during at least one non-active interval of the ringing period he will send the character or characters corresponding to the pre-established code. Through terminals 1 and 2 and the normally closed relay contact 13, the ringing signal will be applied to the input of filtering means 14 (for example a highpass filter having a cutoff frequency of about 650 Hz) which will prevent the ringing signals from passing therethrough. However, the code characters may pass freely therethrough, reaching amplifying means 15 which will increase the level of the signals corresponding to said characters. The amplified signals will be applied to tone decoding means 16 which will translate each pair of tone frequencies (each pair represents a code character) into a corresponding single pulse. According to the particular decoded signals, the outputs (indicated in general at 17) of the tone decoding means 16 will be applied to character selecting means 18 which will determine if the received characters correspond to a pre-established code. If the pre-established code or codes are of the type comprising three characters, the character selecting means will have three outputs as indicated in general at 19 in FIG. 3. These outputs are applied to corresponding inputs of sequence decoding means 20 which will determine if the sequence in which the characters are received and the time spacing between each two consecutive characters are the right ones. If both conditions are met, at the output of the sequence decoding means a validation signal will appear, being applied to one of the inputs 21 of an "AND" gate 22 the output of which is coupled to the clock input of a flip-flop 23. The Q̄ output 24 of flip-flop 23 is applied to the other input 25 of gate 22. The events taking place when a validation signal appears at the output of the sequence decoding means 20 are as follows. The validation signal applied to the clock input of the flip-flop will change the state of this latter (when simultaneously an enabling signal is applied to the enabling input 26 of the flip-flop, as will be seen later on). Thus, an output signal will appear at the Q output 27 of the flip-flop which will be applied, through resistor 28, to the base electrode of a transistor 29 which will be brought to its conductive state, energizing relay 30.

Turning again to the ringing signal coming from the phone line, it will also be applied, through the normally closed relay contact 13 and a capacitor 31, to the input of rectifying means 32 at the output of which will appear a d.c. potential applied to the input of a smoothing filter 33. The smoothed-out d.c. potential appearing at the output of filter 33 is stabilized by a zener diode 34. This stabilized d.c. potential is applied to the input of triggering means 35 which may be, for example, a Schmitt trigger. The output of the triggering means 35 is applied to the enabling input 26 of the flip-flop 27. Thus, it may be seen that the flip-flop, to change its state, must receive not only a signal at its clock input, coming from sequence decoding means 20, but also an enabling signal at its input 26 and this latter will be present only while a ringing signal is being received at the input terminals 1 and 2. Across the input 1–2 is also connected an assembly comprising a normally open relay contact 36, indicating means 37 (which in the case illustrated are constituted by an electroacoustic transducer, and a d.c. blocking capacitor 39, all of them connected in series. The normally open contact 36 is actuatable by the relay 30. This means that the transducer 37 will emit an acoustic signal, thus warning the subscriber of the fact that a call has been received, the call including a code which has been validated by the apparatus. If the called subscriber is willing to answer the call, he closes a manually actuatable switch 39, thus connecting directly the phone set 40 to the phone line coupled to the input terminals 1 and 2. Of course, he will previously have unhooked the receiver of the phone set. This last action will energize a second relay 41 (having connected in parallel a capacitor 42). The energizing of relay 41 will open the normally closed relay contact 13, thus disconnecting the entire electronic control apparatus from the phone line. Once the subscriber has finished talking, he will hang up and open again switch 39. This will de-energize relay 41, thus closing contact 13. Thus the entire apparatus will be reset to its initial condition and will be ready to receive another call.

Figure 4:
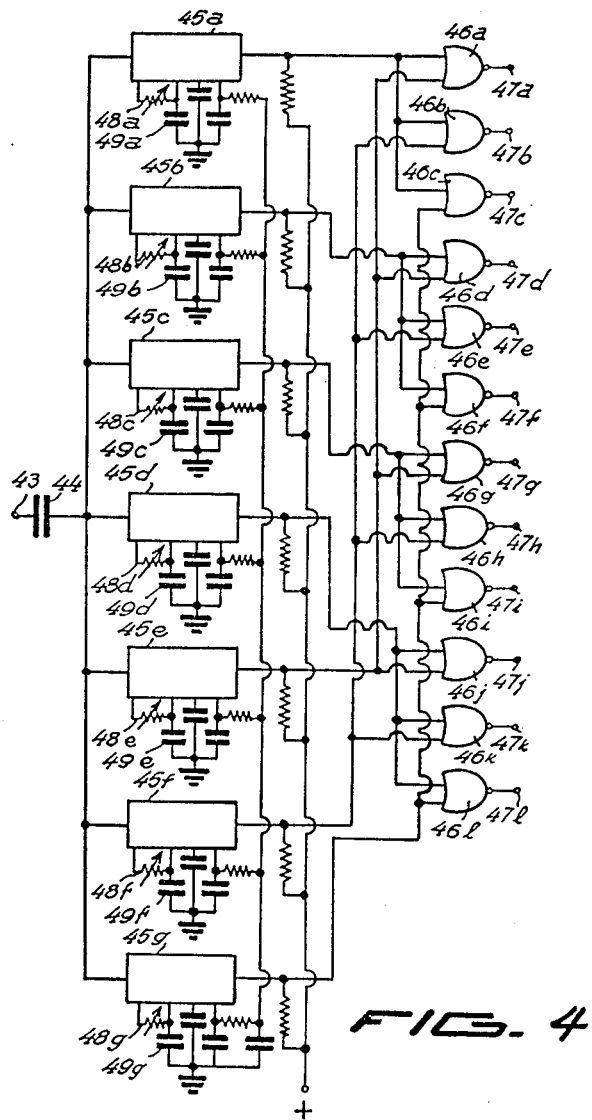
FIG. 4 shows a block diagram of tone decoding means usable in some of the embodiments of this invention.

FIG. 4 is a block diagram of a practical embodiment of the tone decoding means 16 of FIG. 3 and is also usable in other embodiments which will be described later on. The output of the amplifying means 15 (FIG. 3) is coupled to the input terminal 43 which, through capacitor 44, is coupled in parallel to the inputs of seven tone decoders 45a to 45g. To understand the operation of the tone decoding means of FIG. 4, it is convenient to review here the mode of operation of the "Touch-Tone" telephonic system.

As it is well known by the skilled in this art, each key of the keyboard of a phone set of the "Touch-Tone" system generates simultaneously, when pressed, a pair of frequencies. One of these frequencies will be one of four so called "low frequencies" (697, 770, 852 or 941 Hz) while the other frequency of this pair will be one of three so called "high frequencies" (1209, 1336 or 1477 Hz). Thus, a keyboard of twelve keys (numbers 1 to 9, ✶, 0 and #) will offer twelve possible combinations according to following Table I.

TABLE I

| KEY | L.F. (Hz.) | H.F. (Hz) |
|---|---|---|
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| ✶ | 941 | 1209 |
| 0 | 941 | 1336 |
| # | 941 | 1477 |

Each of the first four tone decoders 45a to 45d operates so as to allow the passage of a respective one of the four "low frequencies", while each of the other three tone decoders 45e to 45g allow the passage of a respective one of the three "high frequencies". In other words, each tone decoder will have its central frequency coincidental with one of the seven basic frequencies, as can be seen in following Table II.

TABLE II

| Tone decoder | Central Frequency (Hz) |
|---|---|
| 45a | 697 |
| 45b | 770 |
| 45c | 852 |
| 45d | 941 |
| 45e | 1209 |
| 45f | 1336 |
| 45g | 1477 |

Thus, each character of a code used according to the present invention will be characterized by two frequencies. In other words, for each character of the code, two frequencies will appear on the input terminal 43 while a single output pulse will appear at the output of each of two of the tone decoders. However, for the operation of the subsequent portions of the apparatus, a single pulse will be necessary, corresponding to each character of the code. Since twelve different characters can be sent by a calling party and received by the called party, twelve "NOR" gates 46a to 46l are provided. The inputs of each gate are connected to the corresponding outputs of two of the tone decoders 45a to 45g and thus at each output 47a to 47l a pulse will appear only when the two inputs of a corresponding one of gates 46a to 46l receive simultaneously the corresponding combination of one of the "low frequencies" and one of the "high frequencies" according to Table I. Let us suppose that a calling party has sent the character number "4"; thus, at terminal 43 frequencies of 770 Hz and 1209 Hz will be received. This means that a pulse will appear at the output of the tone decoder 45b and another at the output of the tone decoder 45e. The only "NOR" gate which has one of its inputs connected to the output of the tone decoder 45b and its other input connected to the output of the tone decoder 45e is "NOR" gate 46d. Thus, only at the output 47d a signal will appear corresponding to the originally sent numerical character "4". All the possible combinations are listed in following Table III.

TABLE III

| Code character represented | Frequencies applied to input teminal 43 (Hz) | Involved tone decoders | Activated "NOR" gate | Activated output |
|---|---|---|---|---|
| 1 | 697 | 45a | 46d | 47a |
|   | 1209 | 45e |   |   |
| 2 | 697 | 45a | 46b | 47b |
|   | 1336 | 45f |   |   |
| 3 | 697 | 45a | 46c | 47c |
|   | 1477 | 45g |   |   |
| 4 | 770 | 45b | 46d | 47d |
|   | 1209 | 45e |   |   |
| 5 | 770 | 45b | 46e | 47e |
|   | 1336 | 45f |   |   |
| 6 | 770 | 45b | 46f | 47f |
|   | 1477 | 45g |   |   |
| 7 | 852 | 45c | 46g | 47g |
|   | 1209 | 45e |   |   |
| 8 | 852 | 45c | 46h | 47h |
|   | 1336 | 45f |   |   |
| 9 | 852 | 45c | 46i | 47i |
|   | 1477 | 45g |   |   |
| * | 941 | 45d | 46j | 47j |
|   | 1209 | 45e |   |   |
| 0 | 941 | 45d | 46k | 47k |
|   | 1336 | 45f |   |   |
| # | 941 | 45d | 46l | 47l |
|   | 1477 | 45g |   |   |

The central frequency of each tone decoder 45a to 45g may be adjusted to its corresponding value by means of the R-C combination of resistance and capacitance represented by the sets of resistor and capacitor 48a-49a to 48g-49g, respectively.

Figure 5:
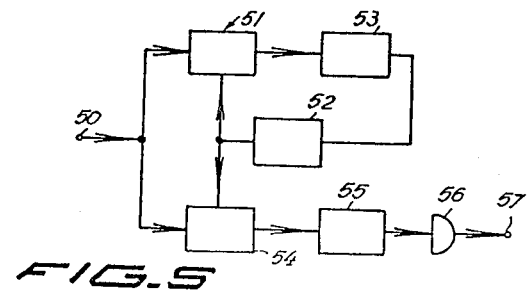
FIG. 5 is a block diagram showing an embodiment of one of the tone decoders used in the tone decoding means of FIG. 4.

FIG. 5 is a functional diagram in block form of any one of the tone decoders 45a to 45g of FIG. 4. The input terminal 50 corresponds to the input of a decoder which, in FIG. 4, is connected to the input terminal 43 through capacitor 44. This input terminal 50 applies any input signal, simultaneously comprising two frequencies, to the input of phase comparing means 51. Voltage controlled oscillation generating means 52 apply at the same time their output signal to a second input of phase comparing means 51. It will be understood that the oscillator 52 is basically designed to generate a frequency equal to one of the two frequencies of a pair corresponding to a code character; however, the frequency of oscillator 52 may differ slightly from the frequency of the received tone which must be decoded. Phase comparing means 51 compare the frequencies received from the input terminal 50, with the output frequency of oscillator 52 and produce an output proportional to the difference between both frequencies; this difference frequency is applied to a lowpass filter 53. The output voltage of this latter is applied to the control voltage input of oscillator 52, correcting its frequency in order to match it with the desired one of the two frequencies of the input signals received at input terminal 50. At the same time, the signals received at said input terminal 50 are applied to a first input of a quadrature detector 54 having a second input to which the output of oscillator 52 is also applied. The quadrature detector 54 detects the phase error between the two frequencies applied thereto. If this error is very small or even null (which is the necessary requirement for producing a phase locking condition), a low state will appear at the output of the quadrature detector 54. This low state will be filtered by a lowpass filter 55 and thereafter will be applied to trigger means 56 that will square the output signal appearing at the output terminal 57. This output terminal 57 corresponds to the output of any of the tone decoders 45 in FIG. 4.

It must be understood that any of the pairs of frequencies listed in Table I may appear at the input terminal 50. It must also be remembered that the oscillator 52 of a particular one of the decoders 45 will be designed to generate only one of the specific frequencies of one of the possible pairs of frequencies which may appear at the input terminal (43 in FIG. 4 or 50 in FIG. 5) of the tone decoder. When both frequencies appearing at the input are far from the frequency generated by oscillator 52, the products of each of these frequencies with the frequency of the oscillator will be too much out of the passband of filter 53. Thus, the signal appearing at the output of this latter will not have enough amplitude to be able to correct the frequency of the oscillator and produce a phase locking condition. Such a case will arise when neither of the frequencies of the pair corresponds to the involved particular tone decoder. The other possibility is that a pair of frequencies is received at the input terminal, one of said frequencies being equal or very near to the frequency which this particular tone decoder has been designed for. Let it be assumed that the oscillator is designed to work with the lowest of the two frequencies of the pair. Then, the heterodination product of the highest frequency of the pair and the frequency of oscillator 52 will not produce a high enough level, of the signal appearing at the output of filter 53, to produce a phase locking condition between both signals. However, the heterodination product between the lowest frequency of the pair and the frequency generated by the oscillator will pass substantially freely through filter 53, its output being applied to the voltage controlled oscillator 52 so as to make the frequency generated thereby substantially equal to that of the lowest of the two incoming frequencies. Thus, two identical frequencies will be simultaneously applied to the quadrature detector 54: the lowest of the two frequencies applied to its first input and the output frequency of oscillator 52 applied to its other input. This will produce a zero beat condition. This is equivalent to saying that a low state will appear at the output of the quadrature detector. This signal will pass through the lowpass filter 55 and will be applied to the trigger means 56. Thus, the signal appearing at the output terminal 57 will be a d.c. pulse corresponding to the decoded tone and will be applied to the corresponding input of the associated "NOR" gate 46 (FIG. 4). If this gate receives simultaneously at its other input the output signal of another tone decoder designed to furnish an output in response to the highest of the two frequencies of a pair, an output signal will appear on the corresponding output terminal 47 of the tone decoding means of FIG. 4.

The skilled in this art will easily understand that the tone decoders may also be implemented in other ways than the one illustrated in FIG. 5, each tone decoder being only required to be capable of fulfilling the necessary function described above, so as to be usable as tone decoding means in embodiments such as the one illustrated in FIG. 3 or other embodiments to be herein described later on.

Figure 6:
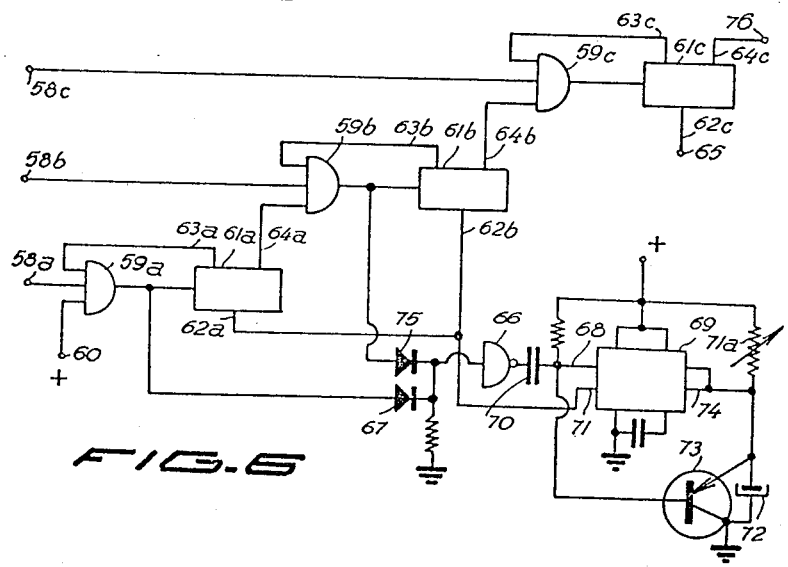
FIG. 6 is a schematic circuit, partially in block form, illustrating a practical embodiment of sequence decoding means usable in some of the embodiments of this invention.

In FIG. 6 is shown, partially in block form, a circuit diagram of the sequence decoding means 20, "AND" gate 33 and flip-flop 23 of FIG. 3. This embodiment may be also used in the implementation of other embodiment of the present invention which will be described later on in the present specification.

As can be seen in FIG. 6, the sequence decoding means comprise three input terminals 58a, 58b and 58c. A first "AND" gate 59a has a first input couples to the input terminal 58a and a second input coupled to a fixed reference potential indicated by means of terminal 60. When the character selecting means 18 (FIG. 3) furnish at their first output a signal which will thus be applied to input terminal 58a, this will produce a signal which will be transferred from the output of "AND" gate 59a to the clock input of a flip-flop 61a producing a change of state thereof when at the same time (as will be seen later on) an enabling signal is being applied to its enabling input 62a. The $\overline{Q}$ output 63a of this flip-flop, which was previously enabling "AND" gate 59a through the third input thereof, will now block it, so that any further signal appearing at the input terminal 58a will have no further effect.

At the sametime, the change of state of flip-flop 61a will produce at its Q output 64a a signal which will be applied to a first input of a second "AND" gate 59b, a second input of which is connected to the input terminal 58b. When a second code character subsequently appears at the output of the character selecting means 18, the corresponding signal will be applied to the second input terminal 58b and thus to the second input of "AND" gate 59b. The third input of this gate is also receiving an enabling signal from the $\overline{Q}$ output of a second flip-flop 61b. Thus, the input signal applied to terminal 58b will produce at the output of "AND" gate 59b an output signal which will be applied to the clock input of flip-flop 61b producing a change of state thereof, so that its $\overline{Q}$ output 63b will apply a blocking signal to the third input of "AND" gate 59b blocking it and preventing any further signal applied to the input 58b from being capable of exerting any further effect. When a third character of the code appears at the third output of the character selecting means 18, the corresponding signal will be applied to the input terminal 58c and thus to one of the inputs of a third "AND" gate 59c which is also receiving an enabling signal from the Q output 64b of flip-flop 61b and from the $\overline{Q}$ output 63c of a third flip-flop 61c. Thus, "AND" gate 59c will produce an output signal which will be applied to the clock input of flip-flop 61c producing a change of state thereof. In response to this change of state, the $\overline{Q}$ output 63c will apply a blocking signal to the third input of "AND" gate 59c so that any further signal applied to input terminal 58c will produce no further effect.

The enabling of the flip-flops takes place in the following way. The enabling of the third flip-flop 61c will be produced, through its enabling input 62c, when the ringing signal (see FIG. 3) received at terminals 1-2 produces an output of the trigger means 35, since the enabling input 62c is connected to the output thereof, and terminal 65 corresponds to the enabling input 26 of flip-flop 23 of FIG. 3. The enabling of the other flip-flops 61a and 61b takes place in another way. The output of "AND" gate 59a, when a signal appears thereat, is applied to the input of an inverter gate 66 through a diode 67. The output of inverter gate 66 is applied to the trigger input 68 of a retriggerable monostable 69 through a capacitor 70. The output 71 of monostable 69 applies an enabling signal to the enabling inputs 62a and 62b of flip-flops 61a and 61b, thus enabling them. However, monostable 69 has a definite time constant established by the R-C combination of the variable resistor 71a and the capacitor 72. The variable resistor 71a allows the adjustment of the time constant to the desired value. In parallel with capacitor 72 a transistor 73 is connected. When inverter 66 applies a pulse (which is very brief) to the base electrode of transistor 73, this latter will start conducting, thus discharging capacitor 72. However, since the pulse is very short, transistor 73 will promptly stop conducting and capacitor 72 will begin again its charging, requiring therefore a certain time determined by the R-C constant. When the charge of capacitor 72 reaches a certain predetermined potential applied to a control input 74 of monostable 69, the state of this latter will be reverted to the original one, thus no longer applying an enabling signal to inputs 62a and 62b of flip-flops 61a and 62b, respectively, which will be reset. However, if the second character of the code arrives at the second input terminal 58b before capacitor 72 has acquired its full charge, the signal appearing at the output of the second "AND" gate 59b will be applied to the input of the inverter gate 66 through diode 75, transistor 73 becoming conductive, thus discharging capacitor 72. At the same time, the pulse applied to the input 68 of monostable 69 will retrigger this latter and an enabling signal will be applied to both flip-flops 61a and 61b enabling them. This enabling action will end once capacitor 72 has become fully changed again.

Thus, it may be seen that the sequence decoding means exert a double action. In the first place, if the characters do not appear in the proper sequence at terminals 58a to 58c, no validation signal will appear at the output terminal 76 of flip-flop 61c (equivalent to output 27 of flip-flop 23 of FIG. 3). Assuming that the code used is number 841, if the characters thereof successively appear at input terminals 58a to 58c in the order 8-1-4 instead of 8-4-1, the character corresponding to number 8 will appear correctly at input terminal 58a, but number 4 will be applied to terminal 58c instead of terminal 58b, and number 1 will be applied to terminal 58b instead of terminal 58c. In other words, input terminals 58a to 58c will be activated in the wrong order (first, terminal 58a, then terminal 58c and then terminal 58b) instead off being activated in the right order: 58a, 58b and 58c. Thus, no validation signal will appear at the output terminal 76.

In the second place, no validation signal will appear at the output terminal 76 if too much time elapses between the reception of any one of the code characters and the subsequent one. After the first character has been received, at input terminal 58a, the second one must be received at input terminal 58b before capacitor 72 has become fully charged, since otherwise flip-flop 61b will not be enabled.

Figure 7:
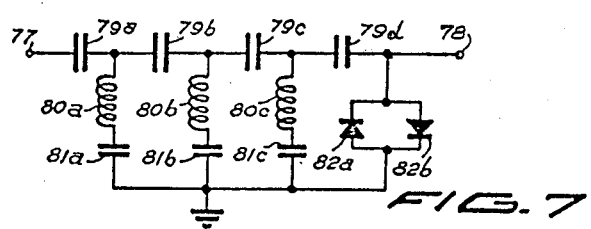
FIG. 7 is a schematic circuit showing one possible embodiment of an input stage for suppressing the ringing signal received from the phone line.

In FIG. 7 one possible embodiment of filtering means 14 shown in FIG. 3 is illustrated. The function of these filtering means is to filter-out the ringing signal sent out by the exchange once the ringing loop has been closed, while letting pass freely through them the signals corresponding to the code characters. The embodiment of FIG. 7 comprises a highpass filter of the elliptical type (Cauer type) of three zeros, having a cutoff frequency of about 650 Hz. This frequency is lower than the lowest tone frequency used in the "Touch-Tone" telephone system, which is 697 Hz (see Table I), but it is substantially higher than the highest frequency used in any country for the ringing signal. Input terminal 77 corresponds to the input terminal of filtering means 14 of FIG. 3, connected to the phone line input terminal 1 through contact 13, while output terminal 78 corresponds to the output of said filtering means 14, being connected in FIG. 3 to the input of the amplifying means 15.

It comprises four capacitors 79a, 79b, 79c and 79d connected in series between input terminal 77 and output terminal 78. To each joint between two consecutive capacitors a corresponding series assembly is connected, each one of said assemblies being constituted by a corresponding inductor 80a to 80c and a corresponding capacitor 81a to 81c respectively, the other end of each assembly 80-81 being connected to ground. Between output 78 and ground is also connected a protecting assembly comprising two diodes 82a and 82b connected in parallel one with the other but in opposite polarity relationship, and limiting the signal applied to the amplifying means to a safe value.

Figure 8:
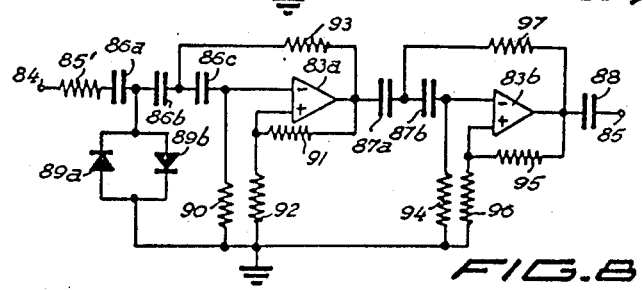
FIG. 8 shows another possible embodiment of such an input stage.

In FIG. 8 another possible embodiment of filtering means 14 of FIG. 3 is illustrated. It is, also in this case, a highpass filter but based on the use of two operational amplifiers 83a and 83b. This filter is a variant of the one proposed by Sauen and Key adapted to have a cutoff frequency of about 650 Hz. The input signal is applied to input terminal 84, while the output of this filter stage is represented by output terminal 85. The input signal goes through a resistor 85' and thereafter through three capacitors connected in series 86a, 86b and 86c. From the latter, the input signal is applied to a first input of the first operational amplifier 83a, the output of which is coupled through two capacitors connected in series 87a and 87b to a first input of the second operational amplifier 83b, the output of which is connected to the output terminal 85 through a capacitor 88.

The input signal is limited to a safe value by means of two diodes 89a and 89b which are connected in parallel one with the other but in opposite polarity relationship. A resistor 90 is connected between the first input of the first operational amplifier and ground. Another resistor 91 is connected between the output of the first operational amplifier 83a and its second input, and a resistor 92 is connected between this second input and ground. A feedback resistor 93 is connected between the output of the first operational amplifier 83a and the junction point between capacitors 86b and 86c. A similar arrangement is provided for the second operational amplifier 83b, with a resistor 94 connected between the first input of the amplifier and ground. A resistor 95 is connected between the output and the second input of this amplifier and another resistor 96 is connected between said second input and ground. A feedback resistor 97 is connected between the output of the second amplifier and the junction point between capacitors 87a and 87b. The function of this filter is similar to that of the filter of FIG. 7, preventing the passage of the ringing signals and allowing the free passge of the code character signals.

Figure 9:
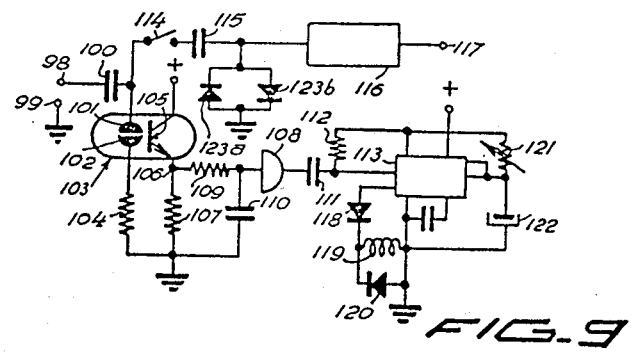
FIG. 9 shows still a third possible embodiment of an input stage.

In FIG. 9 a device is illustrated which has the same function of stopping the ringing signal and letting through the code character signals. However, it is not, strictly speaking, a true filter but rather an electromechanical switching device. Notwithstanding, it produces the same end results as the other two embodiments described above, and thus it works like a filter. When the first wave train of ringing signal is received during the first active interval of the ringing period, the ringing signal received through input terminals 98 and 99 (connected to input terminals 1 and 2 corresponding to the incoming phone line) is applied through capacitor 100 to the electrodes 101 and 102 of a neon light forming part of an optoelectronic coupler 103, and resistor 104, producing the illumination of the neon light. The light thereof activates the phototransistor 105, developing an electric potential at point 106 by means of resistor 107. This potential is applied to the input of a Schmitt trigger 108 through resistor 109. This potential is a pulsating one at point 106; however it is smoothed-out by resistor 109 and capacitor 110. The triggering of 108 produces a high state at its output, which produces no effect, through capacitor 111 and resistor 112, on a monostable device 113 which is triggered only by the trailing edge of a pulse. Since the contact 114 is a normally open contact of a relay, no ringing signal will be applied, through capacitor 115, to the input of a highpass filter 116 having a cutoff frequency of about 650 Hz. Thus, no ringing signal can appear at output terminal 117. It must be noted here that input terminals 98 and 99 correspond to the input terminals of filtering means 14 of FIG. 3, while the output terminal 117 corrresponds to the output thereof.

When the wave train of the first active interval of the ringing period comes to its end and a non-active interval begins, the neon light will go out, the phototransistor will be no longer activated, no positive potential will be applied to the input of trigger 108 and thus the output thereof will go from a high to a low state, and thus the trailing edge of the output pulse will trigger monostable 113 the output of which goes from a low state to a high one and will thus, through a diode 118, energize a relay 119 having in parallel therewith a protecting diode 120. The normally open contact 114 is associated with this relay 118. The energizing of the relay will close said contact 114 allowing any code character signal, received during non-active intervals of the ringing period, to be applied, through capacitor 115, to the input of filter 116, reaching output terminal 117.

However, in the absence of suitable means, the monostable device 113 would remain triggered even if a new wave train of ringing signals would have appeared on input terminals 98-99. To obviate this, the monostable device 113 is provided with an R-C network furnishing a time constant and comprising a variable resistor 121 and a capacitor 122. By means of variable resistor 121, the time constant is adjusted so as to be slightly shorter than the duration of a non-active interval of the ringing period; if the non-active interval is, for example, 4 seconds, the time constant will be adjusted to about 3.6 seconds so as to be approximately 10% shorter than the duration of the non-active interval. After this time, the monostable device returns to its stable state remaining ready to be retriggered again. This means that contact 114 will work like an on-off switch, which will close during each non-active interval of the ringing period, allowing the free passage of code characters sent during said non-active interval, and will open during each active interval, blocking the passage of the ringing signal. The level of the signal applied to the input of the highpass filter 116 is limited to a safe value by means of a pair of diodes 123a and 123b connected in parallel one with the other but in opposite polarity relationship.

Figure 10:
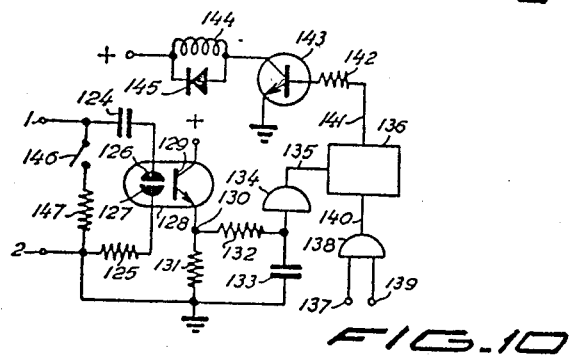
FIG. 10 is a schematic circuit, partially in block form, of a line releasing automatic device usable in some embodiments of this invention.

FIG. 10 is a schematic circuit diagram of an automatic line release device. When a device of this kind is incorporated to some of the practical embodiments which will be described later on or to the embodiment illustrated in FIG. 3, it will become impossible, for a calling party, to hold indefinitely busy the line when his call is not answered. After a pre-established number of ringing wave trains has been received, that is to say, after a predetermined number of active intervals of the ringing period have elapsed, the device of FIG. 10 will automatically close in an electrical manner the conversion loop (simulating the condition that a human being was unhooked the receiver of the phone set), and immediately thereafter it will open again said loop. If the calling party wants to insist in his call, he must "dial" again the phone number of the subscriber; in other words, he must restart the entire operation. The device illustrated in FIG. 10 operates in the following way.

Input terminals 1 and 2 are connected to the phone line. When a call is received and the exchange closes the ringing loop, the voltage of the ringing signal will be applied, through a capacitor 124 and a resistor 125, to the electrodes 126 and 127 of the neon light section of the optoelectronic coupler 128. The neon light will be lighted, activating the phototransistor section 129. Thus, at point 130 a high state will appear due to the voltage developed on resistor 131. This is a pulsating d.c. voltage which is smoothed-out by a resistor 132 and a capacitor 133 and then it is applied to the input of a Schmitt trigger 134 which will shape the input pulse into an output pulse having very steep leading and trailing edges, which is applied to the clock input 135 of a decimal counter 136. At the same time, at a first input 137 of an "AND" gate 138 a high state will be applied by the ringing signal which will be present at the zener diode 34 of FIG. 3 or any equivalent point in any of the other embodiments which will be described later on, while another high state will be applied to the other input 139 of gate 138 when the code signal has been validated. Thus, when both high states are applied to the inputs 137 and 139 of gate 138, at the output of this latter will appear a high state which will be applied to the clear input 140 of the decimal counter 136 which will be enabled to start a count. Each time a ringing wave train (active interval of the ringing period) is received at terminals 1 and 2, the decimal counter 136 will be advanced one step of the count. After a predetermined number of ringing wave trains has been received, for example nine, at the output 141 of decimal counter 136 a high state will appear. Said high state will be applied, through resistor 142, to a transistor 143 which will become conductive, thus energizing a relay 144 having a protective diode 145 connected in parallel therewith. The energizing of relay 144 will produce the closing of the normally open contact 146, connecting resistor 147 in parallel with the phone line 1-2 and bringing about conditions which are equivalent to unhooking the receiver of the phone set and closing the conversion loop. Actually, resistor 147 will have a resistance value equivalent to the impedance presented by a conventional phone set when its receiver is in its unhooked condition. Once the conversation loop has been closed, the exchange stops sending the ringing signal. Thus, a high state will no longer be applied to input 137 of gate 138 and this gate will no longer apply a high state to the clear input of decimal counter 136 which will be reset, ready to begin a new count in response to a new call.

The automatic line release device of FIG. 10 is not an indispensable item for the implementation of the embodiments of the invention which will be described later on; however it is a very useful one. The skilled in the art will be able to design other devices fulfilling the same function of the one illustrated in FIG. 10.

In FIG. 11 a possible practical embodiment of the character selecting means 18 of FIG. 3 (also usable with other embodiments which will be described later on) is shown. This embodiment of the character selecting means makes use of simple multiposition selector switches, one for each code character. FIG. 11 illustrates the particular case when using a code comprising three characters, thus incorporating three selector switches. In the case of an apparatus designed for a code consisting of two characters, only two of these switches would be used. In the case of codes comprising a number of characters greater than three, a correspondingly greater number of switches would be used, but always based on the same general circuit relationships illustrated in FIG. 11. The embodiment shown in FIG. 11 is very simple, economical, operates safely and allows the user of the apparatus to change at will the codes being used.

While FIG. 11 could be considered as self-explanatory, due to its obvious simplicity, an example will be given based on the positions of the movable contacts of the switches shown in FIG. 11. In this case the character selecting means are programmed for the three character code 396. It must be noted that, considering the movement in counterclockwise direction of the movable contacts 148a, 148b and 148c of switches 149a, 149b and 149c, the first fixed contacts 150a, 150b and 150c correspond to the code character "1" and so on. The three last fixed contacts (always considering the counterclockwise direction) of each switch will thus correspond to the characters "*", "0" and "#" respectively, according to the keys of the keyboard of a conventional phone set of the "Touch-Tone" system. The inputs of the character selecting means are indicated at 151a to 151l, while its outputs are indicated at 152a, 152b and 152c. Said input terminals are connected to the corresponding twelve outputs of tone decoding means 16 of FIG. 3 (or other equivalent means used in other embodiments of this invention), while the three outputs 152a to 152c are connected to the corresponding three inputs (for the case of a three character code) of sequence decoding means 20 of FIG. 3 (or other equivalent thereof).

If the three characters 3, 9 and 6 of the code 396 of this example are successively sent by the calling party during at least one of the non-active intervals of the ringing period, the first decoded character 3 will appear at input terminal 151c and will go to the output terminal 152a because the moving contact 148a of switch 149a is the only one offering a pathway thereto. When the second character 9 is decoded, it will appear at input terminal 151i and will go to output terminal 152b because the moving contact 148b of switch 149b is the only one offering a pathway thereto. When the third character 6 is decoded, it will appear at input terminal 151f finding its way to output terminal 152c through moving contact 148c of switch 149c.

If another code is received and decoded, such as 257, the individual characters 2, 5 and 7 will successively appear on input terminals 151b, 151e and 151g. It can be easily seen that no way to any of the output terminals is offered by the switches to any of these characters.

It is interesting to see what happens if a code is received and validated, comprising the same digits as those of the first example, but arranged in another order, such as the code 963 (instead of 396). In this case it can be seen that each of said characters will find its way to an output terminal 152. However the *first character* of this code, 9, will appear on the second output terminal 152b instead of the first one. Thus, the *first character* will be applied to the second input 58b of sequence decoding means 20 of FIG. 3 (see specially FIG. 6 remembering its operation). It will be remembered that the characters must appear in the right sequence, that is to say, the first character on the first input terminal 58a (FIG. 6), the second one on the second input terminal 58b and the third one on the third input terminal 58c. It will also be remembered that if this order is not satisfied, no validation output signal will appear on the output terminal 76 of the sequence decoding means. It may be seen that the order is not met for this code 963, but only for the code 396 for which the character selecting means are programmed.

Another special case arises when the used code contains two or three times the same character successively repeated, such as code 222. In this special case, every moving contact 148 will be associated with the second fixed contact of each switch. In response to the first character 2 of the code, a signal will be applied to the second input terminal 151b and will simultaneously find its way to the three output terminals 152a, 152b and 152c. This means that the three inputs 58a, 58b and 58c of the sequence decoding means (see FIG. 6) will receive simultaneously a signal. However, only that applied to the first input terminal 58a will have effect, since at the start of the operation the "AND" gate 59a will be the only enabled one. The other two signals applied to the other inputs 58b and 58c will have no effect, since the corresponding "AND" gates 59b and 59b are still blocked. When the second character 2 arrives at the input terminal 151b (FIG. 11) the same conditions will be repeated at the character selecting means. That is to say, a signal will simultaneously appear on the three outputs 152 and will thus be applied also simultaneously to the three inputs 58 of the sequence decoding means (FIG. 6). However, *after* the reception of the first character, the first gate 59a will have been disabled, while the third gate 59c will have not yet been enabled. Thus, the only input signal which will exert its effect will be one applied to the second input terminal 58b. If now the third code character 2 is received and decoded, it will still be applied to the same input terminal 151b and will thus simultaneously appear at the three output terminals 152. In other words, it will also be simultaneously applied to the three input terminals 58 of the sequence decoding means (FIG. 6). However, since the first and the second character have both been already received, the first and the second "AND" gates 59a and 59b will be now blocked, while the third gate 59c will be now enabled, thus producing the change of state of the third flip-flop 61c and a validating signal will appear on the output terminal 76.

Thus, it may be seen that while character selecting means 18 (FIG. 3) validate the individual characters of the code, without taking into account the order or sequence in which they are received, sequence decoding means 20 take care of the order or sequence in which the characters are received (and also of the maximum time spacing between the reception of each two successive characters).

The character selecting means described with reference to FIG. 11, using purely electromechanical means (selector switches), could obviously be replaced by purely electronic means (as will be seen later on). However, this system using mechanical switches is simple, sturdy, economical, and furthermore allows the change of the code at the will of the user.

The skilled in this art will easily understand that in the case of an apparatus designed for only one fixed code, the character selecting means embodiment of FIG. 11 may be simply replaced by a set of fixed jumpers. For example, in the case of the code "396", a set of three jumpers will be provided. The first jumper will be provided so as to couple the output terminal 47c of the tone decoding means of FIG. 4 with the input terminal 58a of the sequence decoding means of FIG. 6. The second one will couple the output terminal 47i of the time decoding means with the input terminal 58b of the sequence decoding means. And the third one will couple the output terminal 47f with the input terminal 58c of the sequence decoding means. However, such an arrangement will accept only one fixed code. If the tone decoding means have a set of twelve output sockets corresponding to the twelve outputs thereof and the sequence decoding means have a set of three input sockets corresponding to their three inputs, a set of three jumper wires may be used, each provided with a suitable plug at each end. In this way, the code may be changed by varying the position of the jumpers in a similar way to the switching which may be performed with the arrangement of FIG. 11.

FIG. 12 is a schematic circuit diagram, partially in block form, corresponding to a possible embodiment of a power supply unit usable for feeding the necessary voltages to the different components of any of the embodiments of the apparatus herein described and illustrated. This power supply is more or less conventional and does not form part per se of the invention. It comprises a voltage reducing transformer 153 having a primary winding 153'. One end of the primary winding is connected to the input terminal 154 through a main on-off switch 155, while its other end is connected to another input terminal 156 through a fuse 157. The input terminals are connectable to the domiciliary electric mains of 100 V a.c. Transformer 153 has also a secondary winding 158 having a centertap 159 connected to ground. To one of the ends of the secondary winding 158 the anode of a first rectifying diode 160 is connected, while to its other end the anode of a second rectifying diode 161 is connected, the cathodes of both diodes being connected in parallel. The cathodes of the rectifying diodes are connected to the anode of a diode 162 and they are also connected, through a resistor 163, to the anode of another diode 164. The cathodes of both diodes 162 and 164 are connected in parallel, and are also connected in parallel to the corresponding inputs of two conventional voltage regulating means 165 and 166. From the output of resistor 163 to ground a nickel-cadmium (or other similar) battery 167 is connected so as to be permanently in a floating charging condition. In case a failure develops in the current supply of the mains (154-156), the battery 167 will supply the necessary voltage to the inputs of the voltage regulating devices 165 and 166. The output of the first voltage regulating device 165 is connected to the output terminal 168, and the output of the other voltage regulating device 166 is connected to the output terminal 169. Electrolytic capacitors 170, 171, 172 and 173 are filtering capacitors. While this power supply is very simple, it is capable of supplying good regulated output voltages with a very low hum level.

Figure 13:
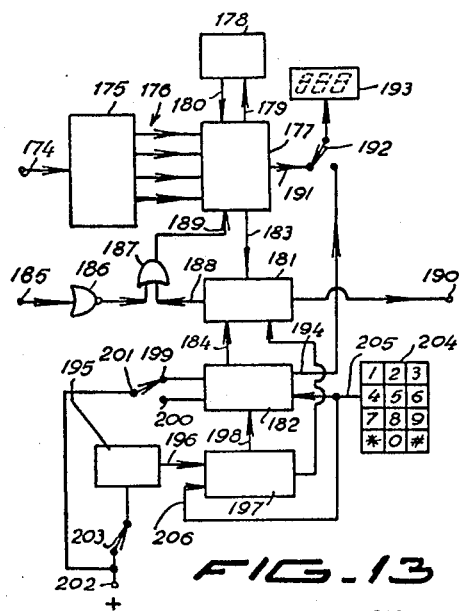
FIG. 13 is a block diagram showing the combination of character selecting means and sequence decoding means usable in several embodiments of this invention.

FIG. 13 is a block diagram of a special embodiment which combines and replaces the tone decoding means 16, the character selecting means 18, the sequence decoding means 20, the "AND" gate 22 and the flip-flop 23 of the embodiment of FIG. 3. The input terminal 174 corresponds to the output terminal of amplifying means 15 of FIG. 3. The code characters appearing at this input terminal 174 are applied to the tone decoding means 175, being converted to binary code characters at the outputs indicated in general at 176. These binary characters are applied to corresponding inputs of code accumulating means 177. An interdigits timer 178 receives at its input 179 the binary character signals in the same succession they entered code accumulating means 177 and determines if the code characters have been received in succession within a pre-established time. If the time elapsed between the reception of two successive code characters (between the first and the second one, or between the second and the third, in the case of a three character code) is longer than the pre-established time interval, the interdigits timer 178 will send, through its output 180, a reset signal to the code accumulating means 177, resetting them and thus erasing the information accumulated therein.

This embodiment comprises also comparing means 181 and random access memory means 182. Comparing means 181 compare the information received from the output 183 of code accumulating means 177 with pre-established codes memorized in the random access memory means 182 and received therefrom through 184. This arrangement comprises a second input terminal 185 corresponding to the output of the Schmitt trigger 35 of FIG. 3. When this latter furnishes an output signal, it will indicate that a call is being made and that a ringing signal is being received. The ringing signal voltage is applied to the input of an inverter 186, its output being applied to one of the inputs of an "OR" gate 187, the other input of this latter being coupled to a non-validation output 188 of comparator 181. The output of "OR" gate 187 is applied to a reset input 189 of the code accumulating means 177. Comparing means 181 have also a validation output connected to output terminal 190 equivalent to the output 27 of flip-flop 23 (see FIG. 3). The code accumulating means 177 also have an output 191 connected to one of the fixed contacts of a manually actuatable inverter switch 192, the movable contact of this latter being associated with a conventional display device of the type of seven segments 193. The other fixed contact of switch 192 is coupled to an output 194 of the random access memory means 182 which are sequentially scanned by oscillation generating means 195, the output 196 of these latter being applied to the clock input of counter means 197. The output 198 of these latter is applied to a sequential scanning input of random access memory means 182. These latter have two inputs: a write control input 199 and a read control input 200, which are connected to corresponding fixed contacts of a manually actuatable inverting switch 201 having its movable contact connected to a terminal 202 which receives a fixed reference positive potential from the power supply. Oscillation generating means 195 receive their positive supply voltage from the same terminal 202 through one of the fixed contacts of a two position selector switch 203. The three switches 192, 201 and 203 may be mounted advantageously in tandem.

The embodiment of FIG. 13 includes also a keyboard 204 comprising the same key arrangement as that of the keyboard of a conventional phone set of the "Touch-Tone" type and capable of generating corresponding code characters to be introduced into the random access memory means 182. The output 205 of this keyboard is coupled to a code change input of said random access memory means 182 and also to a control input 206 of counter means 197.

As long as no ringing signal is present on input terminal 185, the code accumulating means 177 will be held in their reset condition through inverter 186 and "OR" gate 187. When a call is received through the phone line input terminals 1 and 2 (FIG. 3), the corresponding pulse at the output of the Schmitt trigger 35 will be applied, through terminal 185, inverter 186 and "OR" gate 187, to the enabling input 189 of code accumulating means 177, thus enabling them. The code signals being subsequently received during the non-active intervals of a ringing period will be fed to the binary output tone decoding means 175 by way of terminal 174 and will appear, suitably decoded, at the outputs 176 thereof, thereafter entering code accumulating means 177. When the first code character enters these latter means, the interdigits timer 178 will receive a pulse that will start it. If the second character is not received within the pre-established time, timer 178 will apply a signal to the code accumulating means resetting them. It must be noted that the three switches 192, 201 and 203 are illustrated in FIG. 13 in the "read" mode position. The received character will be applied through switch 192 to the display device 193 which will visually display it. At the same time, through their output 183, code selecting means 177 will apply the received code signals to comparing means 181. Since the random access memory means 182 are sequentially scanned by the counter means 197, comparing means 181 will receive in succession all the codes memorized by said random access memory means 182 and will compare each of them with the received one. If the received code is coincidental with any one of the memorized codes, comparing means 181 will emit at its ouput a validating signal through output terminal 190, said signal being applied through resistor 28 (see FIG. 3) to transistor 29 energizing relay 30 and starting the operational sequence already described with reference to FIG. 3.

Assuming that the received code does not correspond to any of the codes memorized in random access memory means 182, a validating signal will not appear at output terminal 190, since comparing means 181 will not be able to find, between the memorized codes that said means receive from random access memory means 182, any code identical to the one received at input terminal 174. At the same time, comparing means 181 will supply a non-validating signal, through its output 188, to one of the inputs of the "OR" gate 187. At the output of this latter will appear a reset signal that, applied to the input 189 of code accumulating means 177, will erase therefrom the wrong code received at input 174.

When a code has been received, independently from the fact that it is a right or a wrong one, it will be displayed by code display means 193 since switch 192 will normally be in its position illustrated in FIG. 13.

If the phone subscriber wants to change one or more of the codes stored in the random access memory means 182, he will proceed in the following way. He will first invert the position of the triple selector switch 192-20-1-203. Thus, due to the opening of switch 203, the oscillation generating means 195 will stop sending counting signals to counter means 197 which will stop counting and no longer will sequentially scan random access memory means 182. The change of position of switch section 201 will put the random access memory 182 in its "writing" mode instead of its "reading" mode. Also, the change of position of switch section 192 will connect the code display means 193 to output 194 of random access memory means 182, instead of to the output 190 of code accumulating means 177.

The apparatus is now ready for introducing new codes. The user of the apparatus will successively press the keys of keyboard 204 in the sequence corresponding to the characters of a new desired code. The corresponding characters will be generated by the circuits associated with the keyboard and will appear at output 205, being introduced into random access memory means 182. At the same time, the keyboard will also apply a count signal to input 206 of counter device 197 and this will assure that the newly introduced code will occupy the next new position in random access memory means 182. Each newly introduced code will appear displayed on code display means 193 so that the user may visually confirm that he has keyed the right new code. After the code change has been made, the user will return the triple switch 192-202-203 to its normal position (illustrated in FIG. 13) and the apparatus will now be ready to receive once more codes corresponding to new calls.

Figure 14:
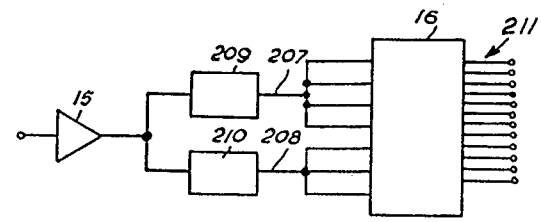
FIG. 14 is a block diagram of a first possible embodiment of filtering means connectable between the amplifying means and the tone decoding means of several embodiments of this invention.

In FIG. 14 an embodiment of a combination of the amplifying means 15 and the tone decoding means 16 of FIG. 3 is illustrated. In the present embodiment the output of amplifying means 15 is not directly applied to the inputs of the tone decoding means 16. These latter may be similar to those described with reference to FIG. 4. However, they have not connected in parallel the seven inputs to their seven tone decoders 45a to 45g (see FIG. 4). Instead, the inputs to the first four tone decoders 45a to 45d are connected in parallel, and the inputs to the three further tone decoders 45e to 45g are also connected in parallel. Thus, in this particular embodiment, the tone decoding means will have two inputs 207 and 208 instead of a single input 43 as was the case in FIG. 4. The output of the amplifying means 15 is coupled in parallel to the corresponding inputs of two filtering means 209 and 210. Filtering means 209 comprise a bandpass filter having for example a passband of about 650 to 1000 Hz, while filtering means 210 comprise a passband filter having for example a passband of about 1000 to 1500 Hz. Thus, filter 209 will allow the passage of the "low frequencies" of each pair of frequencies of the "touch-tone" system (see Table I) while filtering means 210 will allow the passage of the "high frequencies" of each pair. Tone decoding means 16 of FIGS. 3, 4 and 14 have the normal twelve outputs indicated in general at 211 in FIG. 14 and corresponding to the outputs 47a to 47l of FIG. 4. If the embodiment of FIG. 14 is used in an arrangement such as that illustrated in FIG. 13, then the tone decoding means will have only four outputs instead of twelve, since in the case of FIG. 13 a binary system is used. Later on, with reference to FIG. 18, such tone to binary system decoding means will be described. The embodiment of FIG. 14 is useful in the case of phone lines having a comparatively high noise level.

Figure 15:
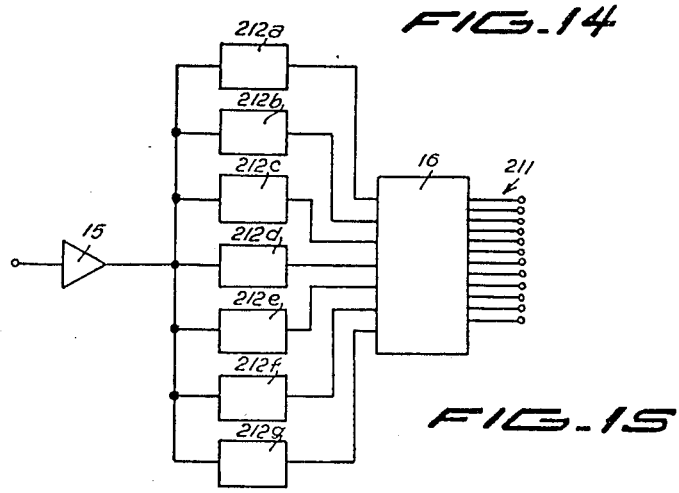
FIG. 15 shows a block diagram of a more elaborated alternative embodiment of filtering means, somewhat similar to the filtering means illustrated in FIG. 14.

An embodiment like that illustrated in FIG. 15 may be useful in the case of phone lines having conditions of exceedingly high noise level. In the present case, seven filtering means 212a to 212g are provided. Each of these filters is a bandpass filter having a very narrow passband and their central frequency will be coincidental with a corresponding frequency of those used in the "Touch-Tone" telephone system. Thus, each filter will correspond to a particular frequency as listed in following Table IV.

TABLE IV

| Filter of FIG. 15 | Central frequency of the filter (Hz) |
|---|---|
| 212a | 697 |
| 212b | 770 |
| 212c | 852 |
| 212d | 941 |
| 212e | 1209 |
| 212f | 1336 |
| 212g | 1477 |

The inputs of all these filters 212a to 212g are connected in parallel to the output of amplifying means 15, while the output of each filter is connected to the input of a corresponding tone decoder 45 (see FIG. 4). The same observations made about outputs 211 of tone decoding means 16 with reference to FIG. 14 are also applicable to the embodiment of FIG. 15.

Figure 16:
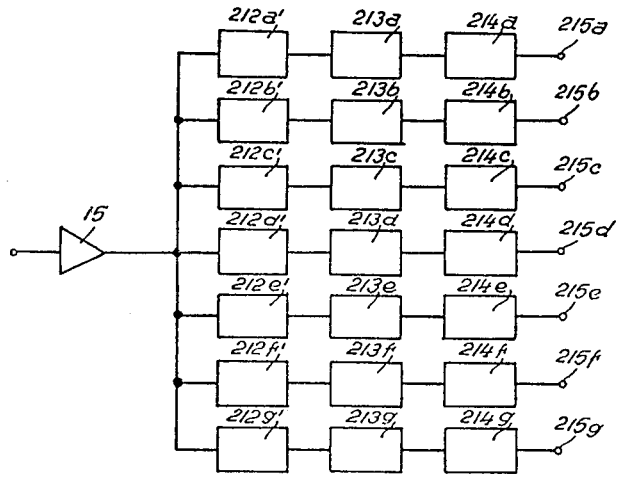
FIG. 16 is a block diagram illustrating an alternative embodiment of tone decoding means.
Figure 1B:
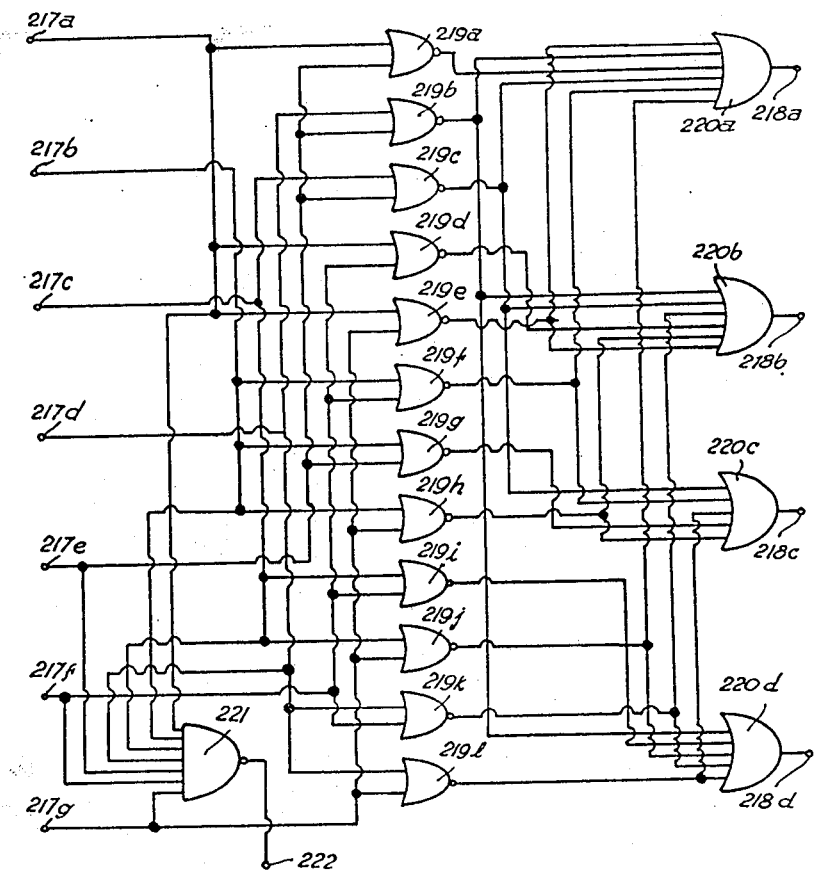

In FIG. 16, an arrangement somewhat similar to that illustrated in FIG. 15 is shown. However, in this embodiment the tone decoding means of FIG. 4 have been partially replaced by an arrangement using different components. In the present embodiment, the same plurality of filters 212a' to 212g' as in FIG. 15 is provided. Each filter has the same narrow passband characteristics and their central frequency is the same as that of filters 212a to 212g of FIG. 15 (see also Table IV). Thus, they have been indicated by means of the same reference numerals but with the addition of the index ('), that is to say 212a' to 212g'. The output of each of these filters is coupled to the input of a corresponding one of a plurality of rectifying means 213a to 213g. The output of each rectifying means 213a to 213g is coupled to the input of a corresponding one of a plurality of triggering means 214a to 214g.

Since the central frequency of each of the filtering means 212a' to 212g' corresponds to the same frequencies as listed in Table IV for filters 212a to 212g, the skilled in the art will easily understand the operation of this embodiment. If it is assumed that at the output of amplifying means 15 a signal is present, having a frequency of 852 Hz, said signal will pass only through filter 212c' and will thus be applied only to the input of rectifier 213c. This latter will apply a corresponding rectified d.c. potential to the input of the corresponding triggering means 214c. This means that a signal will appear only at the output terminal 215c. It will be understood that the seven outputs of 215a to 215g correspond to the outputs of the seven tone decoders 45a to 45b of FIG. 4. Thus, the arrangement of FIG. 16 replaces only partially tone decoding means 16 of FIG. 4, since "NOR" gates 46a to 46l are always necessary.

Figure 17:
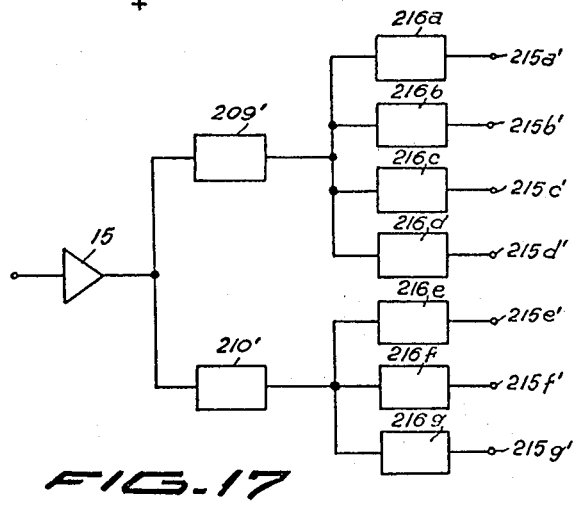
FIG. 17 is a block diagram illustrating another alternative embodiment of tone decoding means using resonant reed filtering means in the present embodiment.

In FIG. 17 another combination of filtering means and tone decoding means is shown, being functionally similar to that of FIG. 16. However, in the present embodiment only two filtering means 209' and 210' are used in a similar way as in the embodiment of FIG. 14. Filtering means 209' comprise a bandpass filter having a passband of about 650 to 1000 Hz, while filtering means 210' comprise a bandpass filter having a passband of about 1100 to 1500 Hz. The output of amplifying means 15 is simultaneously applied to the input of both filtering means 209' and 210'. The present embodiment comprises also a plurality of reed resonant filters 216a to 216g. The first four reed resonant filters 216a to 216d have their inputs connected in parallel and to the output of first filtering means 209', while the three last reed resonant filters 216e to 216g have their inputs connected in parallel to the output of second filtering means 210'. Each of reed resonant filters 216a to 216g resonates only at a particular frequency. The frequencies are the same as those listed in Table IV for the filters 212a to 212g of FIG. 15.

It will be assumed that a signal having a frequency of 852 Hz appears at the output of amplifying means 15. This signal will be able to pass only through filtering means 209', since it will be comprised within the passband of this filter and not within the passband of filtering means 210'. Thus, it will be simultaneously applied to the input of the four reed resonant filters 216a to 216d. However, only reed resonant filter 216c will resonate at this frequency and thus an output signal will appear only at output 215c'. As in the embodiment of FIG. 16, the outputs correspond to the outputs of the respective tone decoders 45a to 45g of FIG. 4.

In FIG. 18, a gate arrangement is shown which is designed to work with the tone decoders, but which is different from that illustrated in FIG. 4. This arrangement has seven inputs 217a to 217g. Each of these inputs will be connected to the corresponding output of one of the tone decoders 45a to 45g of FIG. 4.

However, while the arrangement of FIG. 4 is intended to convert the tone frequencies into output pulses of the decimal system, the present arrangement of FIG. 18 is intended to convert the tone frequencies into output pulses of the four binary system. Thus, it has only four outputs 218a to 218d. A set of twelve "NOR" gates 219a to 219l is provided, while another set of four "OR" gates 220a to 220d is also provided. The output of each of these latter gates corresponds to one of the outputs 218a to 218d. The circuitry of this arrangement will be easily understood by the skilled in the digital techniques. Particularly the "NOR" gates 219a to 219l operate in the same manner as that explained with reference to FIG. 4. The function of the "OR" gates 220a to 220d is to convert the decimal pulses into binary pulses. This arrangement comprises also a "NAND" gate 221 having seven inputs, each one being connected to a corresponding input 217a to 217g. Thus, at the output of gate 221, an output pulse will appear each time any of the inputs 217a to 217g is activated. This is a so called "any tone" output. The function of "any tone" output 222 will be seen later on when explaining the operation of the sequential decoding means of FIG. 19.

To better understand the operation of the arrangement of FIG. 18, the following Table V is provided which is a truth table of the operative conditions of this embodiment.

TABLE V

| | Truth table (tone to binary decoding means) | | | | | | | | | | |
|---|---|---|---|---|---|---|---|---|---|---|---|
| | "Low frequency" input 217 | | | | "High frequency" input 217 | | | Binary output 218 | | | |
| N° | (a) | (b) | (c) | (d) | (e) | (f) | (g) | (a) | (b) | (c) | (d) |
| 1 | 0 | 1 | 1 | 1 | 0 | 1 | 1 | 1 | 0 | 0 | 0 |
| 2 | 0 | 1 | 1 | 1 | 1 | 1 | 1 | 0 | 1 | 0 | 0 |
| 3 | 0 | 1 | 1 | 1 | 1 | 1 | 1 | 1 | 1 | 0 | 0 |
| 4 | 1 | 0 | 1 | 1 | 0 | 1 | 1 | 0 | 0 | 1 | 0 |
| 5 | 1 | 0 | 1 | 1 | 1 | 1 | 1 | 1 | 0 | 1 | 0 |
| 6 | 1 | 0 | 1 | 1 | 1 | 1 | 0 | 0 | 1 | 1 | 0 |
| 7 | 1 | 1 | 0 | 1 | 0 | 1 | 1 | 1 | 1 | 1 | 0 |
| 8 | 1 | 1 | 0 | 1 | 1 | 1 | 1 | 0 | 0 | 0 | 1 |
| 9 | 1 | 1 | 0 | 1 | 1 | 1 | 1 | 1 | 0 | 0 | 1 |
| * | 1 | 1 | 1 | 0 | 0 | 1 | 1 | 1 | 1 | 0 | 1 |
| 0 | 1 | 1 | 1 | 0 | 1 | 1 | 1 | 0 | 1 | 0 | 1 |
| # | 1 | 1 | 1 | 0 | 1 | 1 | 1 | 0 | 0 | 1 | 1 |

Figure 19:
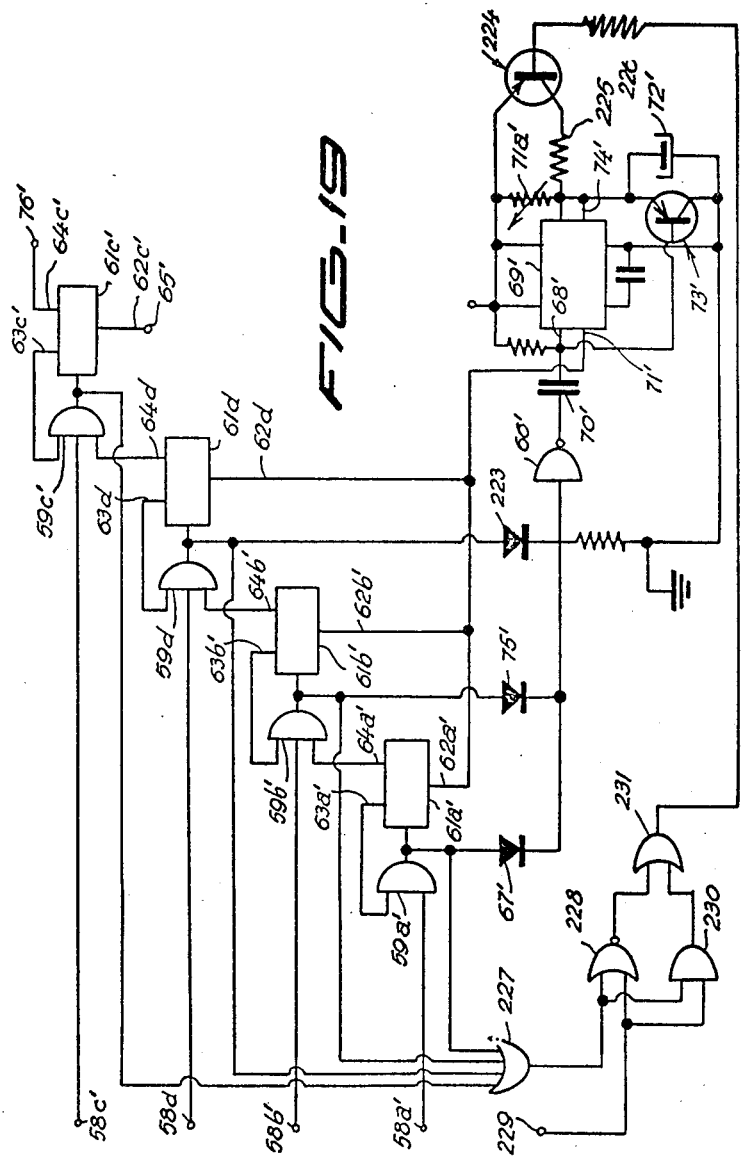
FIG. 19 is a block diagram showing still another alternative embodiment of sequence decoding means somewhat similar to those illustrated in FIG. 6, but suitable for codes of four characters instead of three.

FIG. 19 shows another embodiment of sequence decoding means somewhat similar, but not identical, to those shown in FIG. 6. Components of the arrangement of FIG. 19, which are functionally similar to those of FIG. 6, are indicated with the same reference numerals but with the addition of index ('). It can be seen that one of the differences lies in the provision of an extra third section comprising an "AND" gate 59d and a flip-flop 61d just before the output section comprising gate 59c' and flip-flop 61c'. This added section has the sent input 62d of its flip-flop 61d connected in parallel with the reset inputs 62a' and 62b' of flip-flops 61a' and 61b'. A third diode 223 has been added between output of gate 59d and the input of inverter gate 66'. The operation of these additional components is similar to that of the equivalent components of the other sections. It may be noted that another difference lies in the fact that a second transistor 224 has been added, together with resistors 225 and 226. The function of these three added components will be seen later on.

Other differences are the provision of an "OR" gate 277 having four inputs, each one connected to the output of a corresponding "AND" gate 59a', 59b', 59d and 59c'. The output of gate 227 is coupled to one of the inputs of a "NOR" gate 228, the other input of this latter being coupled to a fifth input terminal 229 which is intended to be connected to the "any tone" output 222 of the arrangement of FIG. 18. Both inputs of an "AND" gate 230 are connected in parallel with the corresponding inputs of "NOR" gate 228. Another "OR" gate 231 has one input coupled to the output of "NOR" gate 228 while its other input is coupled to the output of gate 230. The output of gate 231 is coupled to the base electrode of transistor 224 through resistor 226.

The difference between the operation of the embodiment of FIG. 19 and that of FIG. 6 is as follows. In the first place, the present embodiment is intended to be used with a four character code instead of a three character code. After the reception of a character at any of the input terminals 58a', 58b', 58d and 58c' the corresponding gate 59 will be blocked by its associated flip-flop 61a', 61b', 61d and 61c' which will activate the following gate 59 of the series, readying it for the reception of the subsequent character.

The sequence will normally proceed when a pulse appears on both inputs of "NOR" gate 228. That is to say, when a right character has been received on one of the inputs 58 and at the same time an "any tone" signal has been received at terminal 229 coming from "any tone" terminal 222 of the tone decoding means illustrated in FIG. 18. However, if a character is received in a wrong sequence order, not corresponding to any of the pre-established codes memorized by the character selecting means, the tone decoding means will furnish a signal at their "any tone" output terminal 222 which will be applied to input terminal 229 of the present embodiment. However, in this case gate 228 will receive a pulse only at one of its inputs. The effect will be that, due to the combination of gates 228, 230 and 231 and resistor 226, transistor 224 will start conducting. Since the combination of the resistance of resistor 225 and that of the now conducting transistor 224 is much lower than the resistance of the variable resistor 71a', capacitor 72' will become almost instantaneously charged, thus producing the change of state of monostable 69' applying, through its output 71', a reset pulse to reset inputs 62a', 62b' and 62d of flip-flops 61a', 61b' and 61d, thus resetting them. In the same way, if an excessively long time elapses between any character and the subsequent one, the charging of capacitor 72' through variable resistor 71a' will produce the same result, that is to say a change of state of monostable 60' and the resetting of flip-flops 61, in the same way as that described for the embodiment of FIG. 6. This embodiment is not only intended for using a four character code, but also for the use of tone decoding means comprising the gate arrangement of FIG. 18.

Hereinafter, complete and practical embodiments of apparatus according to the present invention will be described.

These embodiments are more involved implementations of a basic design like that illustrated in FIG. 3, but having many points in common therewith. As in said FIG. 3, in all the following embodiments, the input terminals intended to be connected to the phone line coming from the exchange are indicated with the reference numeral 1 and 2, the one indicated 2 being in general the one connected to ground.

Figure 20:
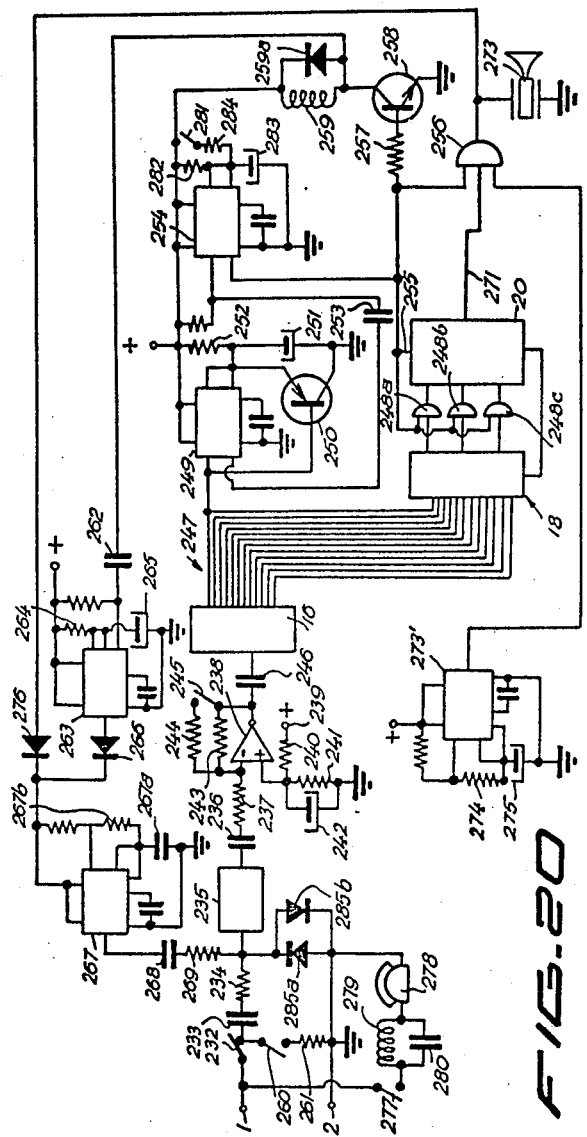
FIG. 20 is a schematic circuit diagram, partially in block form, suitable for the use of a first access code comprising a single character, and a second code comprising three characters which are sent after the conversation loop has been closed in response to the first access code.

With special reference to FIG. 20, when the calling party has "dialled" the phone number of the phone subscriber whom he wants to call, he will receive from the exchange the signals indicating that the called party is being ringed. He thereafter "dials", during one of the non-active intervals of the ringing period, an access code comprising a single character according to the code which has been pre-established by the phone subscriber. The normally closed relay contact 232 applies the access code signal, through capacitor 233 and resistor 234, to the input of filtering means 235, which may be a highpass filter having a cutoff frequency of about 650 Hz, thus blocking the ringing signals. The access code character appearing at the output of filtering means 235 is applied, through capacitor 236 and resistor 237, to one of the inputs of an operational amplifier 238, its other input receiving a positive reference potential from terminal 239 and the voltage divider comprising resistors 240 and 241, an electrolytic capacitor 242 being connected in parallel with this latter. A feedback resistor 243 is connected between output and input of the amplifier, having a second resistor 244 arranged in parallel therewith but being not operative due to the fact that it is in series with a normally open relay contact 245. The access code character amplified by the amplifying means 238 is applied to the input of tone decoding means 16 (which may be similar to those described with reference to FIG. 4) through capacitor 246. The twelve outputs of the tone decoding means 16, indicated in general at 247, are applied to corresponding inputs of character selecting means 18 (which may be similar to those described with reference to FIG. 11). Each of the three outputs of the character selecting means is applied to a first input of corresponding "AND" gates 248a, 248b and 248c having their outputs coupled to corresponding inputs of sequence decoding means 20 (FIG. 3) which may be similar to those described with reference to FIG. 6. The other inputs of "AND" gates 248a to 248c are connected in parallel.

It must be noted that the calling party will send the access code pressing the corresponding key preferably during the most part of a non-active interval of the ringing period. This is specially useful in the case of defective lines, conducting weak signals with a high noise level. As can be seen in FIG. 20, one of the outputs 247 of the tone decoding means 16 is coupled to the input of a timer 249 having for example a time constant of about 1 second. While no signal is present on its input, a transistor 250 will be conducting, thus maintaining discharged a capacitor 251. However, when a signal appears on the corresponding output 247 of the tone decoding means 16 and is thus applied to the input of the timer, this latter will make transistor 250 non-conducting. Thus, capacitor 251 will begin to charge through resistor 252. After a fixed time determined by the time constant of the RC combination 252–251, a capacitor 251 will reach a certain charge level, and at the output of timer 249 will appear a pulse which, through capacitor 253, will be applied to the input of a monostable 254 which thus will be triggered. This monostable may have for example a time constant of about 30 seconds.

It must be noted here that while the input of timer 249 appears connected to the first output 247 of tone decoding means 16, it may be coupled to any of the other outputs thereof according to the character elected for the access code. Obviously, the access code could be changed at will by means of a selector switch of one way and twelve positions, the movable contact thereof being connected to the input of timer 249, and each of the twelve fixed contacts being connected to a respective output of the twelve outputs of the tone decoding means.

As soon as monostable 254 has been triggered by timer 249, a pulse will appear at the output of the latter and this pulse will be applied simultaneously to the in parallel connected second inputs of "AND" gates 248, to the enabling input 255 of last flip-flop contained within sequence decoding means 20 (see FIG. 6), to one of the inputs of an "AND" gate 256 and, through a resistor 257, to the base electrode of a transistor 258, thus rendering this latter conducting. It collector electrode will energize the coil of a relay 259 thus closing its associated normally open contact 260. In parallel with said coil a diode 259a is connected. This action connects a resistor 261 in parallel with the input terminals 1 and 2, closing the conversation loop of the phone line. Since resistor 261 has a resistance value equivalent to the impedance offered to the phone line by a conventional telephone set when its receiver has been unhooked, its connection in parallel with the phone line will have the same effect as if the phone subscriber had unhooked his receiver; thus the call is attended in a simulated fashion.

At the same time, the collector electrode of transistor 258 triggers, through a capacitor 262, the input of a monostable 263 having for example a time constant of about 1 to 2 seconds. This time constant is fixed by an RC combination comprising resistor 264 and capacitor 265. Through a diode 266, monostable 263 feeds tone generating oscillator means 267 thus putting them into operation. This oscillator means are capable of generating a signal having for example a frequency of about 440 Hz which is below the passband of filtering means 235, thus avoiding any possibility that this signal may be fed-back to the tone decoding means 16. This output is used as a ring-back signal, its frequency being fixed by the RC constant of capacitor 267a and resistor 267b and, through capacitor 268, resistors 269 and 234, capacitor 233, closed relay contact 232 and the phone line 1–2, is sent to the calling party who will known by this means that the access code has been received.

After having received this ring-back signal, the calling party will send, during subsequent non-active intervals of the ringing period, the code proper which may comprise one or more characters (three characters in the specific embodiment illustrated in FIG. 20). These signals will pass through the phone line, closed relay contact 232, capacitor 233, resistor 234, filtering means 235, capacitor 236 and resistor 237, will be amplified by amplifying means 238 and will be applied, through capacitor 246, to the input of the tone decoding means 16. These latter convert the corresponding input tones to decimal output pulses which will pass through the code selecting means 18 if the received code corresponds to the pre-established one. If he sends the code within the time of monostable 254, "AND" gates 248a to 248c will be still activated. Thus the sequence of the three successive characters will enter sequence decoding means 20 (these latter may be like the sequence decoding means described with reference to FIG. 6). Thus, the input 255 of FIG. 20 corresponds to the enabling input terminal 65 in FIG. 6, while the output 271 corresponds to the output terminal 76 of the third flip-flop 61c of said FIG. 6.

"AND" gate 256 has a first input connected to the output of monostable 254, a second input connected to output 271 of sequence decoding means 20, and a third input which is coupled to the output of oscillation generating means 273' which are capable of generating square wave oscillations of a very low frequency, for example of about 1 Hz, fixed by the RC combination of resistor 274 and capacitor 275. When gate 256 receives simultaneously signals on its two first inputs, it will be enabled, through its third input, only during for example intervals of about 1 second, followed by disabling intervals of about 1 second. This means that at the output of this gate will appear a discontinuous signal which will intermittently activate an electroacoustic transducer 273 advising the called party that a call is being received, including the fact that the corresponding code has been received and validated. At the same time, the output of gate 256 will feed, through diode 276, the tone generating oscillator means 267 which will send to the calling party a ring-back signal which will be similar to a conventional ringing signal sent out by the exchange during active intervals of a ringing period. Thus, the calling party is advised that his code has been validated and that the called party is being ringed.

There exist now two possibilities. One is that the called party does not want to answer the call or that he is absent from the place and thus cannot answer the call. In such a case, after the time (for example about 30 seconds) of monostable 257 has elapsed, a low state will appear at its output, thus resetting the entire apparatus, readying it for receiving a new call.

It must be noted that after the access code characters has been received, and transistor 258, and thus relay 259, have been energized, not only the normally open relay contact 260 will close, thus closing the conversation loop, but also the normally open relay contact 245, thus connecting resistor 244 in parallel with resistor 243, increasing the feedback of amplifier 238 and reducing its gain. This is due to the fact that under the conditions of closed conversation loop the sensitivity in the phone line circuit will be considerably higher than during the ringing period. As has been mentioned above, after the time of monostable 254 has elapsed, relay 259 will become de-energized and thus relay-contact 260 will open again, freeing the phone line from the effects of resistor 261, and also relay contact 245 will open disconnecting resistor 244 from the feedback circuit of amplifying means 238. It must be noted here that the position of the normally closed relay contact 232 has not been affected by the events so far described.

The other possibility is that the called party is present and wants to answer the call. To do so, he must close the manually actuatable switch 277. When doing so, he will connect directly to the phone line 1–2 the series assembly comprising the conventional phone set 278 and the coil of a relay 279 and a capacitor 280 connected in parallel with this latter. Previously to actuating said switch 277 he will have unhooked the receiver of the phone set. This will energize relay 279 producing the following events. In the first place, the normally closed relay contact 232 will open, thus disconnecting from the phone line the entire electronic apparatus. At the same time, the normally open relay contact 281 will close. As the time constant of monostable 254 is fixed by the resistance and capacitance values of resistor 282 and capacitor 283, the closing of relay contact 281 will connect a second resistor of substantially low value 284 in parallel with the first one, reducing the time constant nearly to zero; thus capacitor 283 will become fully charged almost instantaneously. If, for any reason, the called party unhooks and hangs up immediately thereafter, de-energizing of relay 279 will close again contact 232 and capacitor 283 will be fully charge, so that the entire apparatus will be ready for receiving a new call.

However, if the called party wants to sustain a conversation with the calling party, he can do so, and only after he has finished and has hung up, the apparatus will be completely reset. After this the called party will manually open again switch 277.

However if he prefers to receive directly the calls in a normal way, he will simply keep closed switch 277. In this case, the phone set 278 will receive the calls in the same way as a conventional phone.

It will be seen that in FIG. 20 a pair of diodes 258a and 258b are connected in parallel one with the other, and this diode assembly is connected between the input of filtering means 235 and ground so as to limit to a safe value the signal applied to the filtering means.

It must be noted that while it is true that when switch 277 is closed the phone set 278 will receive in a normal way the calls from the phone line and its own bell will sound in response to a call, at the same time the called party may wait to see if an access code and a final one are received making the electroacoustic transducer 273 sound and only then answer the call. However, if he desires to have his phone set operating entirely independently from the electronic apparatus, he must not only close switch 277 but also open the main switch 155 of the power supply (see FIG. 12). In this case the entire electronic portion of the apparatus will be out of operation and only the bell of the phone set will sound when a call is received.

In FIG. 21 another embodiment of the present invention is shown, which is in some ways very similar to the embodiment of FIG. 20. The main differences lie in the tone decoding means, the character selecting means and the sequence decoding means. The tone decoding means are suitable for furnishing output signals of the binary type, such as the embodiment described with reference to FIG. 18, thus having only four outputs instead of twelve, for a binary code of four digits instead of a decimal one. Each of the outputs is connected to a corresponding first input of "AND" gates 286a, 286b, 286c and 286d. The output of each gate 286 is coupled to a corresponding input of code accumulating means 287 which may be similar to those of the embodiment described with reference to FIG. 13 (see 176 and 177 in this latter figure). Also an interdigits timer 288 is associated with the sequence decoding means 287 (like 178 illustrated in FIG. 13). It will be understood that block 287 of FIG. 21 represents not only the code accumulating means 177 of FIG. 13, but also all the other componentes used in this latter figure, with the exception of the tone decoding means 175, the display device 193, the interdigits timer 178 and the keyboard 204, which are all separately illustrated in FIG. 21 and indicated with corresponding reference numerals 286, 289, 288 and 290, respectively. The keyboard 290 is connected to 205 (see FIG. 13) and the display means 289 to the movable contact of swich 192 (see also said figure), while the electro-acoustic transducer 273 is connected to the validation output 190 (see also FIG. 13).

To the validation signal output 190 is coupled one of the inputs of a "NAND" gate 292, the other input being coupled to the output of oscillation generating means 293 capable of generating a square wave output signal having for example a comparatively low frequency of about 3 Hz. The output of gate 292 is coupled to the input of monostable 263 through a capacitor 294. The output 295 of monostable 254 is coupled to the reset input 296 of decoder 287 (said input 296 corresponding to the input 185 in FIG. 13). At the same time, said output 295 is coupled to the input of an inverter 297 having its output coupled to the input of monostable 263 through a capacitor 298.

The operation of the embodiment of FIG. 21 is as follows. The calling party "dials" the phone number of the subscriber he wants to call. When he perceives the ringing signal which is sent to him by the exchange, he "dials", during a non-active interval of the ringing period, an access code character which will be transmitted through the phone line arriving at the input terminals 1-2 of the apparatus and thereafter will pass through components 232, 233, 234, 235, 236, 237, 238 and 246 in the same way as explained with reference to FIG. 20. It enters then the tone decoding means 286 which may be similar to those described with reference to FIG. 18 combined with the tone decoders of FIG. 4.

The pulse obtained from the output 222 of gate 221 (see FIG. 18) appears at 299 and is applied to the input of timer 249 thus triggering it. This action will start the same events as explained with reference to FIG. 20. It will be seen that the access code cannot affect gates 286a to 286d, since these have not been activated yet on their other inputs. However, since the triggering of timer 249 will have triggered monostable 254, the output of this latter will enable such gates thus preparing them to allow the passage of the subsequently sent code of, for example, three characters. The output 295 of monostable 254, through inverter 297 and capacitor 298, will trigger monostable 263 which will activate oscillator 267 sending to the calling party a ringback signal (in the same way as explained with reference to FIG. 20), thus advising him that his access code has been received. Thereafter the calling party, during one or more subsequent non-active intervals of the ringing period, will send the next code which may comprise one or more characters (in the particular embodiment illustrated in FIG. 21 it may comprise three characters).

These characters will be sequentially transmitted through the phone line 1-2 and the componentes 232, 233, 234, 235, 236, 237, 238 and 246 and will enter the tone decoding means 286 where the tone pairs will be converted to binary pulses (instead of decimal pulses as in the case of FIG. 20). Since gates 286a to 286d have now been activated at their first inputs, any pulse applied to their second inputs will produce corresponding pulses at their outputs which will enter the combined character selecting and sequence decoding means 287. If the code sent by the calling party corresponds to a pre-established code, the validation signal output 190 will be activated, producing the following events. Display means 289 will visually display the code received by the apparatus. At the same time the electroacoustic transducer means 273 will be activated, thus emitting a sound which will advise the called party that a call has been received together with a code which has been validated. At the same time the pulse emitted at the output 190 will activate one of the inputs of "NAND" gate 292, while its other input is intermittently activated by the output of low frequency oscillation generating means 293. Thus, at the output of gate 292 will appear an intermittently repeated pulse which will activate (also intermittently) monostable 263 and ring-back oscillator 267 through capacitor 294, advising the calling party that his code has not only been received but also validated.

In the same way as that explained with reference to FIG. 13, the pre-established codes may be changed at will by the phone subscriber, introducing new codes by means of keyboard 290.

In FIG. 22 another embodiment is shown which is in some ways similar to those described with reference to FIGS. 20 and 21. The components performing similar functions to those of said figures have been designated with the same reference numerals.

The embodiment of FIG. 22 operates in the following way. The calling party will "dial" the phone number of the subscriber he wants to call. Once the exchange has established the ringing loop, the calling party will send, during corresponding subsequent non-active intervals of the ringing period, the three characters of an access code by pressing the key corresponding to each character during about the whole length of a non-active interval. The sequence of characters of the access code will pass successively through the phone line 1-2 and the components 233, 234, 235, 236, 237, 238 and 246, entering the tone decoding means 300. These tone decoding means may be of the type described with reference to FIG. 4 but incorporating an "AND" gate like the one indicated at 221 of FIG. 18 to obtain an "any-tone" output 222. Thus, a pulse will appear at said output 222 once the first character has been "dialled", This pulse will activate timer 249 which, after a certain delay of for example 1 second, will apply a pulse from its output 301 to the input of an inverter 302. The output of this inverter will activate a first input of an "AND" gate 303, the other input being normally activated. Thus, a pulse will appear at the output of this latter gate enabling the first input of three "AND" gates 304a to 304c. In the meantime, the access code characters will have passed through the tone decoding means having their outputs connected to corresponding inputs (as indicated at 247) of character selecting means 305. These latter comprise two sections 305a and 305b. Each of these sections comprises a complete arrangement as for example the one illustrated in FIG. 11, the two sections having each pair of their inputs 151a to 151l (see said FIG. 11) connected in parallel and to a corresponding one of the outputs 47a to 47l of tone decoding means 300. However, the outputs (like 222a to 222c of FIG. 11) of section 305a are independent from the outputs of the other section 305b, being indicated in FIG. 22 at 307 and 308, respectively. Each "any-tone" pulse present at 222 is delayed by timer 249, but when this latter activates the second inputs of gates 304a to 304c, the pulses present at the outputs 307 will enable said gates, the outputs of these latter being applied to first inputs of "OR" gates 309a to 309c which will apply corresponding pulses to the inputs of the sequence decoding means 310. These latter may be similar to those shown in FIG. 6, with the exception that reset input 65 of flip-flop 61c (see said FIG. 6) will be connected to the output of monostable 69, that is to say, in parallel with reset inputs 62a and 62b of flip-flops 61a and 61b. If the access code sent by the calling party is the right one, at the output 310' of sequence decoding means 310 will appear a pulse applied to one of the inputs of a "NAND" gate 311 at the output of which a pulse will appear which will be applied to the input of monostable 254 through a capacitor 312. Monostable 254 will thus be triggered and will furnish a pulse at its output 254', which will be applied to an inverter 313. The output of inverter 313 will produce two effects. The first one is to inactivate "AND" gate 303 which, in its turn, will block "AND" gates 304a to 304c. The second one is to block "NAND" gate 311, thus preventing that any pulse appearing at the output of the sequence decoding means 310 may retrigger monostable 254.

The validation pulses appearing at the output of sequence decoding means 310 cannot reach instantly the corresponding input of an "AND" gate 314 due to delay means 315 (introducing for example a delay of about 100 milliseconds). This delay allows time for resetting the sequence decoding means 310 in the following way. Once a pulse has appeared at the output of inverter 313, it will be applied to the base electrode of a transistor 316 through a capacitor 317 and a resistor 318, driving the transistor to its conducting state. If the sequence decoding means are like those shown in FIG. 6, the collector electrode of transistor 316 will be connected (319 in FIG. 22) to the control input 74 of monostable 69 (see FIG. 6). That is to say, transistor 316 will be connected in parallel with resistor 71a. Conduction of transistor 316 will thus produce the fast charge of capacitor 72 which will reset monostable 69 thus resetting the entire sequence decoding means. This, of course, will take place only after the last of the access code characters has produce a validation pulse at the output of said decoding means 310. This resetting operation is, of course, much faster than the delay, of about 100 milliseconds, introduced by the delay means 315.

Meanwhile, the triggering of monostable 254 will have made transistor 258 conducting, thus producing the energization of relay 259. This will produce the following effects: (1) the normally open contact 260 will close, connecting resistor 261 in parallel with input terminals 1 and 2, closing the conversation loop; (2) normally open contact 245 will close, connecting resistor 244 in parallel with resistor 243, increasing the feedback on amplifying means 238 and reducing its gain; and (3) the collector electrode of transistor 258 will supply through capacitor 262 a triggering pulse to the input of monostable 263, the output of this latter applying a positive voltage to the tone generating means 267 through diode 266. The activation of tone generating means 267 will produce at its output a ring-back signal which will be applied to the phone line through componentes 268, 269, 234, 233 and 232 (this latter being normally closed)

When the calling party receives said ring-back, he proceeds sending a second code also comprising three characters. These characters will enter through input terminals 1 and 2, passing through components 232, 233, 234, 235, 236, 237, 238 and 246, entering the tone decoding means 300. The signal appearing at the "any tone" output 222 in response to the reception of the first character will be without effect due to the fact that "AND" gate 303 is now blocked. None of these characters can pass through the character selecting means section 305a since the code will be different. Even in the case that one or two of the characters would be the same as that of the access code, they cannot pass through gates 304a to 304c which are now blocked by gate 303. However, they will pass through character selecting means section 305b (of course, if the received code is the right one) and will be applied to one of the inputs of "AND" gates 306a to 306c. The other inputs of these gates have been already enabled by the activation of monostable 254. Thus, these code characters will pass through "AND" gates 306a to 306c, and the output pulses of these latter will be applied to respective inputs of "OR" gates 309a to 309c and will enter the sequence decoding means 310. If the sequence in which the code characters are received and the time spacings between them are the right ones, a validation pulse will appear at the output 310'. This time the validation output signal will have no effect on "AND" gate 311 because this latter remains blocked since the reception of the access code. However, it will be applied to the delay means 315 and therethrough to one of the inputs of "AND" gate 314. Another input of this latter has been already activated in response to the pulse at the output 254' of monostable 254, while its third input is activated because it is connected to the $\overline{Q}$ output of a flip-flop 320. The same output pulse of monostable 254 enables flip-flop 320 through its enabling input 321. Thus, the pulse appearing at the output of "AND" gate 314 will be applied to the clock input of flip-flop 320 producing the change of state thereof. The output pulse appearing at the $\overline{Q}$ output will block gate 314 while the pulse appearing at the Q output will be applied to one of the inputs on an "AND" gate 322. The other input of this latter is connected to the output of oscillation generating means 323 generating oscillations of a comparatively low frequency which, for example, may be of about 3 Hz. This means that at the output of gate 322 will appear an intermittent sequence of pulses which will have two effects. The first is the intermittent activation of electroacoustic transducer means 273. The second is to furnish a supply voltage to tone generating means 267 through diode 276. This second action will produce a further ring back signal which will be intermittent at the frequency of 3 Hz. This ring-back signal will be applied to phone line 1-2 through components 268, 269, 234, 233 and 232 (this latter normally closed).

The called party, advised by the sound emitted by electroacoustic transducer means 273 that a call has been received together with first and second codes, may now elect to attend or not the call. If he does not answer it because he does not want to do so or because he is absent from the place, monostabe 254 will finish its time and will reset the entire apparatus, inactivating transistor 258 and de-energizing relay 259. This latter will open its contact 260, disconnecting resistor 261 from the phone line 1-2, thus opening the conversation loop. Incidentally it will also restablish the normally open contact 245 to its original open condition. If the called subscriber wants to answer the call, he must close the manually actuable switch 277 and thereafter unhook the receiver of his phone set 278. This will produce the energization of relay 279, opening the normally closed contact 232, thus disconnecting the entire electronic apparatus from the phone line. He may now establish the communication in a normal way. After having finished talking, he will hang up and open again switch 277, thus closing normally closed contact 232, whereafter the apparatus will be again in condition to receive a new call. If the subscriber wants to use his phone set 278 directly connected to the phone line so as to be able to receive calls in a conventional way, he may close switch 277 and open switch 155 of the power supply (see FIG. 12).

In FIG. 23 another embodiment of the present invention is shown. This embodiment allows not only the activation of such means as an electroacoustic transducer and/or the sending of a ring-back signal, but also the activation of at least one external utilization circuit in response to the reception of a pre-established code.

This embodiment operates in the following way. When the calling party sends an access code, for example a code comprising three characters, during one or more non-active intervals of the ringing period, they will be received at input terminals 1 and 2, passing through components 232, 233, 234, 235, 236, 237, 238 and 246 and entering the tone decoding means 324. These latter may be of the type described with reference to FIG. 18, furnishing output signals of the binary type. At the "anytone" output 222 a high state appears, activating timer 249 at the output of which, and after a certain time, a low state will appear which will be inverted by inverter 325 and the high state appearing at its output will activate one of the inputs of an "OR" gate 326 the output of which will be applied simultaneously to first inputs of "AND" gates 327a, 327b, 327c and 327d. When at the other inputs of these gates the output signals of the tone decoding means 324 are applied, their outputs will be transferred to the corresponding inputs of the information distributing block 327'. The information appearing at its output 326' is applied simultaneously to memories 326a, 326b and 326c of the BCD type and at the same time this information, representing the first character, enables memory 326a at its enabling input 328a; the received character appears at outputs 329a in its decimal form. When the next character is received, interdigit timer 330 checks if it is spaced from the previous one by no more than a pre-established time and it will then be stored into memory 326b through enabling input 328b; and when the third character is received, it will be stored into memory 326c through enabling input 328c. When the three informations, in their decimal form at the outputs 329a, 329b and 329c, are applied to the inputs of "NAND" gate 331, at the output of this latter will appear a low state triggering monostable 254. Thus, at the output of this monostable a high state will appear, for example during about 30 seconds, activating transistor 258 to its conducting state, sending a triggering pulse to monostable 263 through diode 322 and capacitor 262. Monostable 263 will enable, for example during 2 seconds, tone generating means 267 through diode 266, thus sending a ringback signal to the calling party through the phone line, advising him that his access code has been validated. The conducting state of transistor 258 will energize relay 259, closing normally open contact 260 which will connect resistor 261 in parallel with the phone line 1-2. This action is equivalent to have unlocked the receiver of the phone set corresponding to said phone line. Another effect of the activation of monostable 254 is to reset memories 326a, 326b and 326c through the input 327" of the information distributing block 327' and the inputs 328a to 328c of said memories, and to enable gates 333 and 337' and flip-flop 334 through "NAND" gate 335. If the calling party sends a second code comprising three characters, now with the conversation loop closed, this latter code will be stored into memories 326a, 326b and 326c and if the received code appearing at the outputs of said memories is applied to inputs of gate 333, a high state will appear at the output of this latter which will be inverted by "NAND" gate 335, producing the change of state of flip-flop 334, which, through its $\overline{Q}$ output 334b, will block gate 335 and through its Q output 334c, will apply a high state to the corresponding input of "AND" gate 336. The other input of gate 336 is receiving an alternating high state from the output of a square wave generator 337 having for example a frequency of 1 Hz. Thus, at the output of gate 336 will appear an alternating high state which will activate electroacoustic transducer means 273 which will give a validation warning signal and at the same time will activate the tone generator 267 through diode 276. The tone generator will send a simulated calling tone to the calling party. If the called subscriber wants to attend the call, he must close the normally open switch 277 after having unhooked the receiver of his phone set 278. This will energize relay 279 and close its normally open contact 281, connecting resistor 284 in parallel with resistor 282, producing the fast charge of capacitor 283. This will lower to zero the output of monostable 254, thus resetting the whole electronic system. If the second received code corresponds to the inputs of gate 337' instead of the inputs of gate 333, a high state will appear at the output of gate 337' activating transistor 338 through resistor 338'. The conducting state of transistor 338 will trigger monostable 263 through diode 339 and capacitor 262 producing the activation of tone generator 267, this latter sending a second validation ring-back tone. At the same time, relay 340 will be energized and, by means of its normally open contact 341, may be used for activating any desired external utilization circuit connected to output terminal 342.

In FIG. 24 an embodiment of the present invention is shown which allows the reception and validation of a code sent by the calling party during non-active intervals of the ringing period, according to a binary system. If each of said non-active intervals is considered as a binary weight, and assuming that the first non-active interval is $2^0$, the second $2^1$, the third $2^2$, etc, and if it is assumed that the absence of a tone represents a 0 and its presence is considered as 1, a decoding system will be provided which allows to know the binary number sent by the calling party. This binary number will be compared with another one previously selected. If equality is found the code will be validated, generating a corresponding indicating signal, which for example may be an acoustic signal.

When a ringing signal is received from the phone line at input terminals 1 and 2, it will activate an optoelectronic coupler 343. Once the photoresistor 344 has been energized by the neon light 345, the potential developed at point 346 will be applied to one of the inputs of an "AND" gate 347. Since no code has yet been validated and thus a 0 is present at the input of inverter 348, at the output of gate 347 will be present a high state which will be applied to the clock input 349 of a shift register 350. To the output of gate 347 is connected a monostable device 351 which will be triggered at the end of the ringing period, at its output appearing a high level enabling an "AND" gate 352. If during a non-active interval a code tone is received, it will pass through capacitor 353 and filtering means 354, being amplified by amplifying means 355 the output of which will be rectified by rectifying means 356. The d.c. potential appearing at the output of said rectifying means 356 will be applied to one of the inputs of gate 352. At the output of this latter will appear a high state which will be applied to the data input of shift register 350 and at the same time triggering a monostable 357 which will remain enabled, for example, during about 30 seconds. When a ringing signal appears, the high state at the output of gate 347 will transfer the information, applied to the data input, to the first of the parallel outputs 358 of shift register 350. If during the subsequent non-active interval of the ringing period no information is received, the starting of the ringing signal will produce a shift of one step, in this case being a received character of the type zero. If subsequently ones and zeros are received, they will be applied to the inputs of a binary comparator 359 of 8 bits which will compare the binary code received from the shift register 350 with the binary code fixed by the code selecting means 360. If an equality is found, a high state will appear at the output terminal 361, energizing the electroacoustic transducer 273. At the same time, an utilization circuit, for example a servomechanism, may be connected to the output terminal 361 which will be activated also in response to the validation of the code. The validation signal appearing at the output of binary comparator 359 will be applied to inverter 348 blocking gate 347. Thus, the subsequent ringing signals will not produce any shifting of the information already stored in shift register 350. If the call is not attended within the time of monostable 357, the output of this latter will go to 0, resetting the whole system.

In FIG. 25 another embodiment of the present invention is shown. After the calling party has "dialled" the phone number of the phone subscriber he wants to call, and once the ringing loop has been closed by the exchange, he will "dial" a code, which in the example illustrated will have four characters, during one of the non-active intervals of the ringing period. These characters will be simultaneously memorized and indicated by visual display means and will also go into a validation system which will validate them only in the case that the received code coincides with a pre-established code and when the time spacing between characters is not longer than a pre-established one. In response to the validation of the code, the conversation loop will be closed, and an acoustic warning will be emitted advising the called subscriber that a call is being received and that the code has been validated. At the same time a ring-back signal will be sent to the calling party to advise him that his code has been validated and that the called party is receiving the warning. However, the conversation loop will be maintained closed only during a certain time so that the phone line can not be blocked during too much time in the case that the called party does not answer the call, for example, because he is absent from the place. Actuating a switch, the apparatus according to the present embodiment may be also used for the activation of external utilization circuits.

This embodiment operates in the following way. When the calling party has "dialled" the phone number of the person whom he wants to call, and once the exchange has closed the ringing loop, the ringing signal will be received at the terminals 1 and 2 of the apparatus. If the movable contact of switch 362 is in the position shown in FIG. 25, that is to say engaged with the fixed contact 363, the phone set 278 will operate receiving calls like any normal telephone set. However, if said switch 362 is in its other position, so that the movable contact 362 is engaged with the fixed contact 364, the ringing signal will go through capacitor 233 and resistor 234 and will be limited to a small value by limiter 365. At the same time the ringing signal will be also applied to a ringing voltage detector 366 which, in response to this signal, will produce a high state at its output. This state will be maintained even during the non-active intervals of the ringing period due to an R-C circuit incorporated into detector 366. The high state present at the output of detector 366 will be applied, through switch 367, to the input of counting means 368 capable of counting up to four and also to the input 369 of sequence decoding means 370 and to one of the inputs of "AND" gate 371. If during a non-active interval of the ringing period "TOUCH-TONE" tones come in, they will pass through a "free line tone" filter 372 which will block any remnant of said tone which still could be present, the character signals passing then through a highpass filter 235 which for example may have a cutoff frequency of about 650 Hz, its function being the elimination of low frequency spurious signals which could be present on the line, and thereafter the character signals will be applied to amplifying means 373 provided with automatic gain control. The code characters so processed will enter tone decoding means 324 capable of converting the "TOUCH-TONE" characters to the binary system. At the output of decoding means 324 the characters will appear in binary form. At the same time, on the "any tone" output 222 of said decoding means 324 will appear a high state which will go into the counting means 368, which are of the type advancing one step in response to the reception of the trailing edge of the input pulse. At the same time the output pulse appearing at the "any tone" output 222 of decoding means 324 will be also applied to the input of transfer means 374 having the function of generating a very short positive pulse some milliseconds after the reception of a corresponding high state at its input. The output pulse of the transfer means 374 is applied to first inputs of four "AND" gates 375a, 375b, 375c and 375d, thus enabling them. Since the counting means 368 are still at their zero state, gate 375a will be receiving at its other input a high state and at its output will appear a very short positive pulse which will produce the transference of the binary characters present at the outputs of the tone decoding means 324 to memory 376a. Thus said character will be visually displayed on displaying means 377a. Once the reception of the character sent by the calling party has ended, the "any tone" output 222 will drop to low state and thus the counting means 368 will advance one step. In the meantime the signals present at the outputs of the tone decoding means 324 will have gone into the corresponding inputs of binary to decimal decoding means 378 (having for example twelve outputs), and the decimal signals appearing at the outputs (indicated in general at 379) of the decoding means 378 will be applied to corresponding inputs of character selecting means 380. If the received character would have corresponded to the first character of the pre-established code, a high state coming from the "any tone" output 222 would have entered the sequence decoding means 370 through its input 381. The sequence decoding means 370 have the function of validating the high states sequentially entered through its inputs indicated in general at 382, provided that: (a) through its input 369 a high state has entered; (b) with each character appearing at its inputs 382, a high state has been simultaneously applied to its input 381 coming from the "any tone" output 222 of the tone decoding means 324; and (c) the time elapsed between the reception of two consecutive characters is not longer than a pre-established time. The high state appearing at the output of the ringing voltage detector 366 enables gate 371. Since this gate receives at another of its inputs a high state coming from the inverter 383, this latter having received at its input a low state due to the fact that it has not yet received a validation signal, and since gate 371 receives at its third input a pulsing high state produced by the square wave generator 384 having for example a frequency of about 3 Hz, at the output of said gate a pulsing high state will appear activating intermittently the light emitting diode 385 and, if switch 386 is closed, it will activate the electroacoustic transducer 273 through diode 387 and switch 388. Electroacoustic transducer 273 will emit an intermittent tone advising the called party that a call is being received. If now the calling party sends further code characters, the above described process will be repeated until, after he has sent the third character, a pulse of negative trailing edge will appear at the fixed contact 389 of selector switch 390. This pulse will trigger monostable 391 having an adjustable time constant, for example of about 30 seconds. Monostable 391 energizes relay 392 thus closing its normally open contact 260 connecting in parallel with the phone line 1-2 a resistor 261 having a resistance equivalent to the impedance offered by a conventional unhooked phone set to the phone line. The exchange will cease to send the ringing signal and will close the conversation loop between the apparatus of the calling party and that of the called subscriber. At the same time the energization of relay 392 will change the position of its selecting contact 367 thus connecting the reset line 393 to a reference positive potential present at terminal 368. Line 393, having applied thereto a high state, will not reset the counting means 368 nor the sequence decoding means 370. If the calling party, with the conversation loop closed, sends now the fourth character of the code, all the characters will be stored in memories 376a to 376d, thus becoming readable on the display means 377a to 377d. If the received code is coincidental with the code pre-established at the character selecting means 380, at the output 394 of the sequence decoding means 370 a high state will appear blocking the "AND" gate 371 through inverter 383, ending the operation of the electroacoustic transducer 273 and at the same time enabling "AND" gate 395. This latter receives at its other input a signal from a square wave generator 396 having for example a frequency of about 3 Hz. In such a case, a pulsing high state will appear at the output of gate 395 intermittently activating a light emitting diode 397 and the electroacoustic transducer 273 through diode 398 and switch 388 with a different rhythm from the one with which the electroacoustic transducer 273 and the light emitting diode 385 were activated by the output of gate 371. At the same time, the output of gate 395 will activate intermittently a ring-back oscillator 399 sensing a simulated ringing signal to the calling party through the phone line 1-2.

If the called party wants to attend the phone, he will unhook the receiver of his phone set 278 and will then move switch 362 so that its movable contact will be engaged with the fixed contact 363. This switch 362 is mechanically coupled in tandem with another switch 400, the moving contact thereof engaging the fixed contact 401, thus resetting monostable 391 and de-energizing relay 392 changing the position of the movable contact of switch 367 connecting it to the output of the ringing voltage detector 366. Since there is no longer ringing signal at the input of this latter, at its output there will be a low state, which will reset the whole apparatus.

If the called party does not attend the call within the time of monostable 391, this latter will return to its stable state and the system will be automatically reset and the line freed.

The apparatus of this embodiment may also be used for energizing an utilization circuit, such as for example activating a servomechanism. To this end the user of the apparatus will open the normally closed switch 388, deenergizing the electroacoustic transducer 273. Switch 388 is connected mechanically in tandem with a switch 402 connecting the output terminal 403 to the output 394 of the sequence decoding means 370. To the output terminal 403 any kind of utilization circuit may be connected directly or indirectly.

It must be noted here that in the example described above, the closing of the conversation loop is produced in response to the reception of the third character. However, the apparatus may be adjusted to produce the closing of the conversation loop also in response to the reception of the first, second or fourth character, according to the position at which the movable contact of switch 390 is set.

Figure 26:
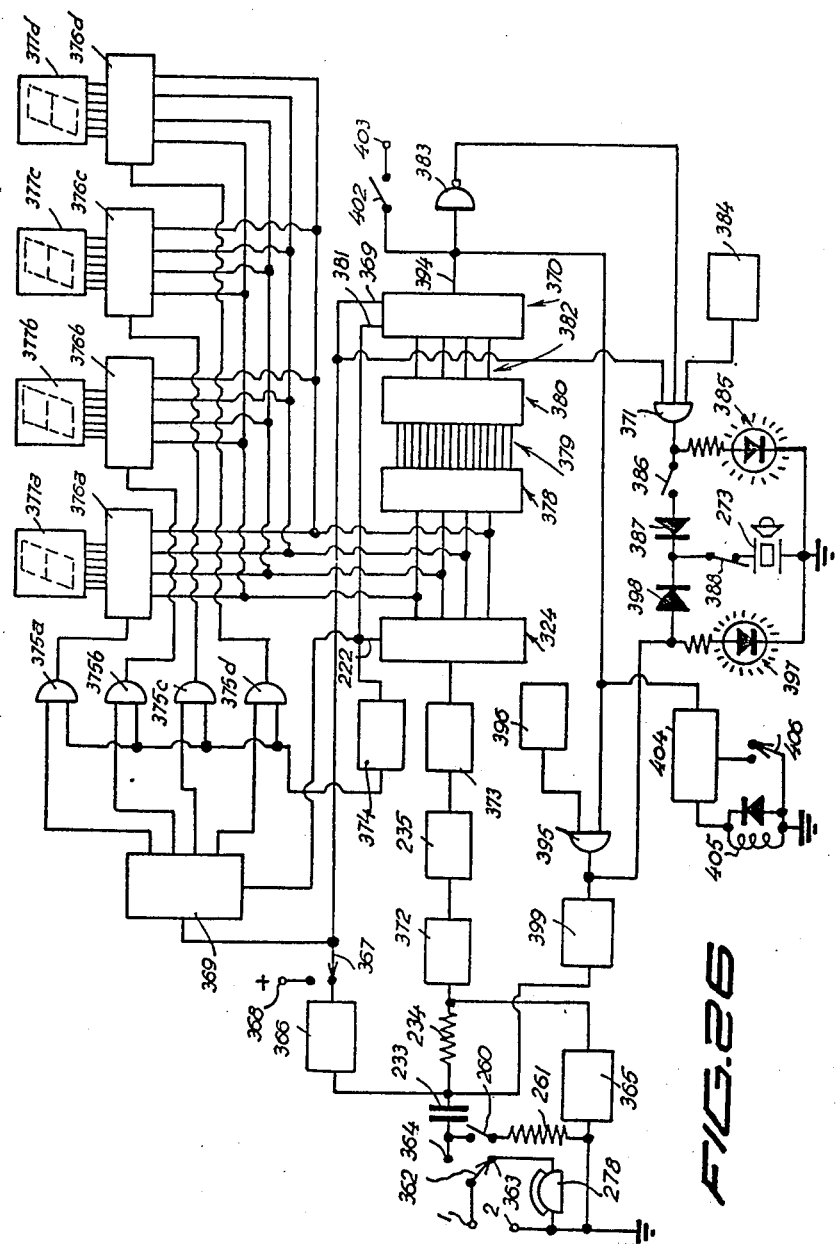
FIG. 26 is a schematic circuit diagram, partially in block form, of an embodiment of the invention which is very similar to that illustrated in FIG. 25; however, in the present embodiment the conversation loop is closed only after the last character of the code has been received and validated.
Figure 26:
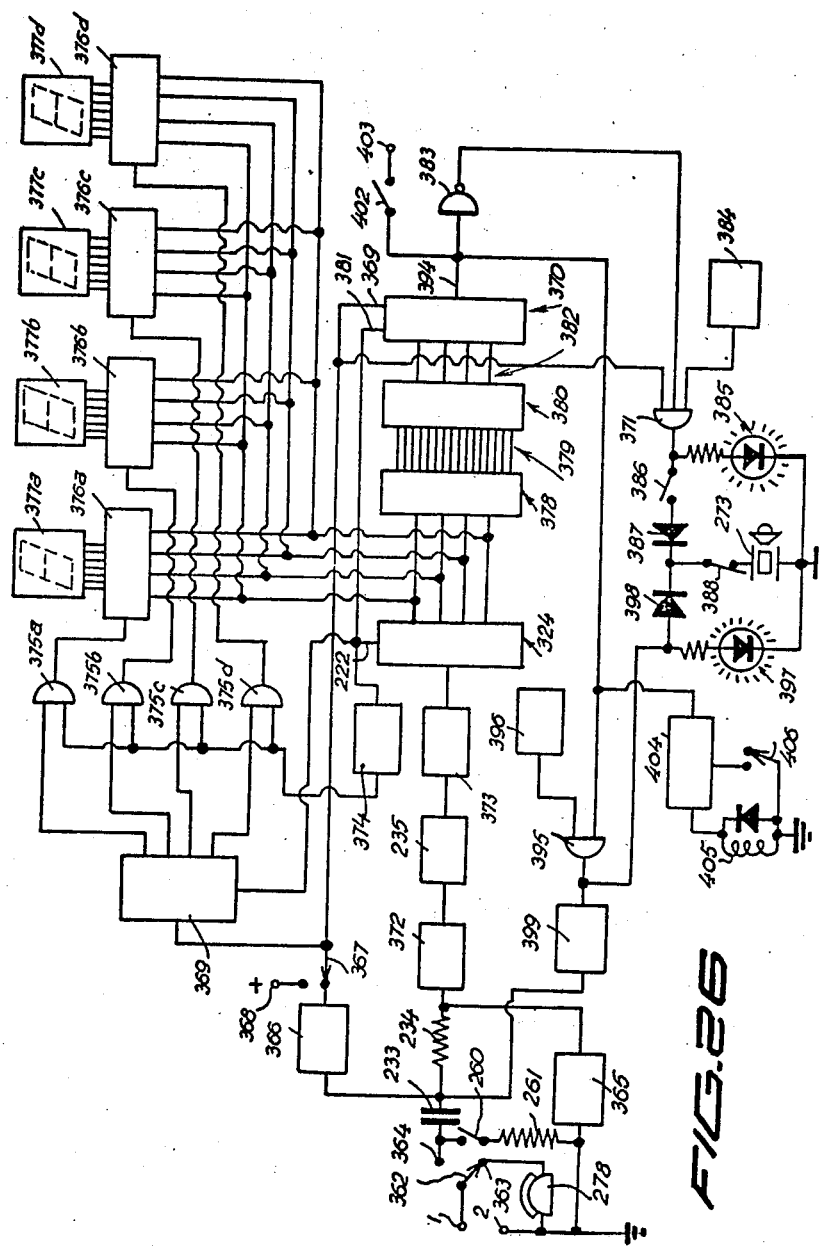

In FIG. 26 another embodiment is shown which is very similar to that described with reference to FIG. 25. In this latter embodiment, the conversation loop was closed in response to the reception of the first, the second, the third or the fourth character of the access code. This was achieved by means of monostable 391 (see FIG. 25), relay 392 with its normally open contact 260, and the coupling of the input of said monostable 391 to one of the outputs of the counting means 368, the selected output being adjustable by means of the selector switch 390. However, in the embodiment of FIG. 26, the conversation loop is closed only in response to the validation of the access code, that is to say only after the calling party has sent the last character of the pre-established access code. The entire circuit arrangement is similar to that illustrated in FIG. 25 and the componentes are indicated by the same reference numerals. The added components are a monostable 404 having for example a time constant of about 30 seconds. The input of this monostable 404 is coupled to the output 394 of the sequence decoding means 370. To the output of monostable 404 is coupled a relay 405 having associated therewith the normally open contact 260. After the last character of the access code has been sent by the calling party and once the access code has been validated by the sequence decoding means 370, the pulse appearing at the output 394 of these latter will trigger monostable 404 which will energize relay 405 closing contact 260 and connecting resistor 261 in parallel with the phone line line 1–2 (it must be remembered that switch 362 has associated its movable contact with the fixed contact 364 when the electronic control apparatus is in use). If the called party does not attend the call, monostable 404 will reset itself after having elapsed the 30 seconds of its time constant, de-energizing relay 405 and reopening switch 260, thus freeing the phone line. A selector switch 406 is associated with monostable 404 and is mechanically coupled with switch 362. If the called subscriber wants to attend the call, he will actuate the assembly of switches 362–406. Through switch 406, monostable 404 will be reset, while switch 362 will disconnect the input of the electronic apparatus from the phone line and will connect to this latter the phone apparatus 278. Before actuating the combined switches, the called subscriber will have unhooked the receiver of his phone set. Otherwise, the operation of this embodiment is entirely similar to that described with reference to FIG. 25.

In FIG. 27 another embodiment of the present invention is shown. This embodiment allows the change of the pre-established codes at the will of the user by means of a keyboard. The phone line is connected to the input terminals 1 and 2. When the calling party has "dialled" the phone number of the phone subscriber he wants to call, and once the exchange has closed the ringing loop, the corresponding ringing signal will appear at said input terminals and will produce the lighting of the neon lamp 407, thus indicating that the phone line is busy and at the same time it will produce the lighting of the neon lamp 408 of an optoelectronic coupler 409. This means that the resistance of the photoresistor 410 will decrease, a positive voltage appearing on the anode of diode 411. This voltage charges capacitor 412 and said positive voltage will be applied at the input of a Schmitt trigger 413. Capacitor 412 and a resistor 414 constitute a network which will maintain a high state on the input of the Schmitt trigger 413 even during the non-active intervals of the ringing period. The square pulse appearing at the output of trigger 413 will enable "OR" gates 415a, 415b, 415c and 415d through inverter 416 and at the same time will enable counting means 417 which are initially in its reset condition. If the calling party sends code characters during one or more non-active intervals of the ringing period, the corresponding signals will pass through a dialling tone filter 418, a highpass filter 419 having for example a cutoff frequency of about 650 Hz, and will be amplified by amplifier 420 having automatic gain control. The output of this amplifier 420 is applied to the input of tone decoding means 421 which are suitable for the "Touch-Tone" system and capable of furnishing signals in the binary system at its outputs indicated in general at 422. In response to each character sent by the calling party, at the outputs 422 of the tone decoding means 421 will appear a corresponding information and at the same time a pulse will appear at the "any tone" output 423 thereof. The pulse, representing a high state, will be applied to one of the inputs of an "AND" gate 424 through switch 425. The output of gate 424 is applied to a delay device 426 the output of which is coupled, through a capacitor 427, to the input of monostable 428 which will generate at its output a short pulse which will enable "AND" gates 429a, 429b, 429c and 429d. Since at the same time a high state appears on the output 430a of counting means 417, at the output of gate 429a another high state will appear producing also a high state at the output of the "OR" gate 415a. The high state appearing at the output of said "OR" gate 415a will enable the transference of information from the outputs of the tone decoding means 421 to the four bits memory 431a. This means that the information present at the outputs 422 will be stored in said memory 431a.

At the end of the character sent by the calling party, the "any tone" output 423 will fall to a low state and the trailing edge of the pulse will produce, through switch 425 and "AND" gate 424, an advancing of one step in the count of the counting means 417, from condition zero to condition one. If the calling party sends now a further character, it will be decoded and stored into memory 431b by means of a similar process to that described with reference to the reception of the first character. The above explained process will be repeated in response to the reception of a third character which will be stored into memory 431c. This third character will have advanced the counting means 417 to its third step and at its output 430d will appear a high state which will block gate 424 through inverter 432 preventing that any character thereafter received may affect the characters already stored into memories 431a to 431c.

The characters stored in binary form into memories 431a to 431c will be present at their outputs indicated in general at 433a to 433c, respectively. These outputs will be applied to BCD decoding means of seven segments 434a, 434b and 434c, respectively, and the output signals of these latter will be applied to corresponding display means 435a, 435b and 435c which will display the corresponding characters of the received code. The outputs 433a to 433c are also coupled to corresponding address inputs 436a to 436c of a C-MOS memory 437 of 4096×4 bits. On the outputs thereof, indicated in general at 438, will appear the information stored in memory 437, and this will be applied to the BCD decoding means of seven segments 439 and, through this latter, will pass to the display means 440 which will display this information. Said outputs 438 are also applied to corresponding inputs, indicated in general at 441, of binary to decimal or hexadecimal decoding means 442. At the corresponding one of the outputs of these latter, indicated at 443a to 443c, will appear a high state corresponding to the respective stored information. If, for example, said output is 443a, on the corresponding input of an "AND" gate 444a will appear a high state. At another of its inputs, gate 444a will receive a high state coming from the output 430d of counting means 417, and at its third input it will receive an alternating high state produced by a low frequency square wave generator 445. Thus, at the output of gate 444a will appear an alternating high state which will be applied to electroacoustic transducer means 273 which will emit an intermittent warning tone to advise the called subscriber that a call is being received and that a code has been validated. The output of gate 444a is also applied to audio oscillator means 446 activating it intermittently and the output of this generator is applied to the phone line 1-2 sending a ring-back signal advising the calling party that his code has been validated. It must be noted that generator 446 has incorporated thereto means protecting it against the 90 V of the ringing signal. It must also be capable of generating a comparatively high output so that the ring-back signal will be easily heard by the calling party.

If the called subscriber wants to attend the call, he must unhook the receiver of his phone set 278 and thereafter close switch 447, producing a flow of current through relay 448 and consequently the opening of the normally closed contact 449 which will disconnect the electronic apparatus from the phone line 1-2. In this way the conversation loop will be closed producing the cease of the ringing signal from the exchange. Thus the output of Schmitt trigger 413 will fall to zero resetting the whole system.

However, if the the code sent by the calling party corresponds for example to the output 443b of the decoding means 442, it will be the "AND" gate 444b which will receive high states at both of its inputs therefore producing also a high state at its output. This high state will appear at the output terminal 450 to which may be connected any suitable utilization circuit which may be activated by this signal. At the same time, the output of gate 444b is applied to an "OR" gate 451 the output of which is coupled to one of the inputs of "AND" gate 452 at the other input of which is applied an alternate high state produced by square wave oscillator means 453. The alternating high state appearing at the output of "AND" gate 452 will activate alternatingly the audio oscillator means 446 which will send to the calling party, through the phone line 1-2, a ring-back signal which will advise him that his code has been validated and that the desired utilization circuit has been energized.

The embodiment of FIG. 27 is suitable for selectively energizing two possible desired utilization circuits. To this end, the output 443c of decoding means 442 is coupled to one of the inputs of a third "AND" gate 444c. The output of this latter gate will produce the same effect of sending a ring-back signal to the calling party through gates 451 and 452, oscillators 453 and 446, and phone line 1-2. However, in this case the output terminal 454 will be the one energized by the corresponding received code. It will be understood that the code characters will be different for energizing output terminals 450 or 454.

Assuming that the phone subscriber wants to change one or more of the codes, he will actuate switches 455a to 455d, 425, 456 and 457, bringing them to the position opposite to that illustrated. Of course, all said switches are mechanically linked in tandem. Under such conditions it will be possible to introduce new codes by means of the keyboard 458. The new codes will be encoded by the encoder 459 and this information will be introduced into the corresponding inputs of memories 431a to 431c. At the same time, at the output of encoder 459 will appear a high state of the type "any code" the ending of which will advance one step the counting means 417. These latter will thus be no longer blocked by inverter 432 while the fourth character will be entered into memory 437, since the write input 460 of this latter is enabled by the output of "OR" gate 415d. This fourth character defines the operation corresponding to the keyed code. After the fourth character, counting means 417 are reset to zero and thereafter a further code may be keyed.

In its illustrated form, this embodiment has capacity for up to eleven different codes of the "Touch-Tone" system ( the zero can not be used). However, the capacity may be increased by using a memory 437 of greater capacity. After having performed the change of code, the apparatus will be restored to its normal operative condition bringing the combined switches 455a to 455d, 425, 456 and 457 to their original position.

In FIG. 28 a device is illustrated which may be used in combination with any of the embodiments herein described and incorporating sequence decoding means like those illustrated in FIG. 19. It may be used to obviate the possibility that somebody may find out one or more codes, used with a certain apparatus of the present invention, by means of the "try and miss" method. If somebody attempts to find out the code in this manner, each time he makes an attempt, the apparatus from which he "dials" will register a charge for the call. It will be understood that the number of possibilities of codes are at least 9,999 in the case of a four character code.

The device operates in the following way. When a code is received, monostable 69' of FIG. 19 (this latter will be taken as an example; however a similar description would be applicable to the embodiment of FIG. 6) will be triggered. At its output a high state will appear which will be maintained for the time during which different characters are entering sequentially. If an erroneous character enters the apparatus, the output of said monostable 69' will go to a low state resetting flip-flops 61a', 61b' and 61d. When the output of monostable 69' goes from high to low, the input of monostable 461 connected to terminal 462, corresponding to the output of monostable 69' (see FIG. 19), will be triggered generating at the output a high state which through diode 463 will energize a relay 464. If switch 465 has its movable contact in the position illustrated in FIG. 28, and if no code has been validated up to now, at the Q output 63c' of flip-flop 61c' (see also FIG. 19) will appear a high state which, through resistor 466, will make conducting transistor 467. Thus, relay 464 will be energized during about 5 seconds (the pre-established time for monostable 461) and the normally open contact 260 associated with said relay will connect a resistor 261 in parallel with the phone line 1-2. Resistor 261 will have a value similar to that of an unhooked conventional phone set. This makes the exchange consider that the call has been attended, charging it and closing the conversation loop. After said time of about 5 seconds, monostable 461 will de-energize relay 464, opening again contact 260. The phone line and the apparatus will be now in conditions to receive a new call. In the case that a code would have been validated by the flip-flop 61c', on the output 63c' would have appeared a low state that would have blocked transistor 467 preventing the energization of relay 464.

If the phone subscriber does not want to use the device described above, he may change switch 465 to the opposite condition to to that illustrated in FIG. 28. In this latter condition, transistor 467 will remain blocked until switch 465 is brought again to the illustrated position.

In FIG. 29 another embodiment of the apparatus of the present invention is shown which is very similar to the embodiments described with reference to FIGS. 25 and 26. The components performing similar functions have been identified with the same reference numerals.

The apparatus illustrated in FIG. 29 works as follows. Broadly stated, the calling party "dials" the phone number pertaining to the subscriber he wants to call, that is to say, corresponding to the line connected to terminals 1-2 of the apparatus. If switch 362 is in the position illustrated in FIG. 29, that is to say, when its movable contact is engaged with fixed contact 363, the phone set 278 will receive the call and the ringing bell will sound; in other words, the performance will be entirely conventional. Instead, if switch 362 has its movable contact engaged with fixed contact 364, the ringing signal, through detecting means 366, will activate electroacoustic transducer 273, provided switch 388 is closed, and at the same time the light emitting diode 385 will get lighted. During one or more of the non-active intervals of the ringing period, the calling party sends now the pre-established code and if this is the right one, it will be validated by the apparatus, thus producing the extinction of light emitting diode 385, while the other light emitting diode 397 will get lighted and the electroacoustic transducer 273 will start to send a warning tone having a rhythm different from the previous one. This will advise the called subscriber that the calling party is acquainted with the code. At the same time the sent code will appear on the numerical displaying means 377a to 377d. The code will be displayed on said displaying means even in the case a wrong code has been received and thus not validated.

Going now to a more detailed description of the performance, it is advisable that switch 362 has its movable contact normally engaged with fixed contact 364. When the calling party has "dialed" the phone number corresponding to the phone line of the called subscriber, when ringing signal appears they will enter as an alternating current through terminals 1 and 2. This signal passes through capacitor 233, resistor 234, and is limited to a small voltage by limiting means 365. The ringing voltage simultaneously goes into the ringing signal detector 366 producing a positive voltage at its output. This voltage is maintained, by means of an R-C circuit included in means 366, even during the non-active intervals of the ringing period. The positive voltage produced by means 366 is applied to input 369 of sequential decoding means 370, thus enabling this latter, and it is also applied to the reset input 368' of counter means 368 capable of counting up to four, thus enabling them. The positive voltage produced at the output of means 366 is also applied to one of the inputs of gate 371 that, through another of its inputs, receives a further positive voltage coming from inverter 383; this latter has a low state at its input in the absence of a validated code. Gate 371 receives at its third input a pulsing state produced by the square wave oscillations generator 384 having for example a frequency of about 3 Hz. Therefore, at the output of gate 371 an alternating high state will appear intermittently activating light emitting diode 385 and when switch 388 is closed, electroacoustic transducer 273 will be energized, emitting a characteristic tone in order to advise the called subscriber that a call has entered. If the calling party sends now, during at least one non-active interval of the ringing period, a code in the form of tones that may be generated by means of the keyboard of a phone set of the "Touch-Tone" system or by any other suitable means, said tones will pass through "free line" tone filter 372 that will suppress any remnant of such a tone that still could be present on the line. The tones will pass then through a highpass filter 235 having a cutoff frequency of about 650 Hz, and will then be applied to amplifier means 373 having automatic gain control, amplifying the tones up to a pre-established level. The tones so amplified will go into "Touch-Tone" to binary tone decoding means 324, each sent character appearing in binary form at the four outputs 324'. Simultaneously with the decoding of each character, a high state will appear on output 222 of decoder 324. This high state will be applied to the clock input 368" of counter means 368, which are of the type which can be activated by the decreasing trailing edge of the pulse. Output 222 also applies the signal to a transference generator 374 which, some seconds after having received the voltage coming from said output 222, generates a very brief positive pulse which enables "AND" gates 375a to 375d. Since counter 368 is still at zero, gate 375a is receiving a high state through one of its inputs which, added to the one received through its first input, makes the output of this gate pass to a high state and produces the transference of the information present at the output of tone decoder 324 to memory means 376a. The output of memory means 376a, in the form of a seven segment code, is applied to numeral display means 377a, so that the received code will be visualized.

When the calling party stops sending the character, output 222 will pass to low state, thus advancing one step the count of counting means 368 and enabling the second "AND" gate 375b. The outputs of tone decoder 324 are also applied to the inputs of a twelve or sixteen bits binary code decoder 378. Said outputs, indicated in general at 379, are applied to corresponding inputs of character selecting means 380 that will allow the pass of the signal coming from decoder 378 only in case that said code would have been pre-established in said character selecting means 380. Assuming that the received code is the right one, said character selecting means will apply a high state to the input 382 of sequence decoding means 370. The function of said means 370 is to receive, through their inputs 382, a sequence of high states within a pre-established time from the reception of the first one of said states at input 382. If these conditions are met and at the same time a high state coming from the output 222 of tone decoding means 324 is received at input 381, a high state will appear at output 394 of said sequence decoding means 370. This high state will be maintained as long as a high state is being received at input 369 coming from the output of ringing detecting means 366. The aim of said sequence decoding means 370 is the validation of codes of the sequential type. If the calling party sends further code characters, the above described process will repeat itself, the sent characters being memorized into memories 376a to 376d and will be presented on display means 377a to 377d. If the code has been completed (in the example, a four characters code) and if it corresponds to the one programmed in character selecting means 380, at the output 394 a high state will appear which, inverted by inverter 383, will block "AND" gate 371 so that light emitting diode 385 will go out and electroacoustic transducer 273 will be de-energized while on the other hand the high state coming from output 394 will enable "AND" gate 395 which, when receiving through its other input the output of a square wave generator 396 having for example a frequency of about 1 Hz, will generate at its output a pulsing high state that will activate light emitting diode 397 and, through diode 398 and normally closed contact 388, will energize electroacoustic transducer 273 emitting an intermittent tone different from the previous one and besides will energize intermittently the ring-back signal generator 399 that will send to the phone line a tone having a characteristic frequency and rhythm that will be received by the calling party, thus being warned that his code had been validated. If the calling party wants to attend the call, he will bring switch 362 to its position in which its movable contact will be engaged with fixed contact 363, having previously unhooked the receiver of his phone set 278. On changing the position of switch 362, the electronic control equipment is left disconnected and it will stop receiving the ringing voltage thus making the output of detecting means 366 go to low state so as to reset sequence decoding means 370 and counting means 368, blocking gate 371 and thus resetting the whole apparatus. If the called subscriber, instead of using the equipment as a phone warning system, wants to use it for actuating one or more servomechanisms, he will close switch 402 and open switch 388. Thus the output 394 of sequence decoding means 370 will be connected to output terminal 403 to which the servomechanism desired to be controlled may be connected. Switch 388, associated with switch 402, will disconnect electroacoustic transducer 273 when the equipment is used to control servomechanisms.

Figure 30:
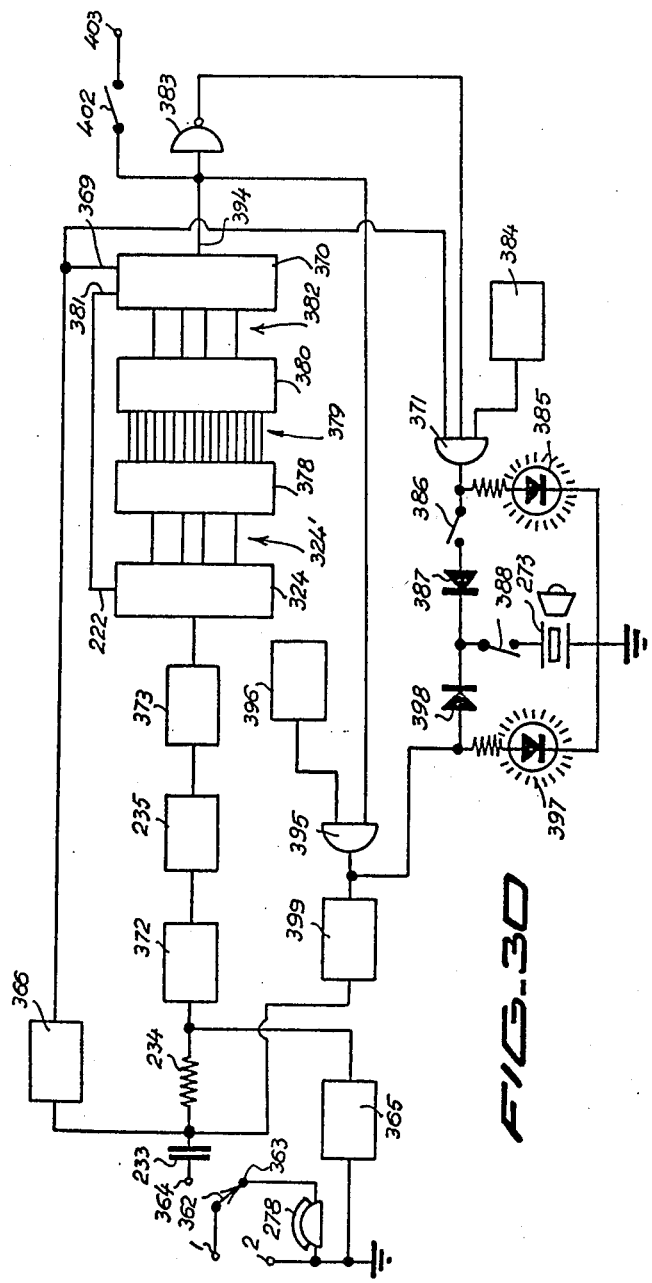
FIG. 30 is a schematic circuit diagram illustrating another embodiment of this invention which is very similar to that of FIG. 29, with the exception that it has no means for displaying the code number.

It must be noted that the embodiments illustrated in FIGS. 30 and 31 are essentially similar to the one described with reference to FIG. 29. Therefore, the components performing similar functions have been indicated with the same reference numerals.

As far as embodiment illustrated in FIG. 30 is concerned, the skilled in the art, when comparing it whith the one illustrated in FIG. 29, will easily see that both of them are substantially identical, except for the fact that the embodiment of FIG. 30 does not incorporate the components of the embodiment of FIG. 29 concerning the code displaying means. The performances of both systems are identical, so that a further detailed explanation is deemed unnecessary.

The embodiment illustrated in FIG. 31 is also almost entirely similar to the one illustrated in FIG. 29. Both embodiments differ in some details only. The first one lies in the fact that a series assembly comprising a switch 260 and a resistor 261 is connected between the fixed contact 364 of switch 362 and ground. It must be noted that contact 260 is a normally open contact of a relay to be referred to later on, while resistor 261 has a resistance value substantially equivalent to the impedance of a conventional phone set having its receiver unhooked.

Another difference lies in the fact that two monostable means 468 and 469 are provided in this embodiment. Monostable 468 is of adjustable time, for example 10 seconds. The triggering input of monostable 468 is coupled to the output 470 of counting means 368. The output of monostable 468 is coupled to the input of second monostable means 469, which are also of adjustable time, for example of about 30 seconds. However unlike monostable means 468, monostable means 469 are of the type actuatable by the decreasing trailing edge of a pulse; that is to say, when the time of monostable 468 is over, it will trigger monostable 469.

When monostable 469 changes its state, once its time is over, it will activate a relay 470' with which normally open contact 260 is associated.

A protective diode 471 is connected in parallel with the energizing coil of relay 470'.

In addition, a two position switch 472 is provided. When its movable contact is engaged with fixed contact 473, it will connect the monostables 468 and 469 to ground while, when engaged with fixed contact 474 it disconnects them from ground.

Another difference lies in the fact that, when movable contact of switch 367 is engaged with fixed contact 475, it will connect the output of ringing signal detecting means 366 to the rest of the electronic equipment while, when said movable contact of switch 367 is engaged with fixed contact 476, it will connect to a terminal 368, associated with a reference positive potential, the input 368' of counting means 368 as well as input 369 of sequence decoding means 370 and the corresponding input of "AND" gate 371.

A further difference lies in the fact that an inverter switch 477 is provided. When the movable contact is engaged with fixed contact 478, it connects directly the output of ring-back tone generating means 399 to the phone line through capacitor 233 and switch 362 (which is assumed to be in a position opposite to that illustrated in FIG. 31 while, when the movable contact is engaged with fixed contact 479, it connects said output of ring-back tone generating means 399 to the phone line through an attenuating resistor 480.

The embodiment illustrated in FIG. 31 operates in an entirely similar way to that described with reference to the embodiment of FIG. 29, the only differences being as follows.

In the case of the embodiment illustrated in FIG. 29, the closing of the conversation loop never takes place during the operation of the electronic equipment. Instead, in this embodiment of FIG. 31, the closing of said loop takes place. It will be assumed that switch 362 is in such a position that its movable contact is engaged with fixed contact 364; that is to say, the phone line will be connected to the input of the electronic control equipment. When the calling party has "dialled" the phone number of the subscriber he desires to call, the exchange closes the ringing loop and the ringing signal detector 366 produces on its output a signal which is applied to input 368' of counter 368 enabling it, as well as to the input 369 of sequence decoding means 370 and to the corresponding input of gate 371. Therefore, the whole embodiment is left ready to receive the first code character. When the calling party sends a second character, the activation of output 470 of counter 368 triggers monostable 468 which, after a time m has elapsed allowing the reception of the complete character, triggers in its turn monostable 469 which produces the energization of relay 470'. Energizing of this relay produces the following events: it closes the normally open contact 260 connecting resistor 261 across the phone line, thus producing the same condition as if a conventional phone set was connected to the phone line with its receiver unhooked; in other words, an answered call condition. At the same time it inverts the position of switch 367, so that at input 368' of counter 368, at input 369 of sequence decoding means 370, and at the corresponding input of gate 371, a fixed positive potential is applied through terminal 368 and fixed contact 476 of the switch. This has the aim of keeping the whole apparatus activated, since the answering of the call through the connection of resistor 261 has ended the ringing period and has closed the conversation loop so that the gain in the circuit increases substantially and therefore any ring-back tone produced by generator 399 would be perceived too loudly by the calling party. The inversion of the position of switch 477 connects attenuating resistor 480 in series. At the same time the inversion of position of switch 472 takes place, connecting to ground the monostables 468 and 469. Thus, all the other code characters are sent by the calling party with the conversation loop closed. As it has been mentioned, the aim of monostable 468 is to allow the sending of the complete second code character, while the aim of monostable 469 is to prevent the apparatus from keeping unnecessarily the line busy in case the sending of the remaining code characters is not completed. Once the time of monostable 469 has elapsed, relay 470' becomes de-energized and switches 472 and 477 and normally open contact 260 return to their original positions, thus ending the call since the opening of contact 260 is equivalent to hanging-up again the receiver of the phone set, thus freeing the phone line. Otherwise, the operation of the apparatus is identical to that described with reference to the embodiment of FIG. 29.

The tone decoding means 324 used in the embodiments of FIGS. 29, 30 and 31 may be like those described with reference to FIG. 18, while the character selecting means 28 may be like those of FIG. 11 and the sequence decoding means may be like those of FIG. 19.

Figure 32:
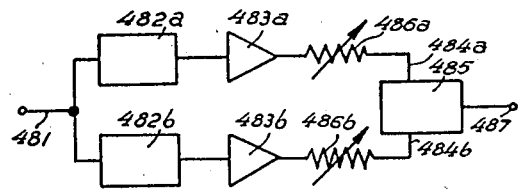
FIG. 32 is a block diagram of an input stage for compensating the twist between the two tones of a pair of the "Touch-Tone" system.

In FIG. 32 a special arrangement is shown which is intended to correct the twist, which may be due to unbalanced lines, between the two tones which form a character in the "Touch-Tone" telephone system. This "twist" effect is particularly noticeable in the case of lines which are not well balanced. This means that at the point at which the phone line enters the apparatus of the present invention, one of the tones (almost always the "high frequency" tone of a "Touch-Tone" pair) is received with a difference of amplitude with respect to the other tone of the pair, which may amount to more than 20% in the case of a very unbalanced line. Such a condition may introduce problems in the operation of the apparatus and thus it must be corrected. The arrangement illustrated in FIG. 32 allows to correct this unbalance or "twist" in a comparatively simple way.

After the tones have passed through filtering means such as those indicated at 14 in FIG. 3, they are applied to the input terminal 481 of FIG. 32. The signal is applied simultaneously to a pair of filtering means 482a and 482b. The first filtering means 482a may be a passband filter having upper and lower cutoff frequencies of 650 and 1000 Hz, while the second one may be also a passband filter having upper and lower cutoff frequencies of 1150 and 1550 Hz. This means that filtering means 482a will block the passage of the tone (of the pair of tones) which pertains to the so called "high frequency" group, while it will allow free passage of the tone (of the pair of tones) pertaining to the so called "low frequency" group. The reverse will be true for the second filtering means 482b; that is to say, they will block the passage of the tone pertaining to the "low frequency" group while allowing the free passage of the tone pertaining to the "high frequency" group. The output of the first filtering means 482a is coupled to the input of amplifying means 483a incorporating automatic level control means. The output of the second filtering means 482b is coupled to the input of second amplifying means 483b also incorporating automatic level control.

The output of amplifying means 483a is coupled to a first input 484a of mixing means 485 through a variable resistor or attenuator 486a, while the output of amplifying means 483b is coupled to a second input 484b of said mixing means 485 through a second variable resistor or attenuator 486b. The output of mixing means 485 is represented by the output terminal 487 which may be coupled to the input of the tone decoding means such as those indicated at 16 in FIG. 3.

It may be easily visualized in FIG. 32 that, for each pair of tones applied to the input terminal 481, the tone having the lower frequency will pass through the branch comprising the first filtering means 482a, the first amplifying means 483a, the variable resistor 486a and the first input 484a of mixing means 485, while the second tone having the higher frequency will pass through the branch comprising the second filtering means 482b, the second amplifying means 483b, the second variable resistor 486b and the second input 484b of the mixing means. Expressed still in another way, the two tones of each pair of tones will proceed through different branches of the circuit arrangement from the input 481 until they reach mixing means 485. The level of the tone passing through amplifying means 483a, which generally will be the one having the higher level, will be reduced in amplitude by the automatic level control characteristic of the amplifying means, while the level of the tone passing through the second amplifying means 483b, which generally will be the one having the lower level, will be increased in amplitude by the automatic level control characteristic of the amplifying means. Any unbalance which could remain may be balanced by means of the adjustment of the variable resistors 484a and 484b. The mixing means will then mix both tones so as to have at output 487 a pair of superimposed tones having substantially equal amplitudes. This mixed tone may then be applied to the single input of tone decoding means such as for example these described with reference to FIG. 4.

Thus, it may be considered that the whole arrangement illustrated in FIG. 32 replaces the simple amplifying means indicated at 15 in FIG. 3, or their equivalent in any of the other embodiments, which have been described above, using amplifying means.

Although several preferred embodiments of the present invention have been described herein, the skilled in the art may easily understand that it is possible to combine portions belonging to different circuits and to replace certain components with equivalent ones. It will be easily understood also that it is possible to assemble several components in just one integrated circuit, when such an I.C., suitable for fulfilling these functions, is available on the market. All these variants and modifications are comprised within the true spirit and scope of the invention as defined in the accompanying claims.

I claim:

1. A method for processing coded information of the Touch-Tone type sent through a phone line between a calling subscriber and a called subscriber and comprising at least one character, said phone line being included in a telephone system which closes a ringing loop between the calling and called subscriber upon completion of dialing the number of the called subscriber and which transmits a ringing signal during a ringing period initiated after completion of said dialing, and which closes a conversation loop when the call is answered, the method comprising the steps of: (A) normally sending from the calling subscriber the call signals corresponding to the phone number of the called subscriber; (B) when the calling subscriber preceives corresponding signals advising that ringing signals are being sent to the called subscriber in resonse to the closing of the ringing loop, sending through the calling subscriber at least one pre-established code signal, comprising at least one character, during at least one non-active interval of the ringing period; (C) suppressing at the called subscriber the ringing signals received during the active intervals of the ringing period and letting through said at least one code character; (D) amplifying the code character let through; (E) decoding said amplified code character, comparing the decoded character with codes comprising at least one character stored in a memory and, if the received code character is coincidental with at least one of the stored code characters, generating a validation signal in response thereto; and (F) in response to said validation signal and before the receiver of the phone set of the called subscriber has been unhooked, activating at the called subscriber at least one utilization circuit.

2. A method for processing coded information of the Touch-Tone type sent through a phone line between a calling subscriber and a called subscriber and comprising at least two codes each comprising at least one character, said phone line being included in a telephone system which closes a ringing loop between the calling and called subscriber upon completion of dialing the number of the called subscriber and which transmits a ringing signal during a ringing period initiated after completion of said dialing, and which closes a conversation loop when the call is answered, the method comprising the steps of: (A) normally sending from the calling subscriber the call signals corresponding to the phone number of the called subscriber; (B) when the calling subscriber perceives corresponding signals advising that ringing signals are being sent to the called subscriber in response to the closing of the ringing loop, sending through the calling subscriber a first pre-established code signal comprising at least one character, during at least one non-active interval of the ringing period; (C) suppressing at the called subscriber the ringing signals and letting through said at least one code character; (D) amplifying the first code character let through; (E) decoding said amplified first code character; (F) in response to a match between said decoded first code character and characters stored in a memory, closing automatically at the called subscriber a conversation loop and sending to the calling subscriber through said phone line a ring-back signal indicating that said match has taken place and the conversation loop has been closed; (G) sending from the calling subscriber to the called subscriber, through said phone line and with the conversation loop now closed, a second pre-established code signal comprising at least one character; (H) amplifying at the called subscriber the second code character; (I) decoding said amplified second code character; (J) comparing said second decoded code character with characters stored in a memory, and (K) in response to a match between said decoded second code character and said stored characters but before the receiver of the phone set of the called subscriber has been unhooked, activating a utilization circuit alerting the called subscriber that a call has been received and that said match has taken place with respect to second code thereby indicating that said second code has been validated.

3. A method according to claim 2, wherein said step (K) furthermore comprises sending to the calling end through said phone line a second ring-back signal advising the calling party that said second code character has been received and validated and that the warning utilization circuit has been activated.

4. A method for processing coded information of the Touch-Tone type sent through a phone line between a calling subscriber and a called subscriber and comprising a first code and at least two second codes, each comprising at least one character, said phone line being included in a telephone system which closes a ringing loop between the calling and called subscriber upon completion of dialing the number of the called subscriber and which transmits a ringing signal during a ringing period initiated after completion of said dialing, and which closes a conversation loop when the call is answered, the method comprising the steps of: (A) normally sending from the calling subscriber the call signals corresponding to the phone number of the called subscriber; (B) when the calling subscriber perceives corresponding signals advising that ringing signals are being sent to the called subscriber in response to the closing of the ringing loop, sending through the calling subscriber a first pre-established code signal, comprising at least one character, during at least one non-active interval of the ringing period; (C) suppressing at the called subscriber the ringing signals and letting through said one code character; (D) amplifying the first code character let through; (E) decoding said amplified first code character and comparing said first code character with characters stored in a memory; (F) in response to a match between said decoded first code character and said stored characters, closing automatically at the called subscriber a conversation loop and sending to the calling subscriber through said phone line a ring-back signal indicating that said validation has taken place and the conversation loop has been closed; (G) sending from the calling subscriber to the called subscriber, through said phone line, and with the conversation loop now closed, one of at least two second pre-established code signals each comprising at least one character; (H) amplifying at the called subscriber the second code character; (I) decoding said amplified second code character; (J) comparing said second decoded character with characters stored in a memory and (K) in response to a match between said decoded character of a first of said second codes and before the receiver of the phone set of the called subscriber has been unhooked, activating a utilization circuit advising the called subscriber that a call has been received and that said one of said second codes has been validated, and if the validation of said decoded characters corresponds to one of a plurality of second codes stored in a memory, activating another corresponding utilization circuit to perform an electrical function according to the nature of said first of said second codes.

5. A method according to claim 4, wherein said step (K) includes furthermore sending to the calling end through said phone line a second ring-back signal advising the calling party that said second code has been received and validated and that the corresponding utilization circuit has been activated.

6. A method according to claim 5, wherein the characteristics of said second ring-back signal are different from that of the first ring-back signal, according to the particular utilization circuit which has been activated.

7. A method according to claim 1, wherein the decoding of the code characters further comprises the step of converting said code characters from characters having characteristic frequencies to characters of the digital type.

8. A method according to claim 2, wherein the decoding of the code characters, further comprises the step of converting said code characters from characters having characteristic frequencies to characters of the digital type.

9. A method according to claim 4, wherein the decoding of the code characters further comprises the step of converting said code characters from having characteristic frequencies to characters of the digital type.

10. A method according to claim 1, wherein the decoding of the code further comprises the step of converting said code characters from characters having characteristic frequencies to characters of the analogical type.

11. A method according to claim 2, wherein the decoding of the code characters further comprises the step of converting said code characters from characters having characteristic frequencies to characters of the analogical type.

12. A method according to claim 4, wherein the decoding of the code characters further comprises the step of converting from characters having characteristic frequencies to characters of the analogical type.

13. A method according to claim 1, wherein the activation of one of the utilization circuits comprises generating an acoustic warning signal.

14. A method according to claim 1 wherein the activation of one of the utilization circuits comprises producing a visual warning signal.

15. A method according to claim 2, wherein the activation of one of the utilization circuits comprises generating an acoustic warning signal.

16. A method according to claim 2, wherein the activation of one of the utilization circuits comprises producing a visual warning signal.

17. A method according to claim 4, wherein the activation of one of the utilization circuits comprises generating an acoustic warning signal.

18. A method according to claim 4, wherein the activation of one of the utilization circuits comprises producing a visual warning signal.

19. A method according to claim 1, wherein the validation of a code comprises furthermore displaying alphanumerically said code.

20. A method according to claim 2, wherein the validation of a code comprises furthermore displaying alphanumerically said code.

21. A method according to claim 4, wherein the validation of a code comprises furthermore displaying alphanumerically said code.

22. A method according to claim 2, after having been closed the conversation loop in response to a first code, further comprising (L) opening automatically again the conversation loop which had been previously closed in response to a mismatch between said second code characters and said stored characters.

23. A method according to claim 1, wherein the received code characters comprise a pair of tones of characteristic frequencies of the type of the "Touch-Tone" phone system, the method including furthermore compensating automatically the twist between the amplitudes of reception of both tones of each pair.

24. A method according to claim 2, wherein the received code characters comprise a pair of tones of characteristic frequencies of the type of the "Touch-Tone" phone system, the method including furthermore compensating automatically the twist between the amplitudes of reception of both tones of each pair.

25. A method according to claim 4, wherein the received code characters comprise a pair of tones of characteristic frequencies of the type of the "Touch-Tone" phone system, the method including furthermore compensating automatically the twist between the amplitudes of reception of both tones of each pair.

26. A method according to claim 2, wherein indefinitely retaining the phone line with the conversation loop closed during more than a predeterminate period of time is made impossible by automatically opening said conversation loop after said predeterminate period of time has elapsed.

27. A method according to claim 4, wherein indefinitely retaining the phone line with the conversation loop closed during more than a predeterminate period of time is made impossible by automatically opening said conversation loop after said predeterminate period of time has elapsed.

28. An apparatus for processing coded information of the Touch-Tone type received through a phone line between a calling subscriber and a called subscriber and comprising at least one character, said phone line being included in a telephone system which closes a ringing loop between the calling and called subscriber upon completion of dialing the number of the called subscriber and which transmits a ringing signal during a ringing period initiated after completion of said dialing, and which closes a conversation loop when the call is answered, the apparatus comprising: (a) a pair of phone line input terminals; (b) ringing signal suppressing means coupled to said phone line input terminals for suppressing ringing signals at the called subscriber; (c) signal amplifying means for receiving said at least one character and being coupled to said ringing signal suppressing means; (d) tone decoding means capable of decoding said at least one coded character and coupled to said amplifying means; (e) character selecting means capable of letting through the tone decoded character coinciding with the characters of codes stored in a memory and coupled to said tone decoding means; (f) sequence decoding means capable of validating the selected code characters in response to the reception thereof in the proper sequence and time spacing, and coupled to said character selecting means; and (g) triggering means capable, in response to the presence of a validation signal at the output of said validating means, of applying an activation signal to a corresponding output terminal to which a utilization circuit may be coupled.

29. An apparatus according to claim 28, wherein ring-back signal generating means are provided which are activatable by the presence of a validation signal at the output of said sequence decoding means in response to the reception of a first access code at said phone line input terminals.

30. An apparatus according to claim 28, wherein ring-back signal generating means are provided which are activatable by the presence of a validation signal a the output of said sequence decoding means in response to the reception of a second code received at said phone line input terminals.

31. An apparatus according to claim 28, wherein ring-back signal generating means are provided which are firstly activatable by the presence of a first validation signal at the output of said sequence decoding means in response to the reception of a first access code received at said phone line input terminals, and which are again activatable by the presence of a second validation signal at the output of said sequence decoding means in response to the reception of a second code received at said phone line input terminals.

32. An apparatus according to claim 28, wherein conversation loop closing means are provided, being activatable by the presence of an any tone signal at the output of said tone decoding means in response to the reception of a first access code at said phone line input terminals.

33. An apparatus according to claim 28, wherein conversation loop closing means are provided, being activatable by the presence of a validation signal at the output of said sequence decoding means in response to the reception of a second code at said phone line input terminals.

34. An apparatus according to claim 28, wherein conversation loop closing means are provided, being activatable by the presence of an activation signal at the output of character counting means after the reception of a particular number of characters of a multiple character code.

35. An apparatus according to claim 28, wherein means are provided for selectively manually changing codes stored in said character selecting means.

36. An apparatus according to claim 28, wherein means are provided for visually displaying the code characters received at said phone line input terminals.

37. An apparatus according to claim 28, wherein means are provided for visually displaying the code characters by the presence of a validation signal at the output of said sequence decoding means in response to the reception of a second code received at said phone line input terminals.

38. An apparatus according to claim 28, wherein means are provided for compensating automatically the twist between the amplitudes of reception of both tones of each pair of received tones of the Touch-Tone phone system.

39. An apparatus according to claim 28, wherein means are provided for compensating automatically the twist between the amplitudes of reception of both tones of each pair of received tones of the Touch-Tone phone system, said compensating means comprising two parallel branches, each branch comprising passband filtering means, the filtering means of the first branch having a passband characteristic allowing the passage of the tones corresponding to the low frequency group of tones of the touch-tone phone system and the filtering means of the second branch having a passband characteristic allowing the passage of the tones corresponding to the high frequency group of tones of the touch-tone system, each branch comprising furthermore amplifying means incorporating automatic level control means and coupled to the corresponding one of said filtering means, the output of each of said filtering means being coupled, through manually adjustable attenuating means, to a corresponding input of mixing means having a common output, the input of both branches being coupled to the output of said ringing signal suppressing means and the output of said mixing means being coupled to the input of said tone decoding means.

40. An apparatus according to claim 28, wherein said tone decoding means comprise means capable of converting each pair of tones of the Touch-Tone phone system to a corresponding signal of the digital type.

41. An apparatus according to claim 28, wherein said tone decoding means comprise means capable of converting each pair of tones of the Touch-Tone phone system to a corresponding signal of the analogical type.

42. An apparatus according to claim 28, wherein the utilization circuit coupled to the output terminal of said triggering means comprises electroacoustic transducer means capable of generating an audible warning tone in response to the presence of the activation signal at said output terminal.

43. An apparatus according to claim 28, wherein the utilization circuit coupled to output terminal of said triggering means comprises light emitting means capable of furnishing a luminous warning indication in response to the presence of the activation signal at said output terminal.

44. An apparatus according to claim 28, wherein conversation loop closing means are provided, being activatable by the presence of a first character of a code received at said phone line input terminals, and capable of opening again said conversation loop in response to the absence of a validation signal at the output of said sequence decoding means when the received code is a non-validatable wrong code.

45. An apparatus according to claim 28, wherein means are provided for automatically opening the conversation loop after a pre-established period of time has elapsed from the reception of a code.

* * * * *